United States Patent [19]
Schlauch

[11] Patent Number: 6,082,774
[45] Date of Patent: Jul. 4, 2000

[54] MEMORABILIA ARTICLES HAVING INTEGRAL COLLECTABLE ATTRACTIVENESS ATTRIBUTES

[76] Inventor: Frederick C. Schlauch, P.O. Box 880, Central Islip, N.Y. 11722

[21] Appl. No.: 08/430,931

[22] Filed: Apr. 26, 1995

Related U.S. Application Data

[63] Continuation-in-part of application No. 08/349,751, Dec. 5, 1994, which is a continuation-in-part of application No. 08/167,647, Dec. 14, 1993, abandoned.

[51] Int. Cl.$^7$ .................................................. B42D 15/00
[52] U.S. Cl. ................................. 283/67; 283/78; 283/75
[58] Field of Search .................................. 283/67, 74, 68, 283/72, 75, 71, 78, 117, 56

[56] References Cited

U.S. PATENT DOCUMENTS

| | | | |
|---|---|---|---|
| 53,081 | 3/1866 | Loewenberg | 427/7 |
| D. 56,985 | 1/1921 | Moore | D21/46 |

(List continued on next page.)

FOREIGN PATENT DOCUMENTS

| | | |
|---|---|---|
| 0330770A1 | 9/1989 | European Pat. Off. . |
| 2119314 | 11/1983 | United Kingdom . |
| 2192583 | 1/1988 | United Kingdom . |
| WO87/06197 | 10/1987 | WIPO . |

OTHER PUBLICATIONS

Ager, Joe. "Politician Cards." *Tuff Stuff*, Mar. 1992, p. 10.
Albersheim, Richard. "The Autograph Report: What's Selling And Alternatives To Card Shows." *Tuff Stuff*, Nov. 1993, p. 139.
Baker, Mark A. *Baseball Autograph Handbook, First Edition.* 1990. Krause Publications, Inc., Iola, Wisconsin.
Baker, Mark A. *Baseball Autograph Handbook, Second Edition.* 1991. Krause Publications, Inc., Iola, Wisconsin.
Barning, Frank. "Autograph Probe Uncovers Coverup, Threats." *Baseball Hobby News*, Nov. 1982, p. 31A.
Beckett, James (editor). *Beckett Baseball Monthly*, Sep. 1994.
Bilello, Suzanne. "U.S. Wages War On China's Pirates." *Newsday*, Feb. 7, 1995, pp. A41 & A44.
Binder, Rich. "Rich Binder On Autograph Collecting." *The Trader Speaks*, Apr. 1983, pp. 9–10.
Bottjer, Eric. "Get Ready to Rumble! Boxing Memorabilia Prepares To Go The Distance With Collectors." *Tuff Stuff*, Aug. 1992, pp. 88–89 & 91.
Brecka, Jon. "How Sweet It Is, The Single–signed Baseball Represents One Of The Hobby's Most Affordable And Sought–after Collectibles." *Encyclopedia of Sports Memorabilia & Price Guide*, Apr.–May 1995, pp. 8–10.
Breeden, Mike, Scott Gregg, Michael Litos, Dennis Madigan, and Jim Warren II. "Certificates Of Authenticity, Are Two Signatures Worth More Than One?" *Tuff Stuff*, Feb. 1994, p. 162.
Cariseo, Danny. "The Autograph Update: Upper Deck Vs. Score Board: What Does It Mean For The Hobby?" *Encyclopedia of Sports Memorabilia & Price Guide*, Jun.–Jul. 1995, p. 12.

(List continued on next page.)

Primary Examiner—Willmon Fridie, Jr.

[57] ABSTRACT

Collector-targeted memorabilia articles, and a a method of producing collector-targeted memorabilia articles by affixing one or more integral collectible attractiveness attributes to each selected base article. Items selectable for use as base articles are, for example, sports-related items, non-collector-targeted utilitarian items, pre-existing memorabilia items, items intentionally manufactured for use as base articles, and like items. Each memorabilia article is a unified body of tangible material comprising a base article and a a requisite integral collectible attractiveness attribute affixed to the base article in the form of a genuine fingerprint of a preferred personality, a genuine autograph of a preferred personality, or a facsimile fingerprint of a preferred personality. A facsimile autograph of a preferred personality, limited edition markings, a witness-signed authentication statement, notarial confirmation text, and/or other integral collectible attractiveness attributes may be additionally affixed to the base article.

147 Claims, 18 Drawing Sheets

U.S. PATENT DOCUMENTS

| | | | |
|---|---|---|---|
| 68,339 | 9/1867 | Beamer | 223/109 R |
| 101,020 | 3/1870 | Jones | 428/199 |
| 147,289 | 2/1874 | Smith | 40/159 |
| 167,045 | 8/1875 | Wilkerson | 40/299 |
| 305,315 | 9/1884 | Lawson | 273/298 |
| D. 312,048 | 11/1990 | Mills | D10/64 |
| D. 322,097 | 12/1991 | Fritz | D20/42 |
| D. 326,068 | 5/1992 | Pierce | D11/99 |
| 336,179 | 2/1886 | Vogelsang | 273/126 R |
| D. 340,880 | 11/1993 | Walton | D11/137 |
| D. 352,956 | 11/1994 | Vanzandt et al. | D19/1 |
| D. 353,843 | 12/1994 | Martin | D20/40 |
| 390,593 | 10/1888 | Hansen | 40/1.6 |
| 483,895 | 10/1892 | Buckley | 273/126 R |
| 622,240 | 4/1899 | Latham | 273/299 |
| 712,159 | 10/1902 | Voege | 273/400 |
| 878,366 | 2/1908 | Evans | 283/74 |
| 1,117,316 | 11/1914 | Booton et al. | 273/306 |
| 1,118,727 | 11/1914 | Bibeault | 473/52 |
| 1,206,362 | 11/1916 | Parliman | 40/384 |
| 1,322,293 | 11/1919 | Effrig | 283/77 |
| 1,357,166 | 10/1920 | Hart | 273/303 |
| 1,374,208 | 4/1921 | Jones | 427/1 |
| 1,380,506 | 6/1921 | Voght | 283/67 |
| 1,483,926 | 2/1924 | Chadwick et al. | 283/77 |
| 1,499,955 | 7/1924 | Stoddard | 40/299 |
| 1,539,448 | 5/1925 | White | 118/31.5 |
| 1,560,047 | 11/1925 | Edwards | 283/78 |
| 2,006,744 | 7/1935 | Pierce | 283/107 |
| 2,010,830 | 8/1935 | Staude | 462/84 |
| 2,020,376 | 11/1935 | Rich | 283/68 |
| 2,066,535 | 1/1937 | Lucas | 427/1 |
| 2,078,382 | 4/1937 | Hanshaw | 273/58 |
| 2,082,735 | 6/1937 | Heinecke | 427/1 |
| 2,104,586 | 1/1938 | Freudenheim | 427/1 |
| 2,163,978 | 6/1939 | Ivanek | 40/491 |
| 2,198,802 | 4/1940 | Brady | 283/68 X |
| 2,263,052 | 11/1941 | Ross | 273/63 |
| 2,364,870 | 12/1944 | Otto | 18/59 |
| 2,448,731 | 9/1948 | Park | 273/60 |
| 2,504,650 | 4/1950 | Chessrown | 35/35 |
| 2,712,514 | 9/1955 | English | 156/281 |
| 2,723,476 | 11/1955 | Lyon | 15/104.92 |
| 2,925,273 | 2/1960 | Pratt | 273/26 |
| 3,110,494 | 11/1963 | Morgan | 273/26 |
| 3,245,697 | 4/1966 | Nugent | 283/7 |
| 3,318,282 | 5/1967 | Bean | 118/713 |
| 3,376,661 | 4/1968 | Hulett | 40/2.2 |
| 3,408,217 | 10/1968 | Obuchi | 427/1 |
| 3,412,493 | 11/1968 | French | 283/85 |
| 3,571,957 | 3/1971 | Cumming et al. | 40/2.2 |
| 3,664,910 | 5/1972 | Hollie | 161/147 |
| 3,679,512 | 7/1972 | Macone | 156/308.4 |
| 3,709,524 | 1/1973 | McKee et al. | 462/55 |
| 3,851,619 | 12/1974 | Cofield et al. | 118/31.5 |
| 4,083,137 | 4/1978 | Rozmanith | 40/158.1 |
| 4,182,261 | 1/1980 | Smith et al. | 118/31.5 |
| 4,215,499 | 8/1980 | Wilson | 40/772 |
| 4,220,086 | 9/1980 | Laleta-Ballini | 101/450.1 |
| 4,232,083 | 11/1980 | Buerkley et al. | 503/201 |
| 4,307,900 | 12/1981 | Krautsack | 283/56 |
| 4,322,001 | 3/1982 | Hurley | 206/449 |
| 4,325,556 | 4/1982 | DeCanto et al. | 273/393 |
| 4,379,178 | 4/1983 | Meadows et al. | 427/1 |
| 4,641,578 | 2/1987 | Versaci | 101/426 |
| 4,681,324 | 7/1987 | Karabed et al. | 101/426 |
| 4,685,699 | 8/1987 | Hirasawa | 281/15 R |
| 4,699,077 | 10/1987 | Meadows et al. | 118/31.5 |
| 4,705,299 | 11/1987 | Hedgcoth et al. | 283/68 |
| 4,714,275 | 12/1987 | Engel et al. | 281/15 R |
| 4,764,666 | 8/1988 | Bergeron | 235/380 |
| 4,766,026 | 8/1988 | Lass et al. | 428/203 |
| 4,829,691 | 5/1989 | Manjos et al. | 40/661 |
| 4,860,468 | 8/1989 | Cliborn | 40/124.2 |
| 4,880,256 | 11/1989 | Ferre-Blanquez | 283/92 |
| 4,882,195 | 11/1989 | Butland | 427/1 |
| 4,890,229 | 12/1989 | Rudnick | 364/410 |
| 4,907,826 | 3/1990 | Versage | 283/56 |
| 4,913,284 | 4/1990 | Versaci | 206/232 |
| 4,921,280 | 5/1990 | Jalon | 283/88 |
| 4,927,180 | 5/1990 | Trundle et al. | 283/70 |
| 4,944,968 | 7/1990 | Wagner | 428/13 |
| 4,968,065 | 11/1990 | O'Brien | 283/117 |
| 4,979,619 | 12/1990 | Hager | 206/509 |
| 4,979,750 | 12/1990 | Endrody | 273/297 |
| 4,991,838 | 2/1991 | Groves | 273/26 R |
| 5,002,313 | 3/1991 | Salvatore | 283/102 |
| 5,009,626 | 4/1991 | Katz | 446/391 |
| 5,010,673 | 4/1991 | Connor et al. | 40/661 |
| 5,025,580 | 6/1991 | Asai | 40/152.1 |
| 5,026,058 | 6/1991 | Bromley | 273/93 C |
| 5,040,671 | 8/1991 | Hager | 206/39 |
| 5,056,251 | 10/1991 | Connor et al. | 40/661 |
| 5,071,168 | 12/1991 | Shamos | 283/68 X |
| 5,078,426 | 1/1992 | Reardon | 283/68 X |
| 5,082,310 | 1/1992 | Hager | 206/232 |
| 5,087,145 | 2/1992 | Cooley | 402/79 |
| 5,095,194 | 3/1992 | Barbanell | 235/379 |
| 5,106,125 | 4/1992 | Antes | 283/91 |
| 5,114,187 | 5/1992 | Branch | 283/81 |
| 5,119,574 | 6/1992 | King | 40/537 |
| 5,120,089 | 6/1992 | Guttag | 283/71 |
| 5,120,090 | 6/1992 | Reinl | 283/117 |
| 5,128,779 | 7/1992 | Mallik | 359/2 |
| 5,133,450 | 7/1992 | Rademacher | 206/44 B |
| 5,135,230 | 8/1992 | Denman et al. | 273/244 |
| 5,145,173 | 9/1992 | Crowder | 273/93 C |
| 5,145,212 | 9/1992 | Mallik | 283/86 |
| 5,147,043 | 9/1992 | Gould | 206/457 |
| 5,186,467 | 2/1993 | Chasin | 273/298 |
| 5,186,566 | 2/1993 | Cameron | 402/79 |
| 5,190,127 | 3/1993 | Cummings | 109/102 |
| 5,190,316 | 3/1993 | Hefty | 281/15.1 |
| 5,194,289 | 3/1993 | Butland | 427/1 |
| 5,201,525 | 4/1993 | Castro | 273/293 |
| 5,208,630 | 5/1993 | Goodbrand et al. | 355/201 |
| 5,215,792 | 6/1993 | Miller | 428/14 |
| 5,237,763 | 8/1993 | Ochoa | 40/152.1 |
| 5,246,161 | 9/1993 | Kapp | 229/103 |
| 5,263,742 | 11/1993 | Koch | 283/78 |
| 5,267,756 | 12/1993 | Molee et al. | 283/74 X |
| 5,269,456 | 12/1993 | Regis et al. | 229/103 |
| 5,270,101 | 12/1993 | Helicher | 428/209 |
| 5,287,641 | 2/1994 | Showers | 40/488 |
| 5,306,049 | 4/1994 | Shireck | 283/74 |
| 5,323,553 | 6/1994 | Candido | 40/537 |
| 5,328,207 | 7/1994 | Hannah | 283/77 |
| 5,330,231 | 7/1994 | Godfrey | 283/78 |
| 5,340,113 | 8/1994 | Respicio | 273/249 |
| 5,353,925 | 10/1994 | Lennen et al. | 206/204 |
| 5,356,136 | 10/1994 | Ippolito | 273/58 R |
| 5,360,628 | 11/1994 | Butland | 427/7 |
| 5,363,964 | 11/1994 | Hexter | 206/449 |
| 5,364,094 | 11/1994 | Mustion | 273/32 A |
| 5,375,714 | 12/1994 | Burnett | 206/424 |
| 5,377,733 | 1/1995 | Halley et al. | 150/147 |
| 5,377,828 | 1/1995 | Jaroshewich | 206/315.1 |
| 5,380,044 | 1/1995 | Aitkens et al. | 283/67 |
| 5,380,047 | 1/1995 | Molee et al. | 283/86 |
| 5,395,444 | 3/1995 | Arndt et al. | 118/31.5 |
| 5,398,812 | 3/1995 | Hwang | 206/568 |

| | | | |
|---|---|---|---|
| 5,401,561 | 3/1995 | Fisun et al. | 428/195 |
| 5,405,197 | 4/1995 | Makowka | 383/5 |
| 5,407,193 | 4/1995 | McGinley | 273/26 R |
| 5,411,259 | 5/1995 | Pearson et al. | 273/93 C |
| 5,417,431 | 5/1995 | Gluck | 273/293 |
| 5,419,062 | 5/1995 | Polinski et al. | 40/124.4 |
| 5,429,391 | 7/1995 | White | 283/70 |
| 5,433,035 | 7/1995 | Bauer | 40/124.1 |
| 5,435,567 | 7/1995 | Compress | 273/244 |
| 5,435,568 | 7/1995 | Black | 273/303 |
| 5,443,106 | 8/1995 | Browne | 156/182 |
| 5,443,270 | 8/1995 | Lortiz | 273/290 |
| 5,445,391 | 8/1995 | Gleason | 273/304 |
| 5,447,335 | 9/1995 | Haslop | 283/91 |
| 5,451,052 | 9/1995 | Behm et al. | 273/139 |
| 5,454,598 | 10/1995 | Wicker | 283/67 |
| 5,454,600 | 10/1995 | Floyd | 283/78 |
| 5,462,167 | 10/1995 | Polinski et al. | 206/455 |
| 5,526,597 | 6/1996 | Plotkin et al. | 40/722 |

OTHER PUBLICATIONS

Crowder, Scott. "In The World Of Sports." *Autograph Collector*, Oct. 1993, pp. 58–59.

Dismukes, Bill, and John Dismukes. "Creating A Unique Collectible." *Baseball Cards*, May 1990, pp. 72, 76 & 78.

Encyclopedia of Sports Memorabilia & Price Guide Editorial Staff. "Sports Memorabilia Price Guide." *Encyclopedia of Sports Memorabilia & Price Guide*, Dec. 1994/Jan. 1995, pp. 49–67, 73–74 & 76.

Encyclopedia of Sports Memorabilia & Price Guide Editorial Staff. "Sports Memorabilia Price Guide." *Encyclopedia of Sports Memorabilia & Price Guide*, Apr.–May 1995, pp. 49–67 & 74–75.

Firfer, Rick. "What Constitutes A Game–worn Jersey?" *Sports Collectors Digest*, Apr. 16, 1993, p. 111.

Fritz, Steve. "A Star On Every Card, Comics Breaking Into Card Collecting World." *Tuff Stuff*, May 1992, pp. 62–64 & 66.

Forman, Ross. "Reggie Will Again Donate Autograph Fee To Assist Former Negro Leaguers." *Sports Collectors Digest*, Sep. 9, 1994, p. 10.

Galovich, Tony. "Points To Ponder: From A Falling Case Market To Hawaii And Back." *Tuff Stuff*, Mar. 1992, pp. 156–157.

Gilkeson, Dick. "Truly Tuff Stuff: Just What Does 'Limited Edition' Really Mean Anyway?" *Tuff Stuff*, Mar. 1992, pp. 172–173.

Gilkeson, Dick. "Truly Tuff Stuff: Autographed Insert Cards Are The Latest 'Must Have' For Master Set Collectors." *Tuff Stuff*, May 1992, pp. 184–185.

Gregory, Bob. "Seal Of The First Cat Of The United States." *Collector Caps Price Guide*, Summer 1995, p. 79.

Hager, Alan. *Hager's Comprehensive Price Guide To Rare Baseball Cards, 1886 To Present, Volume 1*. 1993. Alan Hager Group, Inc., Norfolk, Connecticut.

Hawkins, Jim. "Eye Of The Hawk: Some Aren't Worth Paper They're Printed On, Certificate Of Authenticity Only As Good As Issuer's Reputation." *Sports Collectors Digest*, Oct. 21, 1994, p. 24.

Houser, Dave. "Honeymooning At The Baseball Hall Of Fame." *Baseball Hobby News*, Nov. 1983, p. 12A.

Hurley, Jim. "The Variety In Autograph Media." *Baseball Hobby News*, Mar. 1990, pp. 54A–55A.

Kiefer, Kit. "Hooping It Up: 26 Sheets To The Wind, Hoops' Arena–giveaway Sheets Pose A Collecting Challenge." *Baseball Cards*, Mar. 1992, p 30.

Kiefer, Kit. "Insert Cards." *Trading Cards*, Jan. 1994, pp. 92–96.

Kimura, Daren. "Milkcap Speed Up At Charlotte." *Collector Caps Price Guide*, Summer 1995, p. 10.

Kimura, Daren. "NHL Hockey Puck Slammer!" *Collector Caps Price Guide*, Summer 1995, p. 47.

Kimura, Daren. "WCW Ring Rockin' Wrestling." *Collector Caps Price Guide*, Summer 1995, p. 51.

Kimura, Daren. "Holographic Images Mystify!" *Collector Caps Price Guide*, Summer 1995, p. 65.

King, Gil. "Cachets Recapture Moments, Gateway Stamp Company Issues Full–color Silk Cachet Envelopes Highlighting Diamond Stars." *Baseball Card News*, Nov. 10, 1989, p. 6A.

Kolligian, Lee. "Legal Corner: Superstars' Autographs, Making Sure You Have The Right Signature." *Trading Cards*, Nov. 1991, pp. 45 & 76.

Kotero, George A. "Mania Slammin' Down Under!" *Collector Caps Price Guide*, Summer 1995, pp. 56–57.

Kraeer, Greg. "Dick Perez, Donruss's 'Diamond King' Artist Says It's A Long Way From North Philly To Cooperstown." *Baseball Cards*, Oct. 1987, pp. 14, 16, 18 & 20.

LaMarre, Tom. "Baseball's Centennial Stamp." *Baseball Cards*, Jun. 1985, pp. 74–75.

Lemke, Bob (editor). *Sportscard Counterfeit Detector*. 1992. Krause Publications, Inc., Iola, Wisconsin.

Leptich, John. "The Inside Corner: Letters From The Leptich Mailbox." *Sports Collectors Digest*, Apr. 16, 1993, p. 50.

Lindsay, Kenny. "Beware Of Autopen Signatures." *Sports Collectors Digest*, Feb. 10, 1995, p. 6.

Lupo, Vince. "The Way It Is: New Evidence Indicates WildCard's Overproduction Of Chromium Cards." *Sports Collectors Digest*, Feb. 3, 1995, p. 60.

Lupo, Vince. "The Way It Is: UDA Files Suit Against The Score Board And Three Others." *Sports Collectors Digest*, Mar. 17. 1995, pp. 14–15.

Lupo, Vince. "The Way It Is: Start Your Morning With Some O.J., Signed O.J. Card Can Be Yours For As Little As $850." *Sports Collectors Digest*, Sep. 23, 1994, p. 22.

Lupo, Vince. "The Way It Is: Fourteen–year Old Taken For A Ride, Memorabilia Dealer Faces Up To Four Years In Prison." *Sports Collectors Digest*, Nov. 11, 1994, p. 26.

Lupo, Vince. "The Way It Is: SCD Readers Answer, 'What Purpose Do Certificates of Authenticity Serve?'." *Sport Collectors Digest*, Jul. 14, 1995, pp. 24–26.

Malc, Paul. "Autographs." *Sports Collectors Digest*, Jul. 14, 1995, pp. 24–25.

Marazzi, Rich. "Batting The Breeze: Mark Murphy—The Wax Pack King." *Sports Collectors Digest*, Jan. 29, 1993, pp. 110–111.

Marazzi, Rich. "Batting The Breeze: John Raybin Discusses Autograph Collecting." *Sports Collectors Digest*, Jun. 25, 1993.

Mazzola, Gregg. "Interview: Mickey Mantle, The Idol Of Millions Talks About The Hobby, Autograph Shows And His Rookie Card." *Tuff Stuff*, Mar. 1992, pp. 80–81.

McKeever, Michael. "Gridiron Audibles." *Encyclopedia of Sports Memorabilia & Price Guide*, Dec. 1994/Jan. 1995, pp. 32–33.

McLauchlin, Jim. "4 Things You Didn't Know About Autographs: #4 Autographed Rarities." *Collector's Sportslook*, Jun. 1995, p. 59.

Melia, Terry. "Finding The Comfort Zone, Are Certificates Of Authenticity Worth Even The Pieces Of Paper They're Printed On?" *Encyclopedia Of Sports Memorabilia & Price Guide,* Dec. 1994/Jan. 1995, pp. 8–10.

Miedema, Dave. "Up Autograph Alley: Strawberry Joins List Of Rubber Stampers?" *Sports Collectors Digest,* Sep. 14, 1984, pp. 130 & 132.

Miedema, Dave. "Who's Who In The National League: Good Guys & Ghost–signers." *Baseball Cards,* Oct. 1984, pp. 48–49 & 52–54.

Miedema, Dave. "Up Autograph Alley: Identifying Rubber Stamps And Fakes." *Sports Collectors Digest,* Dec. 7, 1984, pp. 94–95.

Miedema, Dave. "Up Autograph Alley: Two Stars Getting Mail Answering Help." *Sports Collectors Digest,* Mar. 29, 1985, pp. 22, 24 & 26.

Miedema, Dave. "Up Autograph Alley: Cases Of Mistaken Identity." *Sports Collectors Digest,* Apr. 26, 1985, pp. 94, 102, 106, & 110.

Miedema, Dave. "McDonald's Issues New Bears Card Set." *Sports Collectors Digest,* Jan. 31, 1986, p. 24.

Miedema, Dave. "Autograph Inquiries." *Baseball Cards,* Dec. 1986, pp. 84 & 85.

Miedema, Dave. "Up Autograph Alley: Hall Of Famers Make Autograph News." *Sports Collectors Digest,* Jan. 30, 1987, pp. 176, 184 & 192.

Miedema, Dave. "Autographs: Signing Their Lives Away, Rating The More Recent Hall of Famers On Their Signing Habits." *Baseball Cards,* Jul. 1987, pp. 74 & 76.

Miedema, Dave. "Autographs: Some Sign, But Few Of These Hall Of Famers Sign For Free Anymore." *Baseball Cards,* Aug. 1987, pp. 18 & 20.

Miedema, Dave. "Autographs: Unhealthy, Health Problems Limit The Appearances Of Older Hall Of Famers." *Baseball Cards,* Oct. 1987, pp. 26 & 28.

Miedema, Dave. "Autographs: Regular Guys, These Hall Of Famers Are Pretty Good About Their Autographs." *Baseball Cards,* Nov. 1987, pp. 18 & 20.

Miedema, Dave. "Up Autograph Alley." *Sports Collectors Digest,* Jul. 24, 1992.

Miedema, Dave. "Up Autograph Alley: Sharpie Has Met Its Match On Some '93 Cards; Donruss, Fleer UV Coated Cards Don't Retain Ink As Well As Topps." *Sports Collectors Digest,* Apr. 16, 1993, p. 90.

Miedema, Dave. "Up Autograph Alley: Some Players Condensed, Abbreviated Their Autograph." *Sports Collectors Digest,* Feb. 3, 1995, p. 140.

Miedema, Dave. "Let The Autograph Buyer Beware, Forged Signatures Are More Commonplace Than Even Dealers Would Care To Admit." *Encyclopedia of Sports Memorabilia & Price Guide,* Apr.–May 1995, pp. 38 & 40–41.

Miedema, Dave. "Shirt Off My Back: Don't Put Total Faith In Letter Of Authenticity." *Sports Collectors Digest,* Jul. 14, 1995, p. 80.

Miller, Richard D. "19th Century Trade Cards, Early Ad Cards Offered Comedic Baseball Scenes." *The Trader Speaks,* Mar. 1990, pp. 10–11 (in *Sports Collectors Digest,* Feb. 23, 1990).

Morse, Rusty. "Designated Editor: Sports And Disaster." *Sports Collectors Digest,* Dec. 1, 1989, p. 120.

Mortenson, Tom. "SCD Baseball Autograph Price Guide." *Sports Collectors Digest,* May 12, 1995, pp. 128–130.

Navarro, Al. "Odds & Ends: Bats and Wine Bottles Are Not Just For Swinging and Drinking." *Encyclopedia of Sports Memorabilia & Price Guide,* Jun.–Jul. 1995, p. 32.

Newman, Scott. "Faking The Romance: Fraud And Conterfeiting. Few People In The Memorabilia Industry Want To Talk About It. But That's The Only Way To Correct It." *Tuff Stuff,* Feb. 1993, pp. 116–118.

Nii, Judith. "News Releases." *Collector Caps Price Guide,* Summer 1995, p. 12.

Nii, Judith. "Why Are Milkcaps So Popular?" *Collector Caps Price Guide,* Summer 1995, p. 12.

Nii, Judith. "Stacking 'Em Up In The Big Apple!" *Collector Caps Price Guide,* Summer 1995, pp. 20–21.

Nilson, Edwin F., Jr. "Dragonball Z Slams Japan." *Collector Caps Guide,* Summer 1995, p. 59.

Obojski, Robert. "Garvey And Reggie On Collector Plates." *Baseball Hobby News,* Jul. 1983, p. 11A.

O'Donnell, Chuck. "4 Things You Didn't Know Aboout Autographs: #1 It's The Law." *Collector's Sportslook,* Jun. 1995, p. 58.

O'Donnell, Chuck. "4 Things You Didn't Know About Autographs: #2 All The Presidents' Sigs." *Collector's Sportslook,* Jun. 1995, pp. 58–59.

O'Donnell, Chuck. "4 Things You Didn't Know About Autographs: #3 Ghost Signers Haunt The Hobby." *Collector's Sportslook,* Jun. 1995, p. 59.

Overstreet, Robert M. *The Overstreet Comic Book Price Guide, 24th Edition.* 1994. Avon Books, New York, New York.

Pendleton, F.J. "Stamping Around: Hoops Or Bats—The Philatelic Prospects Are Similar." *Sports Collectors Digest,* Dec. 1, 1989, pp. 252–253.

Raybin, John L. "The Raybin Autograph Report: The Growth Of Non–baseball Autographs And The Evils of Blue Sharpies." *Tuff Stuff,* Feb. 1993, p. 149.

Raybin, John. L. "These Guys Know Autographs, The Ten Most Influential People In The Sports Autograph Industry: Hear What They Have To Say." *Encyclopedia of Sports Memorabilia & Price Guide,* Jun.–Jul. 1995, pp. 34–37.

Raymond, Sam. "Home Shopping Scam, Is The Home Shopping Club A Viable Avenue Through Which Collectors Can Buys Sports Collectibles?" *Trading Cards,* Jan. 1994, pp. 20–24 & 26.

Reid, Zachary. "A Closer Look: The Score Board Cracking Down On Fake Autographs." *Tuff Stuff,* Apr. 1993, pp. 27–28.

Reid, Zachary. "Ode To A Sharpie." *Collector's Sportslook,* Jun. 1995, p. 63.

Ryan, Steve. "Under The Microscope, Athletes Being Targeted For Tax Evasion." *Encyclopedia of Sports Memorabilia & Price Guide,* Apr.–May 1995, pp. 42–43 & 78.

Saccucci, Fluffy. "Gartlan Statues Find Niche In Sports Collecting Hobby." *Sports Collectors Digest,* Nov. 13, 1992, pp. 50–51.

Santry, Kevin. "More On The Autopen." *Sports Collectors Digest,* Mar. 3, 1995, p. 6.

Slater, John. "Checklist Clearinghouse Returns With New Lineup, Steve Garvey Featured." *Baseball Hobby News,* Feb. 1985, p. 11.

Spaise, Kevin. "Upper Deck Hits Paydirt With Its '91 Gridiron Set, Joe Montana Signs On As Card Company Promoter." *Trading Cards,* Nov. 1991, p. 12.

Spaise, Kevin. "Inside Pitches." *Encyclopedia of Sports Memorabilia & Price Guide,* Dec. 1994/Jan. 1995, pp. 28–29.

Spaise, Kevin. "To Personalize Or Not To Personalize: If Your Baseball Is Signed 'To Abner,' You'll Probably Have A Tough Time Selling It." *Encyclopedia of Sports Memorabilia & Price Guide*, Apr.–May 1995, pp. 18–20.
Sperling, Joe. "Autograph Addict." *Tuff Stuff*, Feb. 1992, p. 81.
Sperling, Joe. "Autograph Addict: Some Protective Sheets Are Damaging To Autographs." *Tuff Stuff*, Mar. 1992, p. 91.
Sperling, Joe. "Autograph Addict: Of Autopens And Players Who Don't Answer Mail." *Tuff Stuff*, May 1992, p. 191.
Sperling, Joe. "Autograph Addict: Beware: Rubber Stamp Suspected In St. Louis." *Tuff Stuff*, Jun. 1992, p. 143.
Sperling, Joe. "Autograph Addict: Spending Big Money For A Little Ink." *Tuff Stuff*, Aug. 1992, p. 175.
Sports Collectors Digest Editorial Staff. "Proposed Legislation Would Define Term 'Limited Edition'." *Sports Collectors Digest*, Apr. 16, 1993, p. 12.
Toser, Roxanne. "Milk Caps—The Hottest Collectibles..." *Non–Sport Update*, Jul.–Sep. 1993, p. 26.
Tuff Stuff Price Guide Staff. "Tuff Stuff's Baseball Hall Of Fame Guide." *Tuff Stuff*, Dec. 1993, pp. 214–216.
Warner, Justin. "Authentic Sign Of The Times." *Newsday*, May 2, 1995, p. B25.
Warren, Julie. "Collecting For Heel Of It, How One Collector Got Magic Johnson's And Michael Jordan's Sneakers." *Encyclopedia of Sports Memorabilia & Price Guide*, Jun.–Jul. 1995, pp. 78–80.
A & A Baseball. Advertisement. *Sports Collectors Digest*, Feb. 23, 1990, p. 247.
A & K Sports Collectibles. Advertisement. *Tuff Stuff*, Dec. 1994, p. 91.
A.E. Forth Co. Advertisement. *Baseball Hobby News*, Jun. 1989. p. 10A.
A Gloria Rothstein Show Inc. Advertisement. *Tuff Stuff*, Mar. 1992, p. 55.
Able Soft. Advertisement. *Trading Cards*, Jan. 1994, p. 63.
Accugrade, Inc. Advertisement. *Sports Collectors Digest*, Mar. 17, 1995, p. 76.
Ace Embossing. Advertisement. *Collector Caps Price Guide*, Summer 1995, p. 80.
Acme Reproductions. Advertisement. *Tuff Stuff*, May 1992, p. 73.
All–Star Cards Ltd. Advertisement. *Baseball Hobby News*, Feb. 1982, p. 18A.
Allen Gallery. Advertisement. *Sports Collectors Digest*, Apr. 26, 1985, p. 157.
ARComics, Inc. Advertisement. *Comics Retailer*, Jun. 1993, p. 31.
Armstrong's. Advertisement. *Baseball Cards*, 1986 Annual (Special) Issue, p. 25.
Authentic American Collectibles. Advertisement. *Sports Collectors Digest*, Jan. 29, 1993, p. 214.
Authentic Sports Autographs, Inc. Advertisement. *Baseball Card News*, May 15, 1993, p. 71.
Authentic Verification Association, Inc. Advertisement. *Sports Collectors Digest*, Jun. 26, 1992, p. 225.
B & M Baseball Cards. Advertisement. *Sports Collectors Digest*, Dec. 20, 1985, p. 25.
B & M Baseball Cards. Advertisement. *Baseball Cards*, Apr. 1986, p. 77.
Ball Four Cards. Advertisement. *Sports Collectors Digest*, Jan. 27, 1995, p. 136.
BallQube, Inc. Advertisement. *Sports Collectors Digest*, Jun. 5, 1987, p. 231.
BallQube, Inc. Advertisement. *Baseball Hobby News*, Jun. 1989, p. 48A.
Baseball Archive. Advertisement. *The Trader Speaks*, Mar. 1980, p. 8.
Baseball Card Exchange. Advertisement. *Baseball Hobby News*, Dec. 1984, p. 30.
Baseball Card World. Advertisement. *Sports Collectors Digest*, May 22, 1987, p. 34.
Baseball Collectors Corner. Advertisement. *The Trader Speaks*, Nov. 1982, p. 13.
Baseball Dreamz. Advertisement. *Sports Collectors Digest*, Sep. 16, 1994, p. 133.
Baseball Heroes Foundation. Advertisement. *Sports Collectors Digest*, Mar. 4, 1988, p. 74.
Bat Company. Advertisement. *Sports Collectors Digest*, Jul. 14, 1995, p. 197.
Bay Area Sports Collectables. Advertisement. *Sports Collectors Digest*, Aug. 10, 1985, p. 177.
Best Photos. Advertisement. *Sports Collectors Digest*, May 11, 1984, p. 87.
Big Island Milk Cap Company, and California Milk Cap Company. Advertisement. *Non–Sport Update*, Jul.–Sep. 1993, p. 8.
Big League Collectables. Advertisement. *Baseball Card News*, Sep. 15, 1983, p. 30.
Bill Corcoran. Advertisement. *Sport Collectors Digest*, Nov. 25, 1994, p. 217.
Bill Haber. Advertisement. *The Trader Speaks*, Mar. 1983, p. 20.
Bill Karaman. Advertisement. *Sports Collectors Digest*, Mar. 4, 1988, p. 32.
BKR Corp. Advertisement. *Sports Collectors Digest*, Jul. 14, 1995, p. 204.
Brenn Very. Advertisement. *Sports Collectors Digest*, Mar. 29, 1985, p. 171.
Burl Armstrong. Advertisement. *Baseball Card News*, Feb. 1984, p. 27.
Cardstop. Advertisement. *Sports Collectors Digest*, Feb. 23, 1990, p. 244.
Carl Meyer. Advertisement. *Sports Collectors Digest*, Sep. 27, 1985, p. 38.
Cashion & Record. Advertisement. *Tuff Stuff*, Mar. 1992, p. 54.
Celestial Arts. Advertisement. *The Comic Book Price Guide*, 11th Edition, by Robert M. Overstreet (1981).
Celestial Communications. Advertisement. *The Inside Collector*, May 1995, pp. 24–25.
Centerfield Collectibles. Advertisement. *Sports Collectors Digest*, Apr. 16, 1993, p. 201.
Centerfield Collectibles. Advertisement. *Sports Collectors Digest*, Feb. 3, 1995, p. 15.
Certified Autographs. Advertisement. *Sports Collectors Digest*, Dec. 21, 1984, p. 97.
Certified Baseball Card Service. Advertisement. *Baseball Card News*, Apr. 15, 1988, p. 27.
Clifton J. Sheely Co. Advertisement. *Tuff Stuff*, Nov. 1989, p. 100.
Collectible Resource Group, Inc. Advertisement. *Baseball Card News*, Mar. 1986, p. 73.
Collectible Resource Group, Inc. Advertisement. *Sports Collectors Digest*, Jun. 6, 1986, p. 200.
Collectible Resource Group, Inc. Advertisement. *Sports Collectors Digest*, May 1, 1987, p. 176.
Collector Don's. Advertisement. *Tuff Stuff*, Dec. 1994, p. 129.

Collectors Club. Advertisement. *Baseball Cards,* Aug. 1987, p. 94.

Collector's Dreams. Advertisement. *Baseball Card News,* Feb. 1986, p. 27.

Collector's Dreams. Advertisement. *Baseball Cards,* Apr. 1986, p. 40.

Collectors Palace Gallery. Advertisement. *Sports Collectors Digest,* Jan. 29, 1993, p. 204.

Comic Connection. Advertisement. *Comics Buyer's Guide,* Sep. 10, 1993, p. 82.

Compu–Quote. Advertisement. *Baseball Card News,* Apr. 15, 1988, p. 56.

Cooperstown Bat Co. Advertisement. *Encyclopedia of Sports Memorabilia & Price Guide,* Apr.–May 1995, p. 17.

Cottage Cards. Advertisement. *The Wrapper,* Oct. 1–Nov. 15, 1994, p. 50.

CPG Direct. Advertisement. *Tuff Stuff,* Dec. 1993, p. 99.

CPG Direct. Advertisement. *Sports Collectors Digest,* Nov. 11, 1994, p. 178.

CPG Direct. Advertisement. *Tuff Stuff,* Dec. 1994, pp. 132–133.

Crazy Scondo's House of Cards. Advertisement. *Tuff Stuff,* Dec. 1994, p. 195.

D & D Collect–A–Plate & Sports Memorabilia. Advertisement. *Sports Collectors Digest,* Oct. 20, 1989, p. 204.

Dan Dischley. Advertisement. *The Trader Speaks,* Sep. 1981, pp. 69–71.

Dan Dischley. Advertisement. *The Trader Speaks,* Apr. 1983, p. 47.

Dark Horse Comics. Advertisement. *Comics Buyer's Guide,* Sep. 10, 1993, p. 33.

Dave Rumsey. Advertisement. *The Trader Speaks,* Mar. 1980, p. 77.

David Epstein Sports Collectibles. Advertisement. *Sports Collectors Digest,* Nov. 13, 1992, p. 281.

Decathlon Corporation. Advertisement. *Baseball Hobby News,* Oct. 1984, p. 15A.

Denny Graziano. Advertisement. *Baseball Hobby News,* Aug. 1984, p. 4A.

Destiny International. Advertisement. *Tuff Stuff,* Dec. 1994, p. 70.

Dialogue Marketing Group. Advertisement. *Sports Collectors Digest,* Apr. 16, 1993, p. 84.

Diamond Comic Distributors, Inc. Advertisement. *Comics Retailer,* Jun. 1993, p. 17.

Dick Dobbins. Advertisement. *The Trader Speaks,* Oct. 1979, p. 25.

Diversified Marketing, Inc. Advertisement. *Tuff Stuff,* Dec. 1994, p. 8.

Diversified Marketing, Inc. Advertisement. *Encyclopedia of Sports Memorabilia & Price Guide,* Apr.–May 1995, p. 71.

Doug Averitt, and Dick Patman. Advertisement. *The Trader Speaks,* Jul. 1979, p. 60.

Doug Johnson. Advertisement. *Sports Collectors Digest,* Dec. 1, 1989, p. 56.

Dugout Baseball Card Shop. Advertisement. *Sports Collectors Digest,* Apr. 13, 1984, p. 153.

Ed Taylor's Baseball Dreams. Advertisement. *Sports Collectors Digest,* Oct. 21, 1994, p. 166.

Elite Sports Products, Inc. Advertisement. *Baseball Hobby News,* Mar. 1984, p. 40.

Elmer's Nostalgia, Inc. Advertisement. *Autograph Collector,* Oct. 1993, p. 15.

Emerald City Sports Cards. Advertisement. *Baseball Cards,* Mar. 1992, p. 31.

Enor Sports Products. Advertisement. *Sports Collectors Digest,* Jun. 19, 1992, p. 33.

Everything Baseball Inc. Advertisement. *Sports Collectors Digest,* Sep. 23, 1994, p. 179.

Executive Investments Co. Advertisement. *Sports Collectors Digest,* Jan. 30, 1987, p. 57.

Fielder's Choice Inc. Advertisement. *Tuff Stuff,* Nov. 1993, p. 277.

Fotoball USA Inc. Advertisement. *Tuff Stuff,* Nov. 1989, p. 56.

Fotofamer Statues, Ltd. Advertisement. *Baseball Cards,* Oct. 1987, p. 64.

Future Sports & Memorabilia Inc. Advertisement. *Tuff Stuff,* Dec. 1994, p. 148.

G & M Collectables. Advertisement. *Tuff Stuff,* Mar. 1992, p. 34.

Gary Horner. Advertisement. *The Trader Speaks,* Oct. 1979, p. 18.

Gary Horner. Advertisement. *The Trader Speaks,* Mar. 1980, p. 12.

Gary Horner. Advertisement. *The Trader Speaks,* Sep. 1981, p. 54.

Gateway Stamp Company, Inc. Advertisement. *Baseball Hobby News,* Sep. 1982, p. 35.

Gateway Stamp Company, Inc. Advertisement. *Baseball Card News,* Apr. 1986, p. 27.

Gateway Stamp Company, Inc. Advertisement. *Baseball Card News,* Nov. 10, 1989, p. 9A.

Gino Divetta. Advertisement. *The Trader Speaks,* May 1983, p. 27.

Great American Sports. Advertisement. *Sports Collectors Digest,* Aug. 7, 1992, p. 106.

Greg Tucker. Advertisement. *Sports Collectors Digest,* Oct. 13, 1989, p. 213.

Greg Tucker Autographs. Advertisement. *Sports Collectors Digest,* Sep. 16, 1994, p. 82.

Hesh Morgan. Advertisement. *Sports Collectors Digest,* Apr. 11, 1986, p. 280.

Historic Limited Editions. Advertisement. *The Trader Speaks,* Apr. 1983, p. 43.

Historic Limited Editions. Advertisement. *Sports Collectors Digest,* May 25, 1985, p. 195.

Historic Limited Editions. Advertisement. *Baseball Cards,* Apr. 1988, p. 32.

Historic Limited Editions. Advertisement. *Baseball Cards,* Aug. 1988, p. 81.

Historic Limited Editions. Advertisement. *Baseball Hobby News,* Jun. 1989, p. 48A.

Horse Star Cards Inc. Advertisement. *Tuff Stuff,* Mar. 1992, p. 26.

House of Cards. Advertisement. *Sports Collectors Digest,* Jan. 1986, p. 202.

Howard's Coin Shop. Advertisement. *Baseball Hobby News,* Nov. 1984, p. 15A.

Howard's Coin Shop. Advertisement. *Sports Collector's Digest,* Feb. 1, 1985, p. 80.

Howard's Coin Shop. Advertisement. *Sports Collector's Digest,* Jan. 31, 1986, pp. 125–128.

Howard's Sports Collectibles. *Baseball Card Collecting . . . An American Tradition!* (advertising catalog, 1988).

International Collectors Society. Advertisement. *Newsday,* Feb. 14, 1995, p. B19.

Jack Smalling. Advertisement. *The Trader Speaks,* Jul. 1981, p. 52.

JC's Sports Connection. Advertisement. *Tuff Stuff,* Jun. 1992, p. 33.
JJ Sports Collectibles. Advertisement. *Baseball Hobby News,* Mar. 1990, p. 15.
John Jodauga Productions. Advertisement. *Baseball Hobby News,* Mar. 1992, p. 43A.
John L. Raybin. Advertisement. *Sports Collectors Digest,* Oct. 20, 1989, p. 66.
Joseph Associates. Advertisement. *Baseball Hobby News,* Jun. 1989, p. 51.
Joseph Associates. Advertisement. *Baseball Hobby News,* Mar. 1990, p. 24.
Joseph Savitsky. Advertisement. *Baseball Hobby News,* Mar. 1982, p. 29A.
Kondritz Sports Productions. Advertisement. *Baseball Cards,* Mar. 1988, p. 57.
Kornersaver Kollector. Advertisement. *Tuff Stuff,* Jun. 1993, p. 54.
Liberty Bell Products. Advertisement. *Non–Sport Update,* Oct. 1991, pp. 38–39.
Lime Rock International, Inc. Advertisement. *Tuff Stuff,* Mar. 1992, p. 140.
Lime Rock International, Inc. Advertisement. *Sports Collectors Digest,* Jun. 19, 1992, p. 92.
Limited Edition Stadiums. Advertisement. *The Trader Speaks,* Oct. 1982, p. 19.
M.B. Galleries. Advertisement. *Baseball Hobby News,* Sep. 1983, p. 46.
M. Phillips, Ltd. Advertisement. *Sports Collectors Digest,* Apr. 16, 1993, p. 205.
Mail Order Concepts, Inc. *Spring Into The Madness, Mail Order Concept Spring Liquidation Catalog* (advertising catalog, 1995).
Major League Entertainment. Advertisement. *Non–Sport Update,* Oct. 1991, p. 23.
Mark Jordan. Advertisement. *Sports Collectors Digest,* Sep. 29, 1989, p. 159.
Mark Jordan. Advertisement. *Sports Collectors Digest,* Dec. 1, 1989, p. 112.
Mark Jordan Inc. Advertisement. *Tuff Stuff,* Nov. 1992, p. 133.
Michael Bertolini. Advertisement. *Baseball Hobby News,* Feb. 1982, p. 28A.
Mike "Mac" McDonald. Advertisement. *Sports Collectors Digest,* May 22, 1987, p. 96.
Military Collectible Shop, Ltd. Advertisement. *Tuff Stuff,* Mar. 1992, p. 153.
Mint Finder. Advertisement. *Sports Collectors Digest,* May 1, 1987, p. 131.
MJB Holographics. Advertisement. *Tuff Stuff,* Aug. 1992, p. 2.
Moody's. Advertisement. *Baseball Cards,* Dec. 1991, p. 173.
Moody's. Advertisement. *Baseball Cards,* Feb. 1992, p. 123.
MS Data Base Solutions. Advertisement. *Trading Cards,* Nov. 1991, p. 86.
MVP Autographs & Sports Memorabilia. Advertisement. *Sports Collectors Digest,* Sep. 16, 1994, p. 171.
Nate's Autographs. Advertisement. *Sports Collectors Digest,* Nov. 13, 1992, p. 279.
P.M. Antiques. Advertisement. *Baseball Card News,* Nov. 15, 1983, p. 62.
P.M. Antiques & Collectibles. Advertisement. *Baseball Hobby News,* May 1983, p. 27A.
P.M. Antiques & Collectibles. Advertisement. *Baseball Card News,* May 15, 1983, p. 70.
P.M. Antiques & Collectables. Advertisement. *Sports Collectors Digest,* Jul. 20, 1984, p. 141.
Pack Sports Bronzes, Inc. Advertisement. *Baseball Hobby News,* Mar. 1990, p. 58.
Paul Kinzer (Blue Chip Sports Collectibles). Advertisement. *Sports Collectors Digest,* Jun. 19, 1992, p. 189.
Perma–Graphics. Advertisement. *Baseball Cards,* Spring 1982, p. 57.
Perma–Graphics. Advertisement. *Baseball Hobby News,* May 1983, p. 11A.
Personalized Photo. Advertisement. *Sports Collectors Digest,* Sep. 27, 1985, p. 225.
Photo's. Advertisement. *Baseball Hobby News,* Jul. 1982, p. 28A.
Powell Associates. Advertisement. *Sports Collectors Digest,* Nov. 11, 1994, p. 173.
Primetime Press. Advertisement. *Non–Sport Update,* Jul.–Sep. 1993, p. 56.
Pro Insignia. Advertisement. *Baseball Cards,* Oct. 1988, p. 33.
Professional Sports Authenticator. Advertisement. *Sports Collectors Digest,* Jun. 19, 1992, p. 132.
R & R Enterprises. Advertisement. *Baseball Hobby News,* Jun. 1982, p. 53.
R & R Enterprises. Advertisement. *Sports Collectors Digest,* Aug. 16, 1985, p. 133.
Ralph Piticchio. Advertisement. *Sports Collectors Digest,* Sep. 27, 1985, p. 177.
Ralph Paticchio. Advertisement. *Baseball Hobby News,* Jun. 1989, p. 20.
Ralph Paticchio. Advertisement. *Sports Collectors Digest,* Oct. 13, 1989, p. 176.
Randy Whalen. Advertisement. *The Trader Speaks,* Jul. 1981, p. 36.
Rare Sports Card Gallery. Advertisement. *Sports Collectors Digest,* Nov. 11, 1994, p. 221.
Rich Altman. Advertisement. *Sports Collectors Digest,* Nov. 11, 1994, p. 210.
Richard Duglin. Advertisement. *The Trader Speaks,* Jul. 1983, p. 46.
Richard J. Binder. Advertisement. *Sports Collectors Digest,* Mar. 29, 1985, p. 79.
Rick Mattel. Advertisement. *Sports Collectors Digest,* Sep. 23, 1994, p. 153.
Robert J. McDowell. Advertisement. *Baseball Card News,* Feb. 1984, p. 61.
Robert Stephen Simon Studios. Advertisement. *Sports Collectors Digest,* Nov. 23, 1984, p. 95.
Ron Gordon. Advertisement. *Sports Collectors Digest,* Oct. 13, 1989, p. 158.
Ron Lewis, Advertisement. *Sports Collectors Digest,* Apr. 16, 1993, p. 102.
Rookies Unlimited. Advertisement. *Sports Digest,* Nov. 13, 1992, p. 230.
Ryan Twist Gallery. Advertisement. *Baseball Cards,* Jul. 1987, p. 84.
Ryan Twist Gallery. Advertisement. *Baseball Cards,* Aug. 1988, p. 80.
Ryan Twist Gallery. Advertisement. *Baseball Cards,* Sep. 1988, p. 56.
Ryan Twist Gallery. Advertisement. *Baseball Hobby News,* Jun. 1989, p. 48A.

Ryan Twist Gallery. Advertisement. *Sports Collectors Digest,* Oct. 13, 1989, p. 221.
Ryan Twist Gallery. Advertisement. *Tuff Stuff,* Nov. 1989, p. 45.
Ryan Twist Gallery. Advertisement. *Sports Collectors Digest,* Jun. 19, 1992, p. 183.
Rycard Productions Inc. Advertisement. *Sports Collectors Digest,* Nov. 13, 1992, p. 265.
SAM, Inc. Advertisement *Encyclopedia of Sports Memorabilia & Price Guide,* Dec. 1994/Jan. 1995, p. 81.
Schenker Promotions. Advertisement. *Tuff Stuff,* Jun. 1993, p. 168.
Score. Advertisement. *The Sports Card & Value Line Review,* Feb. 1992, outside back cover.
Seth Vogel. Advertisement. *Baseball Hobby News,* May 1982, p. 53.
Signature Bats, L.P. Advertisement. *Sports Collectors Digest,* Jul. 14, 1995, p. 35.
Signature Rookies. Advertisement. *Encyclopedia of Sports Memorabilia & Price Guide,* Apr.–May 1995, p. 2.
Slammers Direct. Advertisement. *Collector Caps Price Guide,* Summer 1995, p. 70.
Spectrum Fine Art Gallery. Advertisement. *Baseball Hobby News,* Oct. 1982, p. 36.
Spectrum Group, Inc. Advertisement. *Sports Collectors Digest,* Jan. 29, 1993, p. 192.
Sports Alley Trading Cards & Memorabilia. Advertisement. *Tuff Stuff,* Feb. 1994, p. 37.
Sports Alley Trading Cards & Memorabilia. Advertisement. *Tuff Stuff,* Dec. 1994, p. 45.
Sports Collectibles. Advertisement. *Baseball Hobby News,* Nov. 1983, p. 21A.
Sports Impressions. Advertisement. *Sports Collectors Digest,* Feb. 28, 1986, p. 57.
Sports Impressions. Advertisement. *Sports Collectors Digest,* Apr. 11, 1986, p. 10.
Sports Impressions. Advertisement. *Baseball Cards,* Nov. 1989, p. 101.
Sports Korner. Advertisement. *Baseball Hobby News,* Mar. 1990, p. 40A.
Sportstar Publishing Ltd. Advertisement. *Sports Collectors Digest,* Nov. 13, 1992, p. 258.
Sportsworld. Advertisement. *Sports Collectors Digest,* Jun. 8, 1984, p. 177.
Sportsworld. Advertisement. *Baseball Card News,* Jul. 1984, p. 31.
SSK America, Inc. Advertisement. *Sports Collectors Digest,* Jun. 5, 1987, p. 209.
Stacks Of Plaques. Advertisement. *Baseball Cards,* Apr. 1986, p. 31.
Stampsmith Shop. Advertisement. *Baseball Card News,* Jul. 15, 1983, p. 32.
Starsearch Autographs. Advertisement. *Sports Collectors Digest,* Jul. 5, 1985, p. 93.
Step Up To The Plate. Advertisement. *Encyclopedia of Sports Memorabilia & Price Guide,* Dec. 1994/Jan. 1995, p. 83.
Steve Reyes. Advertisement. *Baseball Hobby News,* Apr. 1982, p. 30A.
Stuart Collectibles. Advertisement. *Tuff Stuff,* Jan. 1993, p. 171.
Sue Bogyo. Advertisement. *Sports Collectors Digest,* Apr. 26, 1985, p. 160.
Sunshine Minting Inc. Advertisement. *Collector Caps Price Guide,* Summer 1995, p. 74.
Supercard. Advertisement. *Comic Buyer's Guide,* Oct. 23, 1992, p. 71.
T.K. Sports. Advertisement. *Sports Collectors Digest,* Jun. 6, 1986, p. 259.
T.N.T. Collectibles. Advertisement. *Sports Collectors Digest,* Dec. 1, 1989, p. 192.
Ted Elmo. Advertisement. *Sports Collectors Digest,* Oct. 12, 1984, pp. 44–45.
The Art Consortium. Advertisement. *Comics Retailer,* Jun. 1993, p. 67.
The Baseball Park. Advertisement. *Baseball Hobby News,* Jun. 1989, p. 69A.
The Collector's Corner. Advertisement. *Sports Collectors Digest,* Jan. 30, 1987, p. 227.
The Dugout. Advertisement. *The Trader Speaks,* Oct. 1982, p. 42.
The Highland Mint. Advertisement. *Sports Collectors Digest,* Aug. 19, 1994, p. 81.
The Hoffman Mint. Advertisement. *Collector Caps Price Guide,* Summer 1995, p. 58.
The National Pastime. Advertisement. *Sports Collectors Digest,* Apr. 26, 1985, p. 138.
The Political Gallery. Advertisement. *Sports Collectors Digest,* Jul. 14, 1995, p. 198.
The Rarities Group Inc. Advertisement. *Baseball Hobby News,* Aug. 1989, p. 61.
The Score Board, Inc. Advertisement. *Tuff Stuff,* Oct. 1992, p. 125.
The Score Board, Inc. Advertisement. *Sports Collectors Digest,* Jan. 29, 1993, p. 8.
The Score Board, Inc. Advertisement. *Trading Cards,* Jan. 1994, p. 13.
The Score Board, Inc. Advertisement. *Sports Collectors Digest,* Sep. 9, 1994, p. 8.
The Shoe Box. Advertisement. *Baseball Hobby News,* Oct. 1984, p. 12A.
The Sports Alley. Advertisement. *Sports Collectors Digest,* Mar. 30, 1984, p. 18.
The Sports Collection. Advertisement. *Sports Collectors Digest,* Apr. 26, 1985, p. 140.
The Sports Collectors Corner. Advertisement. *Baseball Card News,* Sep. 15, 1983, p. 52.
The Star Company. Advertisement. *Baseball Card News,* Nov. 1984, p. 67.
Thrill Of Victory. Advertisement. *Baseball Hobby News,* Apr. 1985, p. 40.
Thrill Of Victory. Advertisement. *Sports Collectors Digest,* Jan. 31, 1986, p. 181.
Thrill Of Victory. Advertisement. *Tuff Stuff,* Oct. 1993, pp. 159–160.
Thrill Of Victory. Advertisement. *Tuff Stuff,* Dec. 1994, pp. 150–151.
Tony Carrafiell. Advertisement. *The Trader Speaks,* Sep. 1981, p. 17.
Traks Race Products. Advertisement. *Tuff Stuff,* Aug. 1992, p. 43.
Triple Crown Sports Collectibles. Advertisement. *Sports Collectors Digest,* Dec. 1, 1989, p. 51.
Upper Deck Authenticated, Ltd. *Upper Deck Authenticated Authentic Signed Sports Collectibles,* Collectors' Edition, No. 6, Holiday 1993 (advertising catalog).
Wayne Miller Cards. Advertisement. *Sports Collectors Digest,* Feb. 3, 1984, p. 141.
Wayne Miller Cards. Advertisement. *Baseball Hobby News,* Jun. 1984, p. 32.

Wayne Miller Cards. Advertisement. *Sports Collectors Digest,* Mar. 1985, p. 65.
West Coast Sports Cards. Advertisement. *Baseball Cards,* May 1990, p. 135.
Xanadu Comics And Collectables, Inc. Advertisement. *The Comic Book Price Guide, 11th Edition,* by Robert M. Overstreet (1981).
Yesterdays Legends. Advertisement. *Sports Collectors Digest,* Jul. 14, 1995, p. 188.
Z Comic Cap Corp. Advertisement. *Collector Caps Price Guide,* Summer 1995, p. 7.
1887 Allen & Ginter Baseball Card, Timothy Keefe.
1952 Bowman U.S. Presidents Trading Card, #3 George Washington.
1981 Donruss Golf Card, #1 Tom Watson.
1933 Flatbush Gum Co. Noah's Ark Trading Card, Gorilla.
1981 Fleer Star Sticker Baseball Card, #74 Pete Rose.
1940 Gum Incorporated Superman Trading Card, #47 Horror Beneath The Sea.
1955 Johnston Cookies Baseball Card, Chuck Tanner.
1893 Just So Tobacco Baseball Card, F.W. Boyd.
1984 Nestle Baseball Card, #357 Ron Cey.
1933–34 O–Pee–Chee Hockey Card, #34 Charley Conacher.
1978–79 O–Pee–Chee Hockey Card, #100 Phil Esposito.
1982 On Deck Cookies Baseball Card, Cecil Cooper.
1952 Topps Baseball Card, #311 Mickey Mantle.
1954–55 Topps Hockey Card, #54 Bill Mosienko.
1957 Topps Football Card, #28 Lou Groza.
1964 Topps Outer Limits Trading Card, #15 The Brainless Glob.
1965 Topps Embossed Baseball Card, #8 Sandy Koufax.
1968 Topps Land of the Giants Trading Card, #13 Frightened.
1969–70 Topps Basketball Card, #43 Bill Bradley.
1970 Topps Super Glossy Football Card, #15 Fran Tarkenton.
1974 Topps Baseball Card, #283 Mike Schmidt.
1982 Topps Baseball Card, #210 Keith Hernandez.
1982 Topps E.T. Trading Card, #86 Friendly Face From Space!
1986 Topps Wax Box Baseball Card, Fernando Valenzuela.
1988 Upper Deck Promo Baseball Card, #700 Wally Joyner.
1989 Upper Deck Baseball Card, #612 Keith Hernandez.
1990 Upper Deck Baseball Card, #567 Robin Yount.
1991 Upper Deck Baseball Card, #337 Dave Winfield.

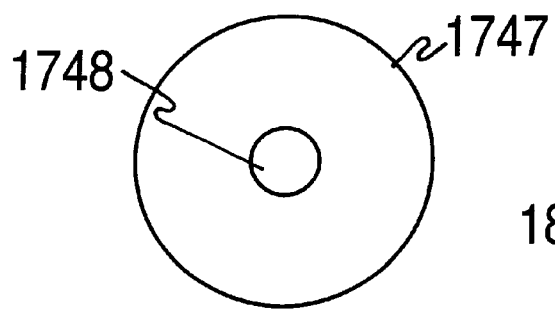
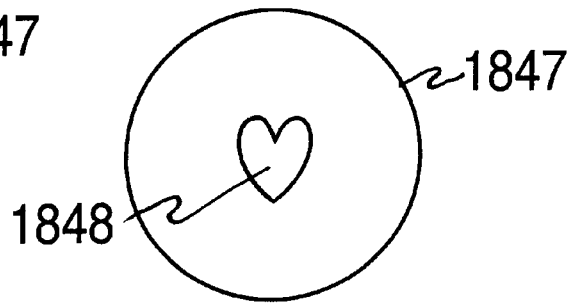
FIG. 17    FIG. 18
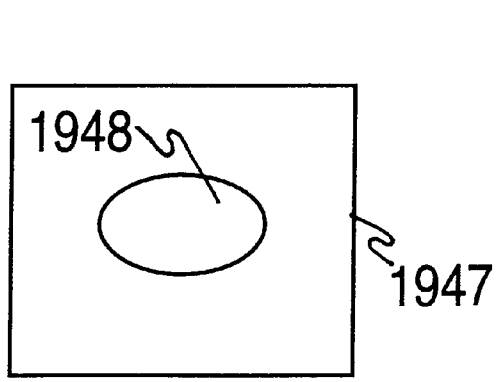
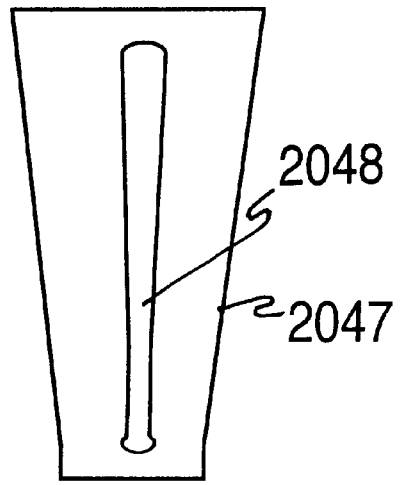
FIG. 19
FIG. 20
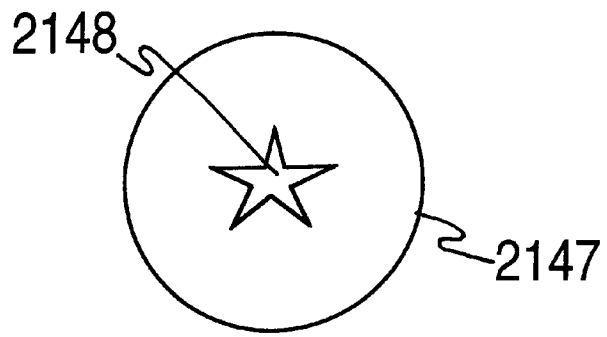
FIG. 21

MEMORABILIA ARTICLES HAVING INTEGRAL COLLECTABLE ATTRACTIVENESS ATTRIBUTES

CROSS-REFERENCE TO RELATED APPLICATIONS

This application is a continuation-in-part of co-pending U.S. application Ser. No. 08/349,751 (filed Dec. 5, 1994), which is a continuation-in-part of abandoned U.S. application Ser. No. 08/167,647 (filed Dec. 14, 1993).

FIELD OF THE INVENTION

This invention relates to the field of memorabilia articles and, more particularly, to articles intentionally created as collector-targeted memorabilia articles (including sports-related, nonsports-related and limited edition memorabilia articles) bearing preferred-personality-created attributes (including genuine autographs), facsimile attributes (including facsimile autographs), and other attributes incorporated as integral (intrinsic) attribute means for creating and/or enhancing attractiveness to collectors of memorabilia articles.

BACKGROUND OF THE INVENTION

Intentional integral affixing of a preferred-personality-created attribute to a base article is widely recognized by memorabilia dealers and collectors as a way to add collectible value to the article. Such intentional affixing involves forming the preferred-personality-created attribute as an integral attribute means for creating and/or enhancing attractiveness of the article to collectors of memorabilia articles. Indicating or implying that the article is of a limited edition production is widely recognized by dealers and collectors as a way to further increase collectible value of the article.

By merely forming and affixing a preferred-personality-created attribute on a base article of relatively insubstantial worth, a preferred personality (a sports personality, an entertainment personality, a political personality, or a like personality) may transform the base article into a memorabilia article of substantial value. In the present marketplace, the predominant preferred-personality-created integral collectible attractiveness attribute is the genuine autograph (an autograph personally created by a preferred personality and not a facsimile thereof).

The genuine autograph of the memorabilia article created to appeal to collectors should not be confused with the non-collector-targeted utilitarian signature of a personal check, real-estate-transfer document, employment contract, or like instrument created for a utilitarian purpose without intent to create attractiveness to collectors. Likewise, no other collector-targeted attribute should be regarded as synonymous with any indicium or marking substantially created for a non-collector-oriented, utilitarian use.

In the current marketplace, collectors are offered genuinely autographed memorabilia articles encompassing a considerable diversity of base articles, including: items originally manufactured substantially to appeal to collectors (for example, trading cards, fine art lithographic prints, hall-of-fame memorabilia items, and commemorative philatelic items); items originally manufactured as sporting equipment (for example, baseballs, baseball bats, footballs, basketballs, hockey pucks, and sports uniforms); and items originally manufactured for non-collector-targeted utilitarian purposes (for example, 3-by-5 inch index cards and general news periodicals).

Thus, collectors are given a very diverse assortment of kinds of base articles from which to choose but are largely restricted to only one major kind of preferred-personality-created attribute: the genuine autograph. There is a need to give collectors greater choice by providing at least a second major kind of preferred-personality-created integral collectible attractiveness attribute. The availability of a second major kind of preferred-personality-created attribute would make possible the manufacture of a significant diversity of memorabilia articles heretofore unknown.

The background art encompasses affixing certain other attributes to base articles. Among these attributes are holograms, offset-printed identification number indicia, and facsimile autographs. Such kinds of attributes are not regarded as preferred-personality-created attributes and generally do not bring as much collectible attractiveness and collectible value to articles as preferred-personality-created attributes.

The power of a preferred-personality-created attribute to increase the value of a base article is typically exponentially greater than that of a hologram or like attribute not created by a preferred personality. For example, the 15-cent high value (*Beckett Baseball Card Monthly*, September 1994, page 58) of the hologram-bearing 1992 Upper Deck Extended Dave Winfield Baseball Card is increased more than 100-fold to $19.00 (The Score Board, Inc., Advertisement, *Sports Collectors Digest*, Sep. 9, 1994, page 8) by merely affixing thereto a preferred-personality-created attribute in the form of a genuine autograph. This is a definitive example of the failure of a hologram to bring to an article even one percent of the value conferred by affixing a major preferred-personality-created attribute.

One of the biggest problems faced by collectors is determining whether or not the script-written name of a preferred personality on an article is a genuine autograph. The quantity of fraudulently autographed items in the present marketplace is mindboggling. For example, a television interview with a person who had been convicted of selling items bearing counterfeit autographs revealed that this one person had sold "more than 75,000 fake signatures" (Zachary Reid, "A Closer Look: The Score Board Cracking Down On Fake Autographs," *Tuff Stuff*, April 1993, pages 27–28). The magnitude of the problem caused by items bearing bogus autographs has become so intolerable that legislation has been initiated in a number of states to legally require a letter of authenticity for each sale of an item bearing an autograph (Scott Newman, "Faking The Romance: Fraud And Counterfeiting. Few People In The Memorabilia Industry Want To Talk About It. But That's The Only Way To Correct It," *Tuff Stuff*, February 1993, pages 116–118).

Fraudulent autographs are often produced by counterfeiters intending to sell these imitations to unsuspecting customers. This intentional counterfeiting for illicit profit is not the only way through which bogus autographs enter the memorabilia marketplace. Many sports players are overwhelmed by requests for autographs from fans and other collectors. To meet this heavy demand, a number of players resort to using ghost writers, autopenning machines and rubber stamps to affix imitation autographs to items. Usually such player-authorized imitations are not made with any intent by the players to deceive fans for illicit profit. In fact, such imitation autographs are normally distributed free to fans, at a financial cost to a player or the player's team, resulting in a loss, not a profit. Nevertheless, despite the goodwill intended by this player-authorized creation of imitations, these fake autographs are substantially just as bogus and worthless to collectors as the fraudulent autographs made for illicit profit by unauthorized counterfeiters.

Flooding the marketplace are sports-related autographed articles that contain nothing incorporated as parts of the articles to authenticate the genuineness of the autographs. The average collector or investor is often left with no meaningful basis on which to judge the authenticity of the autograph on a purchased article other than the "good faith" of the selling dealer in a marketplace where many dealers have dubious reputations and where distrust abounds. Collectors who invest in such articles frequently find that these cannot readily be resold to dealers because of the nearly ever-present distrust of autographed items.

To overcome the widespread worries of investors and other collectors about bogus autographs, a number of memorabilia dealers and companies have produced devices to assure collectors of the genuineness of autographs being offered. Most of the articles supposedly authenticated under this background art are associated with "extrinsic devices" (devices physically separate from the involved memorabilia articles).

A particularly prevalent form of extrinsic device is the certificate-of-authenticity (a certificate or letter guaranteeing the authenticity of the involved autograph and/or article). A certificate-of-authenticity may be created before an autographed article is sold to a collector, at the time the article is acquired by the collector, or after the article has been acquired by the collector. A certificate-of-authenticity may be based on hindsight "authentication" by a handwriting expert years after the creation of an autograph. Such hindsight "authentication," at best, reflects expert or educated opinion and not witness-based authentication. A certificate-of-authenticity may be notarized (Richard Albersheim, "The Autograph Report: What's Selling And Alternatives To Card Shows," *Tuff Stuff*, November 1993, page 139).

The limited value of a certificate-of-authenticity or like device is well recognized by experts in the field of sports memorabilia. Such certificates are too often of little or no value in protecting collectors from con-artists peddling fraudulently autographed items (Mike Breeden, Scott Gregg, Michael Litos, Dennis Madigan, and Jim Warren II, "Certificates Of Authenticity, Are Two Signatures Worth More Than One?," *Tuff Stuff*, February 1994, page 162; Jim Hawkins, "Eye Of The Hawk: Some Aren't Worth Paper They're Printed On, Certificate Of Authenticity Only As Good As Issuer's Reputation," *Sports Collectors Digest*, Oct. 21, 1994, page 24; Terry Melia, "Finding The Comfort Zone, Are Certificates Of Authenticity Worth Even The Pieces Of Paper They're Printed On?," *Encyclopedia of Sports Memorabilia & Price Guide*, December 1994/ January 1995, pages 8–10).

That the written contents of a certificate-of-authenticity are not physically integral with the autographed article being authenticated allows easy disassociation of the critical authentication data from the article. Such a certificate-of-authenticity may become lost or become associated, by accident or fraudulent action, with a bogusly autographed article.

The authentication system of Molee et al. (U.S. Pat. No. 5,267,756) includes a kind of certificate-of-authenticity. Molee et al. teach affixing a first hologram with a unique code number to an article and a second hologram with the same unique code number to a certificate-of-authenticity. Molee et al. further teach a registration "hotline" entity having a master record or list containing the unique code number and information on the article to which the number applies. The system of Molee et al. further includes extrinsic means for a purchaser to register the article by mail or telephone with the entity. These extrinsic means allow a customer to later confirm information about the article through a registration "hotline."

The certificate-of-authenticity of Molee et al. overcomes some of the problems inherent in other certificates-of-authenticity of the background art. However, Molee et al. fail to provide a less cumbersome way to authenticate an autograph. In fact, Molee et al. add cumbersomeness and remoteness to the authentication process by introducing customer communication with a registration "hotline" entity. If the entity eventually shuts down its "hotline" or goes out-of-business, a customer may be left with no way to gain access to the master record or list. The system of Molee et al. is excessively dependent on authentication means extrinsic from the article being authenticated.

Although seemingly recognizing the integral collectible enhancement power of the genuine autograph, Molee et al. fail to present a second major kind of preferred-personality-created integral collectible attractiveness attribute.

The value of the hologram of Molee et al. is in its function as an authentication device substantially dependent on the continuing existence and availability of such extrinsic devices as the certificate-of-authenticity and master record or list.

Molee et al. teach away from comprehensively self-authenticating memorabilia articles having integral authentication attribute means for holding the detailed (comprehensive) authentication data printed on their certificate-of-authenticity and stored in their master record or list.

The prior art clearly emphasizes the use of extrinsic devices to authenticate the predominant kind of preferred-personality-created integral collectible attractiveness attribute (the genuine autograph).

The prior art shows the failure of those of ordinary skill in the art to recognize the need for a non-autographic, integral attribute having the potential to function at, near or above the level of the genuine autograph as a convenient, expeditious and economical preferred-personality-created attribute means for making articles substantially more attractive to memorabilia collectors.

The prior art shows the failure of those of ordinary skill in the art to recognize the need for a method of producing a memorabilia article including two major kinds of preferred-personality-created attributes (the genuine autograph and a non-autographic attribute) capable of synergistically functioning together as means for substantially increasing attractiveness to memorabilia collectors.

The prior art shows the failure of those of ordinary skill in the art to recognize the need for a second major kind of preferred-personality-created attribute capable of fulfilling the role of a non-autographic memorial marking or indicium having an appeal to memorabilia collectors substantially greater than the appeal of a hologram or like device.

The prior art shows the failure of those of ordinary skill in the art to recognize the need for a method of producing a comprehensively self-authenticating memorabilia article having integral authentication attributes directly providing detailed authentication data to a collector viewing the article.

Some notable preferred personalities have significantly reduced or substantially complete loss of ability to create and affix a preferred-personality-created attribute in the form of a legible and consistent handwritten autograph. Such notable preferred personalities suffer from paralysis of limbs, limitation of manual locomotion, blindness, and other handicaps resulting from diabetes, strokes, severe arthritis, disabling accidents, and like causes.

The problems resulting from writing-handicapped preferred personalities being unable to meet the demands of fans and other collectors for genuine autographs are well recognized by memorabilia experts (Mark A. Baker, *Baseball Autograph Handbook*, First Edition, 1990; Mark A. Baker, *Baseball Autograph Handbook*, Second Edition, 1991; Scott Crowder, "In The World Of Sports," *Autograph Collector*, October 1993, pages 58–59; Dave Miedema, "Up Autograph Alley: Hall Of Famers Make Autograph News," *Sports Collectors Digest*, Jan. 30, 1987, pages 176, 184 & 192; Dave Miedema, "Autographs: Unhealthy, Health Problems Limit The Appearances Of Older Hall Of Famers," *Baseball Cards*, October 1987, pages 26 & 28; Dave Miedema, "Autographs: Regular Guys, These Hall Of Famers Are Pretty Good About Their Autographs," *Baseball Cards*, November 1987, pages 18 & 20).

Despite these well-known problems facing writing-handicapped preferred personalities, those of ordinary skill in the prior art have not offered substantial remedial inventions.

The prior art shows the failure of those of ordinary skill in the art to teach a major kind of preferred-personality-created integral collectible attractiveness attribute which may be conveniently created and affixed by a handwriting-disabled preferred personality.

Certain kinds of base articles have no surfaces of sufficient size to allow a preferred personality, especially one having a lengthy signature, to conveniently and legibly affix normal renditions of his or her genuine autograph. Golf balls and standard-sized milkcaps are examples of such base articles having limited writing space. Furthermore, collectors often favor the placement or restriction of a genuine autograph or other attribute to a specific surface region of an article (for example, collectors generally desire that a preferred personality creating a single-autograph baseball affix his or her autograph to the "sweet spot" of the ball).

Therefore, a need clearly exists for a second major kind of preferred-personality-created integral collectible attractiveness attribute that may be conveniently and legibly affixed to base articles having limited surface areas. And a need clearly exists for a method to restrict the placement of a preferred-personality-created integral collectible attractiveness attribute to a predetermined portion of a base article. The prior art demonstrates those of ordinary skill in the art have failed to adequately address these needs.

The prior art substantially limits collector choice to articles comprising only one major kind of preferred-personality-created integral collectible attractiveness attribute. And the background art substantially limits collector choice to an availability of comprehensive authentication devices that are extrinsic, easily disassociated from memorablia articles, too frequently dubious, often remote, and/or sometimes dependent on an authentication entity remaining solvent in business.

Those of ordinary skill in the prior art have not addressed the need for a second major kind of preferred-personality-created integral collectible attractiveness attribute suitable as a: (1) means for integrally creating and/or enhancing collectible attractiveness of an article to memorabilia collectors; (2) means for integrally and synergistically interacting with a genuine autograph on an article to enhance attractiveness of the article to memorabilia collectors; (3) means for a handwriting-disabled preferred personality to affix conveniently and legibly to an article as an attribute attractive to memorabilia collectors; (4) means for a preferred personality to affix conveniently and legibly, as an attribute attractive to memorabilia collectors, to an article lacking a surface region sufficient for the placement of a normal genuine autograph; and (5) means for a preferred personality to affix and substantially cover a predetermined, discretely-bounded surface area of an article as a personally created marking attractive to memorabilia collectors.

Those of ordinary skill in the prior art have also substantially failed to address the need for widespread use of a memorabilia-collector-targeted integral comprehensive authentication attribute as a means for integrally and comprehensively authenticating one or more preferred-personality-created attributes on an intentionally-created memorabilia article so as to make the article more appealing to memorabilia collectors. This failure of those of ordinary skill in the prior art has resulted in the substantial lack of a diversity of collector-targeted, comprehensively self-authenticating memorabilia articles in the marketplace.

The present invention overcomes the above-described deficiencies of the prior art and fulfills the above-described needs not addressed by those of ordinary skill in the prior art.

OBJECTS OF THE INVENTION

One object of the present invention is to provide a second major kind of preferred-personality-created integral collectible attractiveness attribute as a preferred-personality-created attribute means for intentionally creating and/or enhancing attractiveness of an article to memorabilia collectors.

Another object is to provide embodiments of collector-targeted memorabilia articles each of which comprises both the genuine autograph and the second major kind of preferred-personality-created integral collectible attractiveness attribute, allowing these two attributes to synergistically interact with each other to enhance attractiveness of the article to memorabilia collectors.

A further object is to provide the second major kind of preferred-personality-created integral collectible attractiveness attribute as an integral attribute capable of fulfilling the role of a non-autographic memorial marking or indicium having an appeal to memorabilia collectors substantially greater than the appeal of a hologram or like device affixed merely as an authentication or anti-counterfeiting feature.

Another object is to provide collector-targeted comprehensively self-authenticating memorabilia articles having integral authentication attributes directly providing detailed authentication data to collectors viewing the articles.

Still another object is to provide intrinsic and comprehensive authentication attributes so integrally affixed as parts of the single unified body of tangible material comprising a memorabilia article that these attributes cannot readily be accidentally or intentionally disassociated from the article.

Yet another object is to provide intrinsic and comprehensive authentication attributes that are of sufficient scope to bring the persons certifying the authenticity of a preferred-personality-created integral collectible attractiveness attribute on a memorabilia article substantially under laws relating to oaths, notarizations and the like.

Still another object is to provide comprehensive authentication without the problems inherent in an authentication system excessively dependent on the survival of a registration "hotline" subject to business conditions and decisions causing registration operations to cease.

Yet another object is to provide a major preferred-personality-created integral collectible attractiveness attribute which may be conveniently, legibly and consistently created and affixed by-handwriting-disabled preferred personalities.

A still further object is to provide a method for a preferred personality to affix and substantially cover a predetermined, discretely-bounded section of a surface of an article with a marking as a personally created attribute attractive to memorabilia collectors.

And a yet further object is to provide collectors with a wide diversity of previously unavailable limited edition memorabilia articles encompassing a variety of integral collectible attractiveness attributes.

SUMMARY OF THE INVENTION

According to the present invention, the foregoing and other objects and advantages are attained by the method of this invention producing a new selection of integral collectible attractiveness attributes for use on a large variety of individual base articles so as to allow the creation of a great diversity of new kinds of collector-targeted memorabilia articles.

In accordance with aspects of the method of this invention, an integral collectible attractiveness attribute set is affixed to a selected base article to enhance and/or create attractiveness of the article to memorabilia collectors. This attribute set minimally comprises a requisite integral collectible attractiveness attribute of a selected preferred personality in the form of: a genuine autograph or genuine fingerprint personally created by the preferred personality, or a facsimile fingerprint of the preferred personality. Each integral collectible attractiveness attribute affixed to a base article is a member of the integral collectible attractiveness attribute set of the article. Each memorabilia article created within the scope of the present invention comprises an integral collectible attractiveness attribute set minimally including a genuine fingerprint, or a genuine autograph and at least one additional attribute, or a facsimile fingerprint.

The selected preferred personality is an active professional athlete, a retired professional athlete, a sports hall-of-fame member, a notable amateur athlete, a notable sports-related personality, an entertainment personality, a mass-media personality, a notable academic personality, a notable author, a notable political personality, a heroic personality, a public figure, a famous personality, a comicbook-related personality, an artistic personality, or a like personality.

The base article may be an item originally manufactured for a substantially non-collector-targeted utilitarian purpose, an item originally manufactured as an item of sporting equipment, an item originally created as a memorabilia item bearing features intended to be attractive to memorabilia collectors, or an item originally created to serve as a base article of an embodiment of the present invention. The base article may be related or unrelated to a sport. In its pre-existing state, the base article may be with or without collectible value and/or attractiveness to memorabilia collectors.

In accordance with further aspects of the method of this invention, if the requisite preferred-personality-created integral collectible attractiveness attribute of the selected preferred personality being affixed to the base article comprises a genuine fingerprint, a finger of the preferred personality touches a surface during the formation of the genuine fingerprint. One or more fingerprint-forming substances are interfaced with the finger and the surface during the touching so as to transfer detailed imaging of skin patterns of the finger to the surface.

The genuine fingerprint may be formed with or without use of a removable mask. A mask having an aperture of a predetermined shape and predetermined size may be temporarily placed on the base article so as to restrict the formation of the genuine fingerprint to a predetermined surface area of the article substantially equivalent in shape and size to the aperture. Excess fingerprint-forming substance(s) will be kept off adjacent surface areas of the base article by the presence of mask material surrounding the predetermined surface area. The mask material prevents the genuine fingerprint from having unwanted coverage of parts of the base article where no fingerprinting is desired.

The predetermined shape of the aperture of the mask may be substantially symmetrical or nonsymmetrical. The predetermined shape of the aperture may be related to the profession or another life aspect of the preferred personality (for example, an entertainment personality who is a movie star may wish to use a star-shaped aperture to form his or her genuine fingerprint) or unrelated to any such life aspect.

Regardless of the shape and size of the genuine fingerprint, a borderline substantially delineating the perimeter of the genuine fingerprint may be created on the base article to more clearly define the bounds of the fingerprint and to give the fingerprint specifically and the article generally a neater appearance.

A preferred personality handicapped by a writing disability may conveniently, legibly and consistently create and affix a preferred-personality-created integral collectible attractiveness attribute in the form of a genuine fingerprint.

In accordance with still further aspects of the method of this invention, one or more authentication attributes may be affixed to the base article to authenticate a preferred-personality-created integral collectible attractiveness attribute (a genuine autograph or a genuine fingerprint). An authentication attribute is integrally affixed as a part of the article to increase collector confidence in the genuineness of a preferred-personality-created integral collectible attractiveness attribute. Increase in collector confidence is expected to increase attractiveness of the article to collectors. Thus, an authentication attribute is also an integral collectible attractiveness attribute. The affixing of an authentication attribute to the base article is not merely intended to authenticate: the affixing is intended to increase attractiveness of the article to memorabilia collectors.

The witness signature, the certifying nonwitness signature, and the notary public signature of this invention, are integral attributes. Each is affixed to the base article as a part of a larger authentication attribute (an authentication statement or notarial confirmation text), as a part of another integral attribute, or as an individual integral attribute. The ultimate intended use of each signature attribute of this invention is to increase the attractiveness of the article to memorabilia collectors.

Among the other integral collectible attractiveness attributes of this invention that may be affixed to the base article, either individually or as part of another attribute, are: a name of the preferred personality; the date of the creating and affixing of at least one preferred-personality-created integral collectible attractiveness attribute; a name of a geographic location in which the creating and affixing of at least one preferred-personality-created integral collectible attractiveness attribute occurred; an anti-counterfeiting marking; a hologram; a facsimile autograph of the preferred personality; and organic matter containing genetic information from the biotic body of the preferred personality.

A pictorial image of the preferred personality is another integral attribute that may be affixed to the base article to increase attractiveness of the article to memorabilia collectors.

The base article may have a defined and prepared surface area created for affixing at least one preferred-personality-created integral collectible attractiveness attribute and/or other specific integral collectible attractiveness attributes. The defined and prepared surface area may be constructed to more readily allow clearer and better affixing of one or more attributes to the base article with intent to make the article more attractive to memorabilia collectors.

In accordance with yet further aspects of this invention, the memorabilia article may be one of a limited production of substantially similar or related memorabilia articles. With intent to increase intrinsic attractiveness to collectors, this restricted production may be indicated by affixing limited edition markings to the base article.

The memorabilia article of this invention may be associated with promotional matter (including printed merchandise packaging in which the article is enclosed). The printed information can include pictorial representations of the preferred personality, facsimile autographs, facsimile fingerprints, limited edition promotional indicia, and the like.

The method of the present invention encompasses creation of a diversity of collector-targeted memorabilia articles, utilizing different quantitative and qualitative combinations of preferred-personality-created and/or other integral collectible attractiveness attributes. Diverse kinds of base articles are used. The method of the present invention encompasses creation of a superior quality of collector-targeted memorabilia articles. Created by this method are memorabilia articles bearing combinations of preferred-personality-created integral attributes and comprehensively self-authenticating features not available to collectors under the prior art. The present invention makes available collector-targeted memorabilia articles having intrinsic trustworthiness and collectible attractiveness unknown to collectors under the prior art.

The present invention includes all products of the method of the invention. These products encompass all collectible articles produced by the method of the invention.

BRIEF DESCRIPTION OF THE DRAWINGS

FIG. 17 is a view of a mask used in the creation of collector-targeted memorabilia articles bearing preferred-personality-created genuine fingerprints of a predetermined shape (substantially circular) and predetermined size.

FIG. 18 is a view of a mask used in the creation of collector-targeted memorabilia articles bearing preferred-personality-created genuine fingerprints of a predetermined shape (substantially heart-shaped) and predetermined size.

FIG. 19 is a view of a mask used in the creation of collector-targeted memorabilia articles bearing preferred-personality-created genuine fingerprints of a predetermined shape (substantially football-shaped) and predetermined size.

FIG. 20 is a view of a mask used in the creation of collector-targeted memorabilia articles bearing preferred-personality-created genuine fingerprints of a predetermined shape (substantially baseball-bat-shaped) and predetermined size.

FIG. 21 is a view of a mask used in the creation of collector-targeted memorabilia articles bearing preferred-personality-created genuine fingerprints of a predetermined shape (substantially star-shaped) and predetermined size.

LIST OF REFERENCE NUMERALS

Figure 1A:
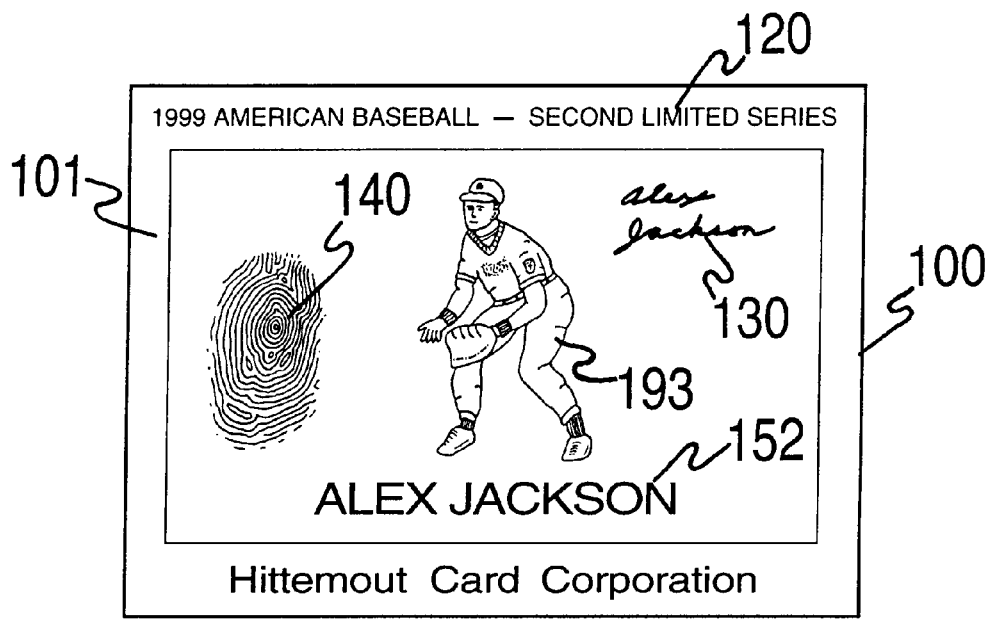
FIG. 1A is a view of the obverse side of an embodiment of the invention having affixed to the base article (a trading card) as integral collectible attractiveness attributes: limited edition markings, a genuine autograph and a genuine fingerprint created by a preferred personality, and a name and pictorial image of the preferred personality.
Figure 1B:
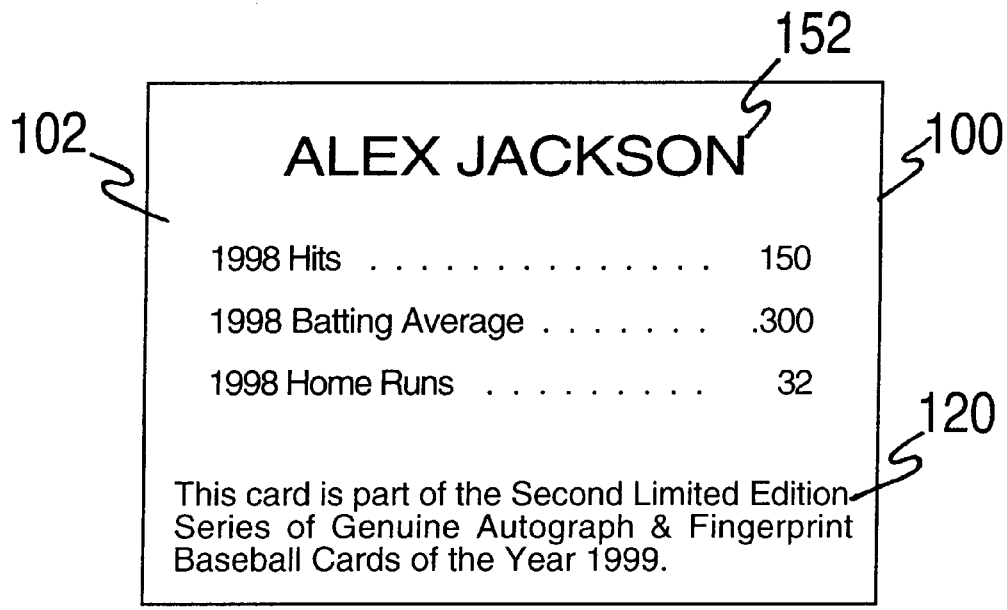
FIG. 1B is a view of the reverse side of the embodiment of the invention of FIG. 1A.

100: a trading card (sports card) comprising the base article of the embodiment of FIGS. 1A and 1B.

101: obverse side of base article 100.

102: reverse side of base article 100.

120: limited edition markings.

130: a genuine autograph of a preferred personality.

140: a genuine fingerprint of the preferred personality who created genuine autograph 130.

152: a name of the preferred personality who created genuine autograph 130 and genuine fingerprint 140.

193: a pictorial image of the preferred personality who created genuine autograph 130 and genuine fingerprint 140.

Figure 2A:
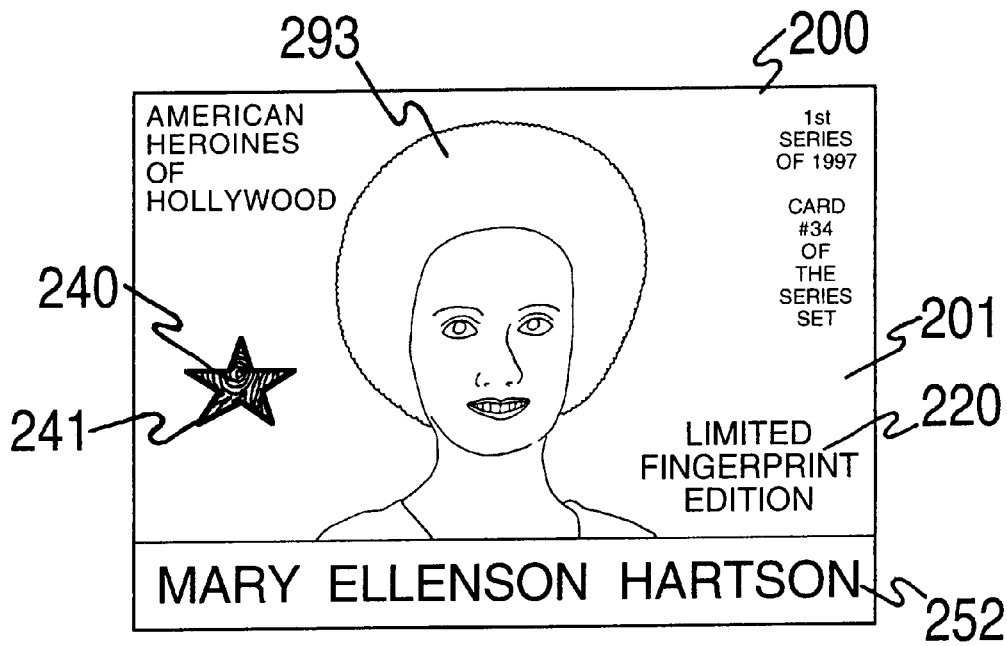
FIG. 2A is a view of the obverse side of an embodiment of the invention having affixed to the base article (a trading card) as integral collectible attractiveness attributes: limited edition markings, a genuine fingerprint created by a preferred personality, a borderline substantially delineating the perimeter of the genuine fingerprint, a witness-signed authentication statement, notarial confirmation text, and a pictorial image of the preferred personality.
Figure 2B:
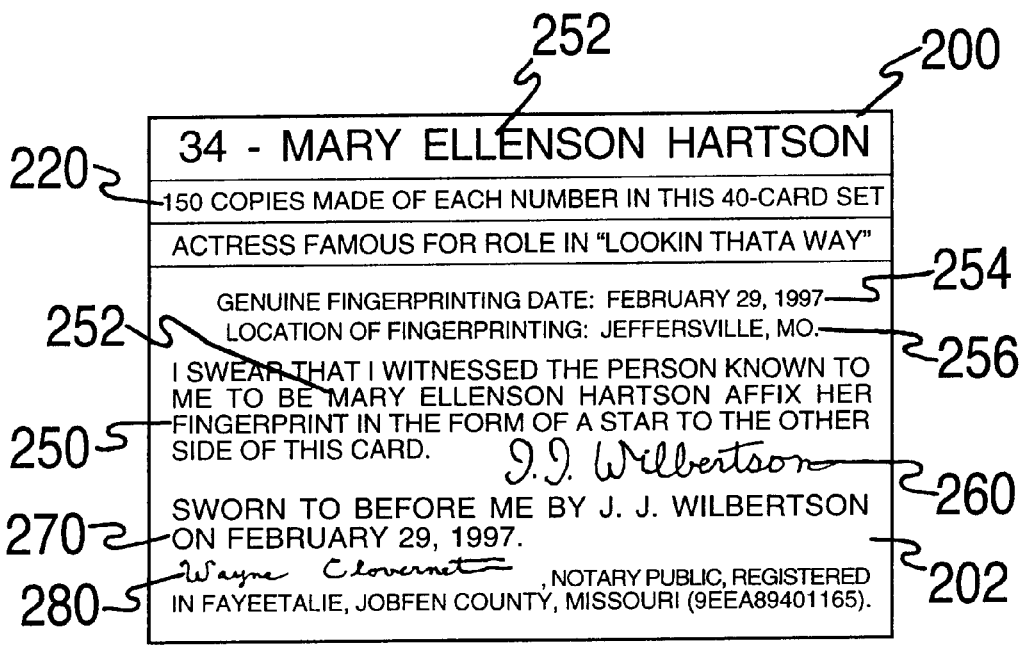
FIG. 2B is a view of the reverse side of the embodiment of the invention of FIG. 2A.

200: a trading card (nonsports card) comprising the base article of the embodiment of FIGS. 2A and 2B.

201: obverse side of base article 200.

202: reverse side of base article 200.

220: limited edition markings.

240: a genuine fingerprint of a preferred personality.

241: a borderline substantially delineating the perimeter of genuine fingerprint 240.

250: a statement having authentication wording.

252: a name of the preferred personality who created genuine fingerprint 240.

254: the date on which genuine fingerprint 240 was created.

256: a name of the geographic location at which genuine fingerprint 240 was created.

260: a signature of a witness.

270: notarial confirmation text.

280: a signature of a notary public.

293: a pictorial image of the preferred personality who created genuine fingerprint 240.

Figure 3A:
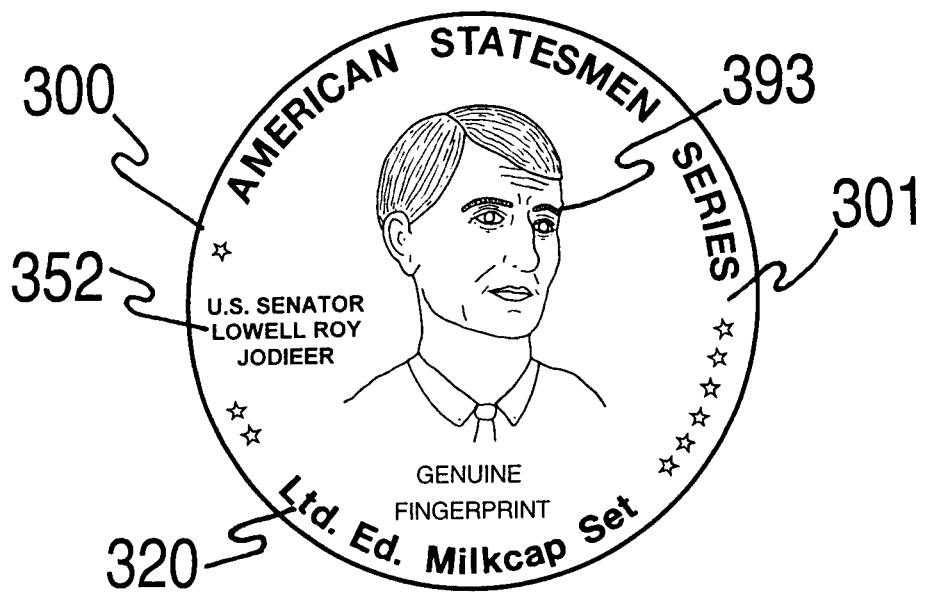
FIG. 3A is a view of the obverse side of an embodiment of the invention having affixed to the base article (a milkcap) as integral collectible attractiveness attributes: limited edition markings, a genuine fingerprint of a preferred personality, and a name and pictorial image of the preferred personality.
Figure 3B:
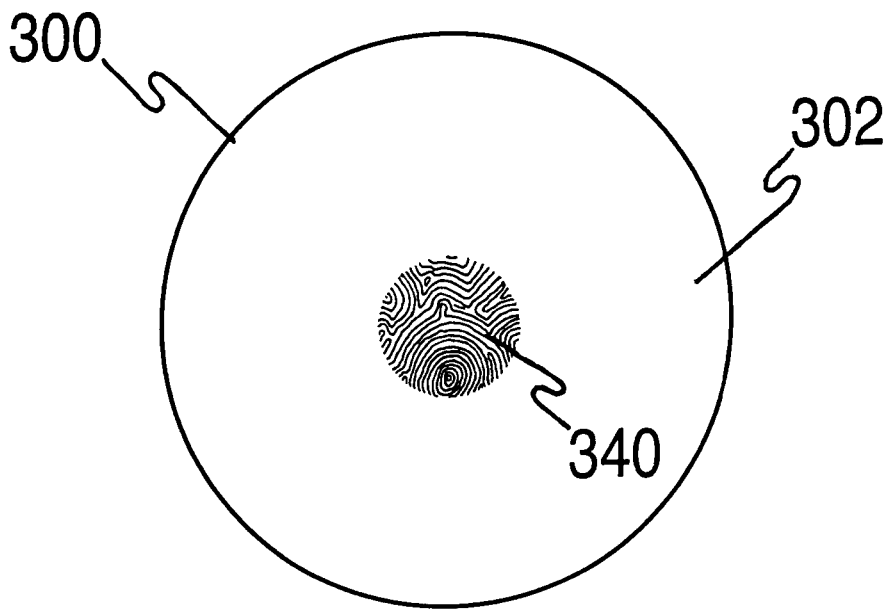
FIG. 3B is a view of the reverse side of the embodiment of the invention of FIG. 3A

300: a milkcap comprising the base article of the embodiment of FIGS. 3A and 3B.

301: obverse side of base article 300.

302: reverse side of base article 300.

320: limited edition markings.

340: a genuine fingerprint of a preferred personality.

352: a name of the preferred personality who created genuine fingerprint 340.

393: a pictorial image of the preferred personality who created genuine fingerprint 340.

Figure 4A:
FIG. 4A is a view of the obverse side of an embodiment of the invention having affixed to the base article (a slammer) as integral collectible attractiveness attributes: a genuine autograph and a genuine fingerprint of a preferred personality, a witness-signed authentication statement, notarial confirmation text, and a pictorial image of the preferred personality.
Figure 4B:
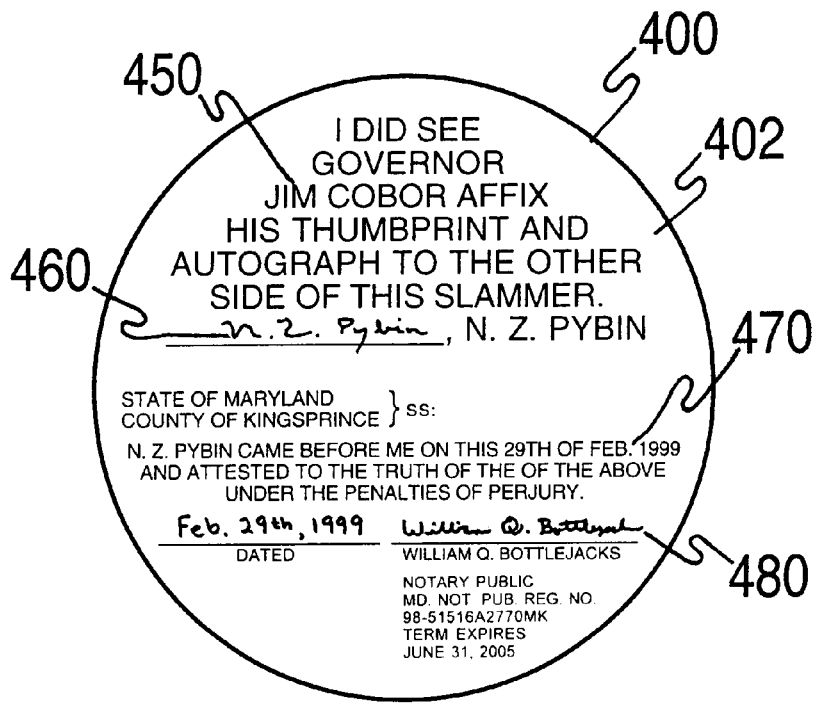
FIG. 4B is a view of the reverse side of the embodiment of the invention of FIG. 4A.

400: a slammer comprising the base article of the embodiment of FIGS. 4A and 4B.

401: obverse side of base article 400.

402: reverse side of base article 400.

430: a genuine autograph of a preferred personality.

440: a genuine fingerprint of the preferred personality who created genuine fingerprint 430.

450: a statement having authentication wording.

460: a signature of a witness.

470: notarial confirmation text.

480: a signature of a notary public.

493: a pictorial image of the preferred personality who created genuine autograph 430 and genuine fingerprint 440.

Figure 5A:
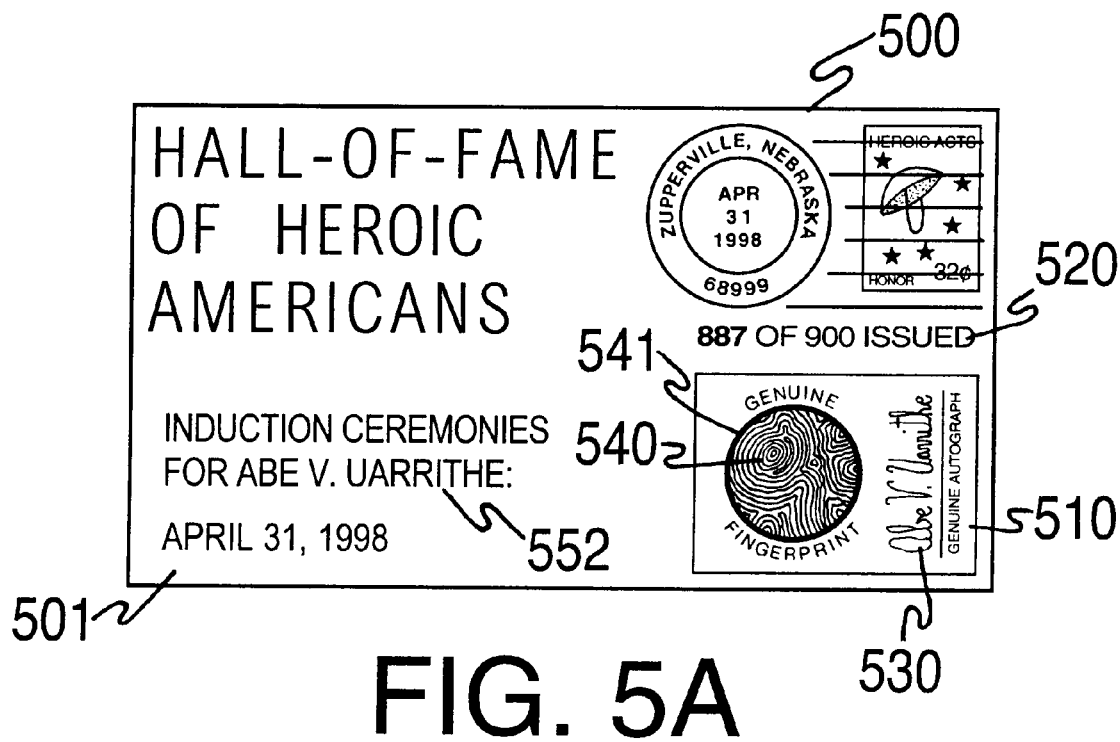
FIG. 5A is a view of the obverse side of an embodiment of the invention having affixed to the base article (a philatelic item) as integral collectible attractiveness attributes: a genuine autograph and a genuine fingerprint of a preferred personality, a borderline substantially delineating the perimeter of the genuine fingerprint, and a name and pictorial image of the preferred personality; the genuine autograph and genuine fingerprint are affixed within a defined and prepared surface area created for affixing preferred-personality-created integral collectible attractiveness attributes and/or other integral collectible attractiveness attributes.
Figure 5B:
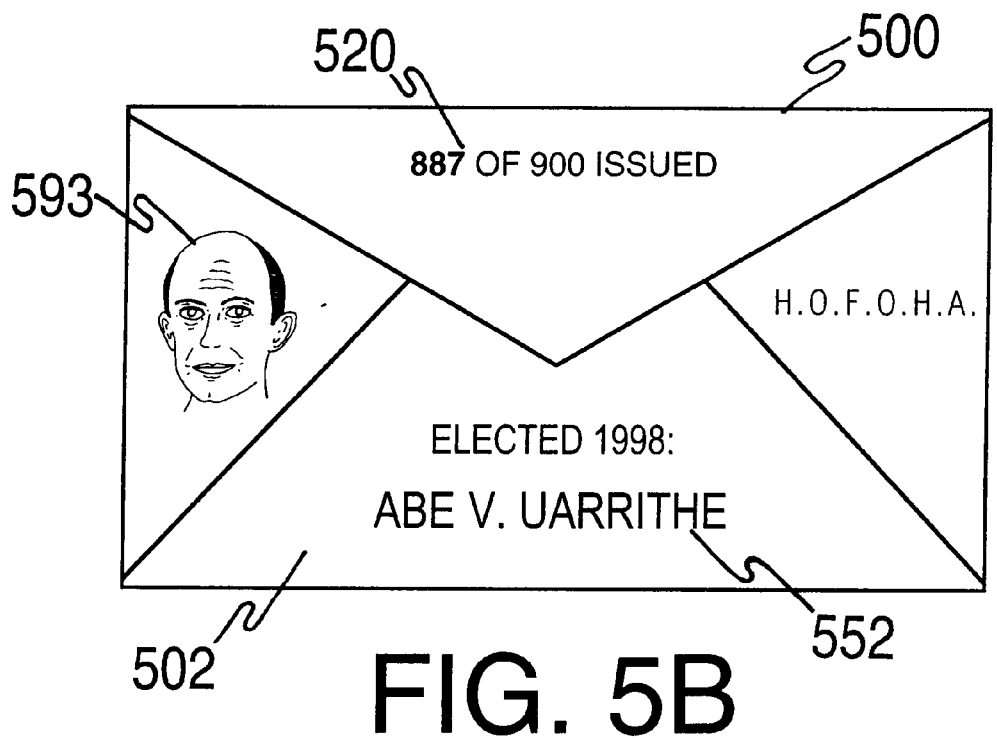
FIG. 5B is a view of the reverse side of the embodiment of the invention of FIG. 5A.

500: a philatelic item (commemorative envelope) comprising the base article of the embodiment of FIGS. 5A and 5B.

501: obverse side of base article 500.

502: reverse side of base article 500:

510: a defined and prepared surface area created for affixing preferred-personality-created integral collectible attractiveness attributes and/or other integral collectible attractiveness attributes.

520: limited edition markings.

530: a genuine autograph of a preferred personality.

540: a genuine fingerprint of the preferred personality who created genuine autograph 530.

541: a borderline substantially delineating the perimeter of genuine fingerprint 540.

552: a name of the preferred personality who created genuine autograph 530 and genuine fingerprint 540.

593: a pictorial image of the preferred personality who created genuine autograph 530 and genuine fingerprint 540.

Figure 6:
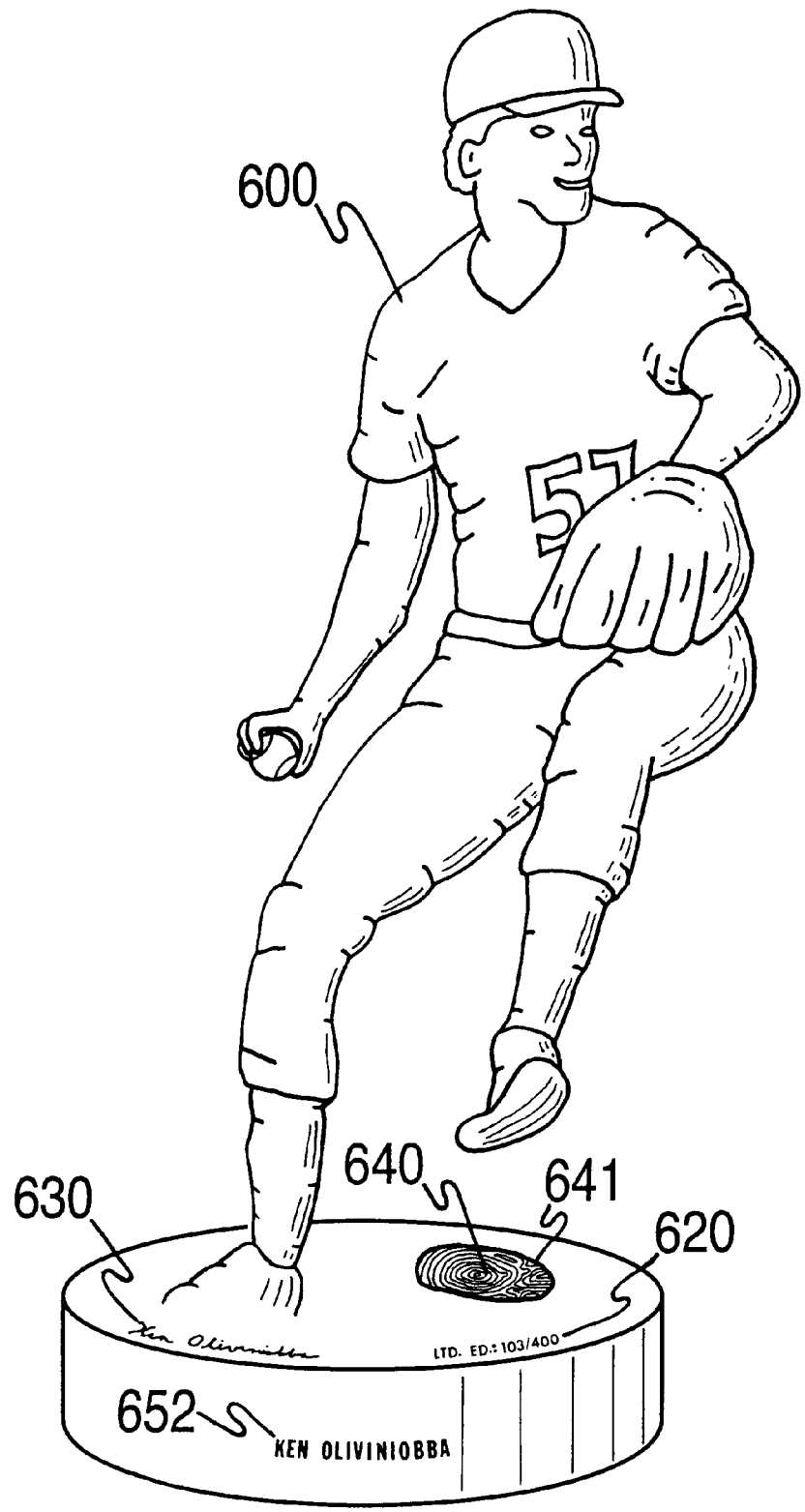
FIG. 6 is a view of an embodiment of the invention having affixed to the base article (a three-dimensional collectible item) as integral collectible attractiveness attributes: limited edition markings, a genuine autograph and a genuine fingerprint of a preferred personality, a borderline substantially delineating the perimeter of the genuine fingerprint, and a name of the preferred personality.

600: a three-dimensional figurine comprising the base article of the embodiment of in FIG. 6.

620: limited edition markings.

630: a genuine autograph of a preferred personality.

640: a genuine fingerprint of the preferred personality who created genuine autograph 630.

641: a borderline substantially delineating the perimeter of genuine fingerprint 640.

652: a name of the preferred personality who created genuine autograph 630 and genuine fingerprint 640.

Figure 7A:
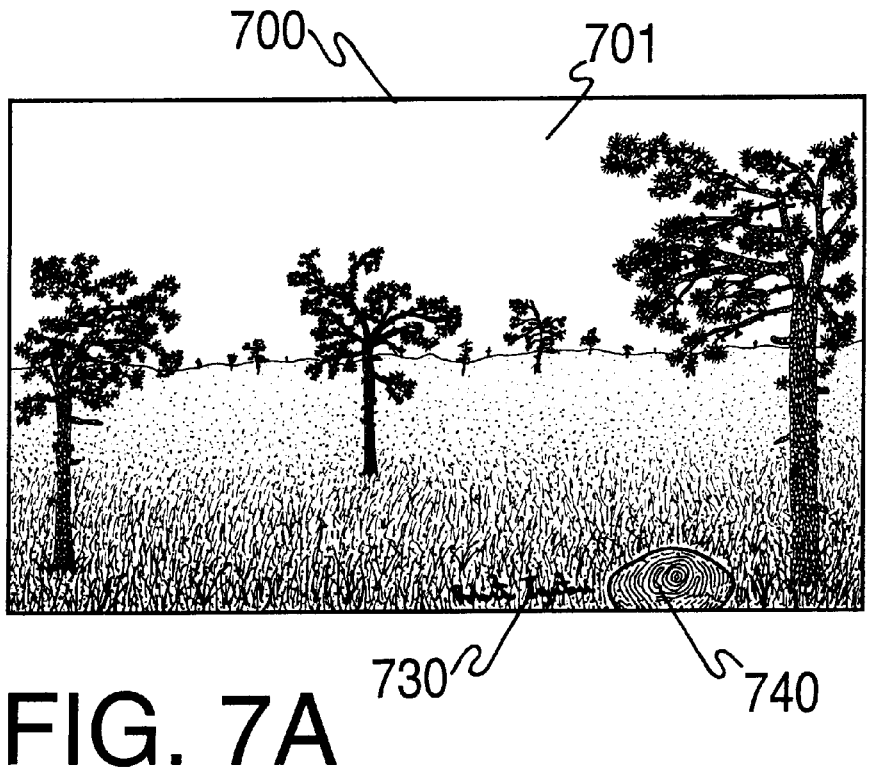
FIG. 7A is a view of the obverse side of an embodiment of the invention having affixed to the base article (a tangible work of fine art) as integral collectible attractiveness attributes: limited edition markings, a genuine autograph and a genuine fingerprint of a preferred personality, a witness-signed authentication statement, and notarial confirmation text.
Figure 7B:
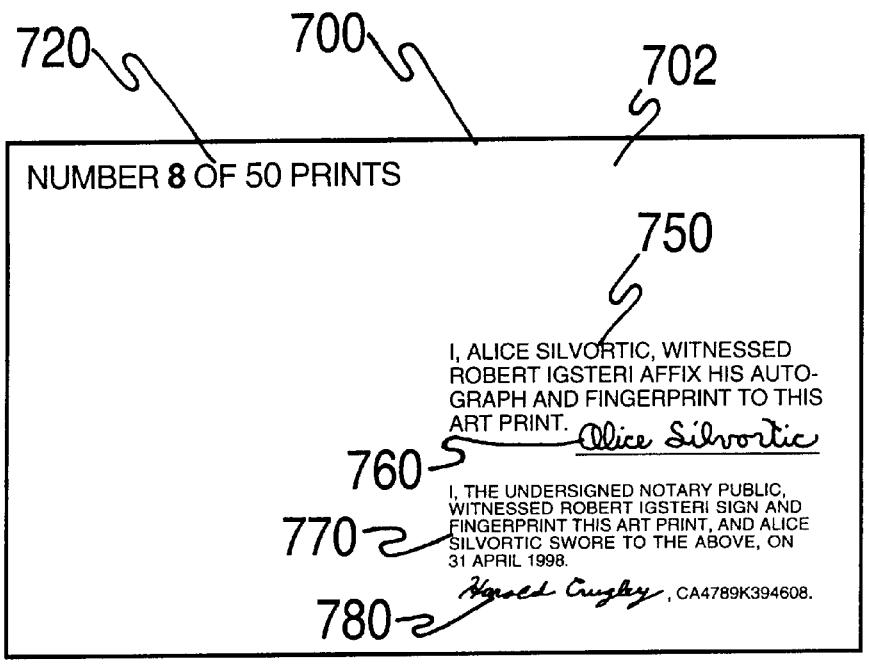
FIG. 7B is a view of the reverse side of the embodiment of the invention of FIG. 7A.

700: a tangible work of fine art (lithographic print) comprising the base article of the embodiment of FIGS. 7A and 7B.

701: obverse side of base article 700.

702: reverse side of base article 700.

720: limited edition markings.

730: a genuine autograph of a preferred personality.

740: a genuine fingerprint of the preferred personality who created genuine autograph 730.

750: a statement having authentication wording.

760: a signature of a witness.

770: notarial confirmation text.

780: a signature of a notary public.

Figure 8:
FIG. 8 is a view of an embodiment of the invention having affixed to the base article (a bound publication) as integral collectible attractiveness attributes: limited edition markings, a genuine autograph and a genuine fingerprint of a preferred personality, a borderline delineating the perimeter of the genuine fingerprint, and an authentication statement signed by a witness who is a notary public.

800: a bound publication (book) comprising the base article of the embodiment of FIG. 8.

820: limited edition markings.

830: a genuine autograph of a preferred personality.

840: a genuine fingerprint of the preferred personality who created genuine autograph 830.

841: a borderline substantially delineating the perimeter of genuine fingerprint 840.

850: a statement having authentication wording.

852: a name of the preferred personality who created genuine autograph 830 and genuine fingerprint 840.

860: a signature of a witness who is a notary public.

Figure 9:
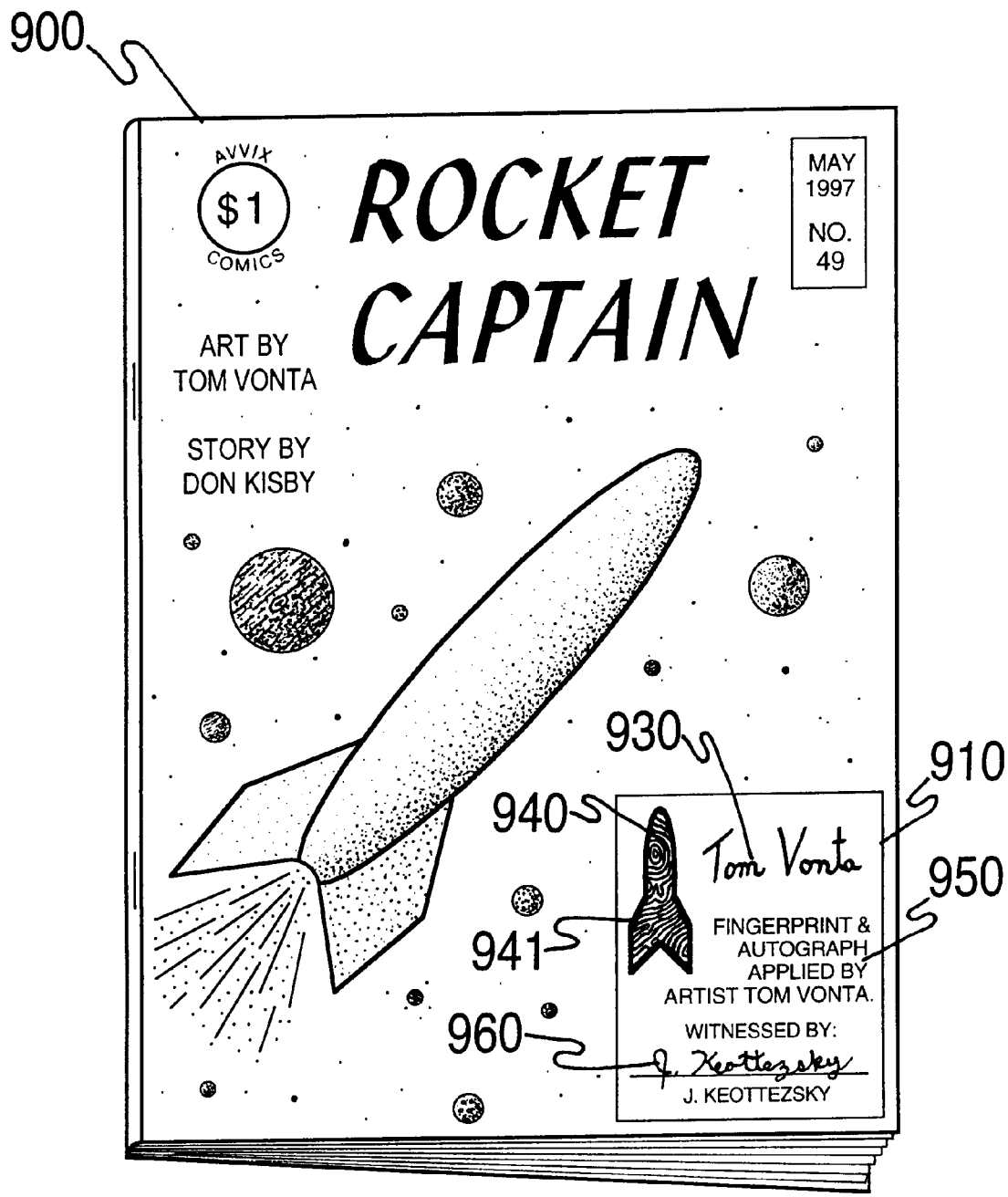
FIG. 9 is a view of an embodiment of the invention having affixed to the base article (a comicbook) as integral collectible attractiveness attributes: a genuine autograph and a genuine fingerprint of a preferred personality, a borderline substantially delineating the perimeter of the genuine fingerprint, and a witness-signed authentication statement; these attributes are affixed within a defined and prepared surface area created for affixing preferred-personality-created integral collectible attractiveness attributes and/or other integral collectible attractiveness attributes.

900: a comicbook comprising the base article of the embodiment of FIG. 9.

910: a defined and prepared surface area created for affixing preferred-personality-created integral collectible attractiveness attributes and/or other integral collectible attractiveness attributes.

930: a genuine autograph of a preferred personality.

940: a genuine fingerprint of the preferred personality who created genuine autograph 930.

941: a borderline substantially delineating the perimeter of genuine fingerprint 940.

950: a statement having authentication wording.

960: a signature of a witness.

Figure 10A:
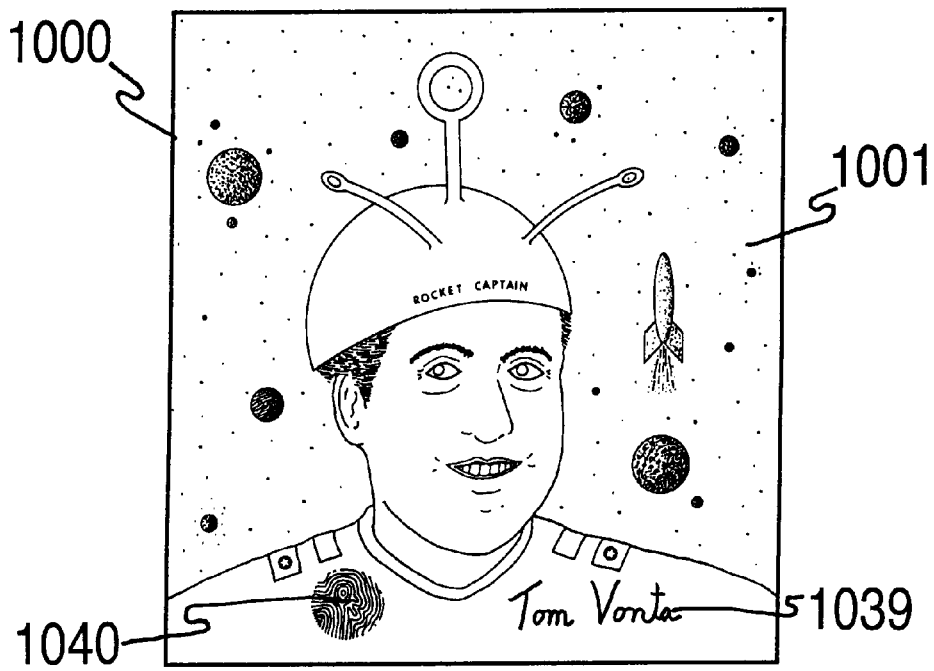
FIG. 10A is a view of the obverse side of an embodiment of the invention having affixed to the base article (a tangible work of comicbook-related art) as integral collectible attractiveness attributes: a genuine fingerprint of a preferred personality, a facsimile autograph of the preferred personality, an authentication statement signed by a certifying person, notarial confirmation text, and a hologram.
Figure 10B:
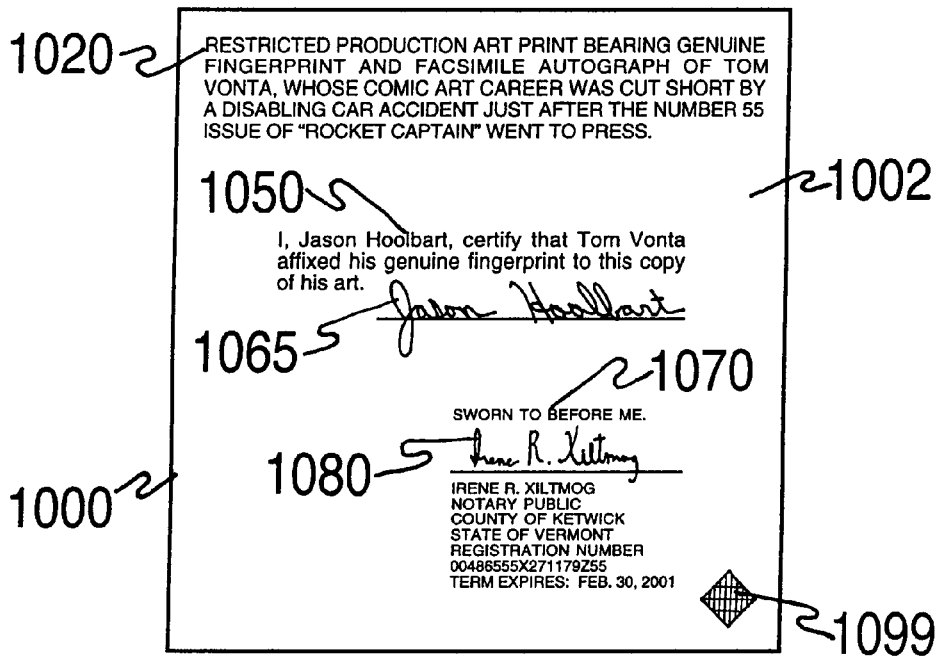
FIG. 10B is a view of the reverse side of the embodiment of the invention of FIG. 10A.

1000: a tangible work of comicbook-related art comprising the base article of the embodiment of FIGS. 10A and 10B.

1001: obverse side of base article 1000.

1002: reverse side of base article 1000.

1020: limited edition markings.

1039: facsimile autograph of a preferred personality.

1040: a genuine fingerprint of the preferred personality whose facsimile autograph 1039 is affixed to base article 1000.

1050: a statement having authentication wording.

1065: a signature of a certifying person.

1070: notarial confirmation text.

1080: a signature of a notary public.

1099: a hologram.

Figure 11A:
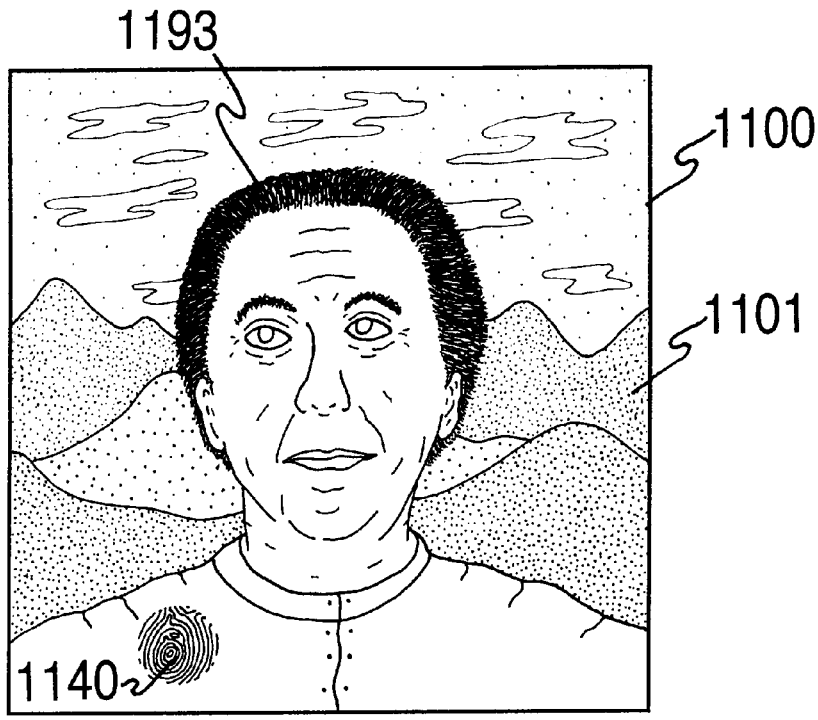
FIG. 11A is a view of the obverse side of an embodiment of the invention having affixed to the base article (a photograph) as integral collectible attractiveness attributes: a genuine autograph and a genuine fingerprint of a depicted preferred personality, a witness-signed authentication statement, and a pictorial image covering substantially 100 percent of the surface area of the obverse side.
Figure 11B:
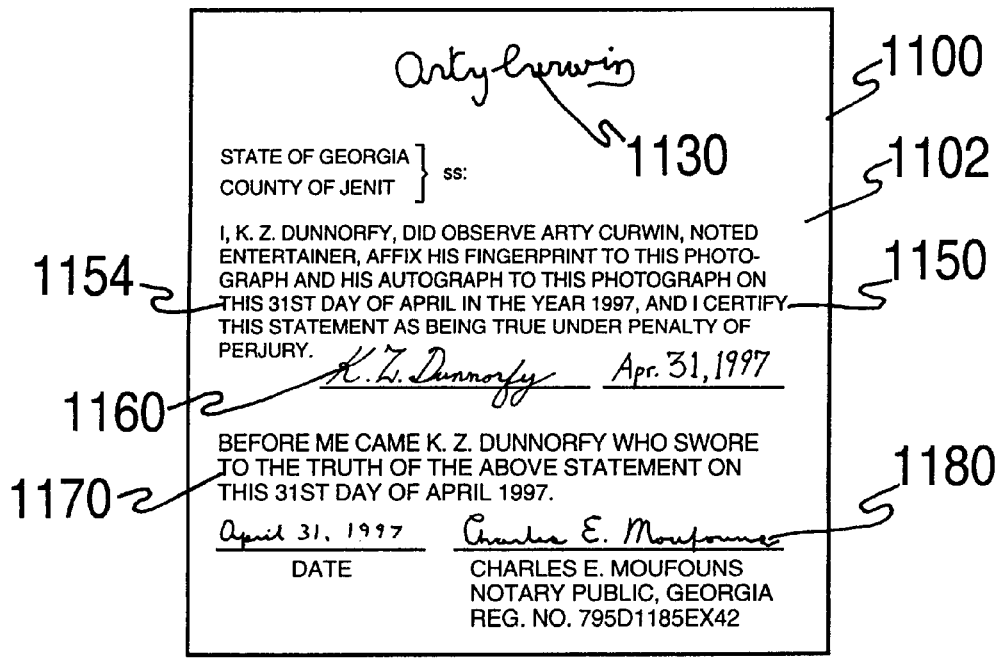
FIG. 11B is a view of the reverse side of the embodiment of the invention of FIG. 11A.

1100: a photograph comprising the base article of the embodiment of FIGS. 11A and 11B.

1101: obverse side of base article 1100.

1102: reverse side of base article 1102.

1130: a genuine autograph of a preferred personality.

1140: a genuine fingerprint of the preferred personality who created genuine autograph 1130.

1150: a statement having authentication wording.

1154: the date on which genuine autograph 1130 and genuine fingerprint 1140 were created and affixed to base article 1100.

1160: a signature of a witness.

1170: notarial confirmation text.

1180: a signature of a notary public.

1193: a pictorial image of the preferred personality who created genuine autograph 1130 and genuine fingerprint 1140.

Figure 12A:
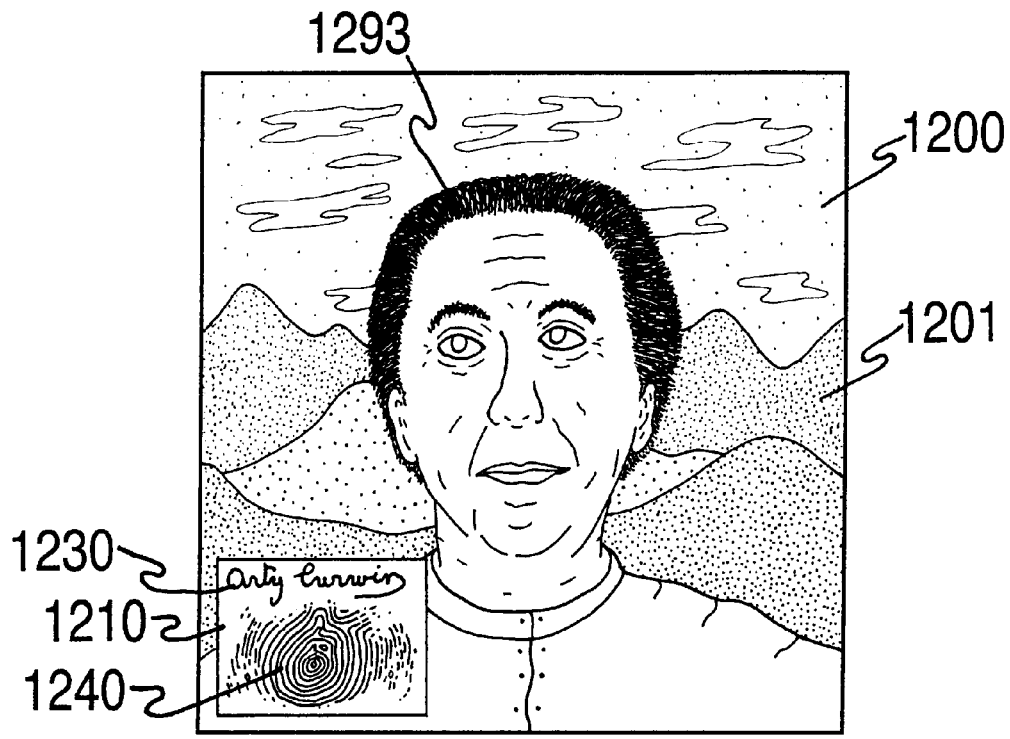
FIG. 12A is a view of the obverse side of an embodiment of the invention having affixed to the base article (a photograph) as integral collectible attractiveness attributes: limited edition markings, a genuine autograph and a genuine fingerprint of a preferred personality, and a pictorial image covering more than 80 percent of the surface area of the obverse side (with the image including a depiction of the preferred personality); the genuine autograph and genuine fingerprint are affixed within a defined and prepared surface area created for affixing preferred-personality-created integral collectible attractiveness attributes and/or other integral collectible attractiveness attributes.
Figure 12B:
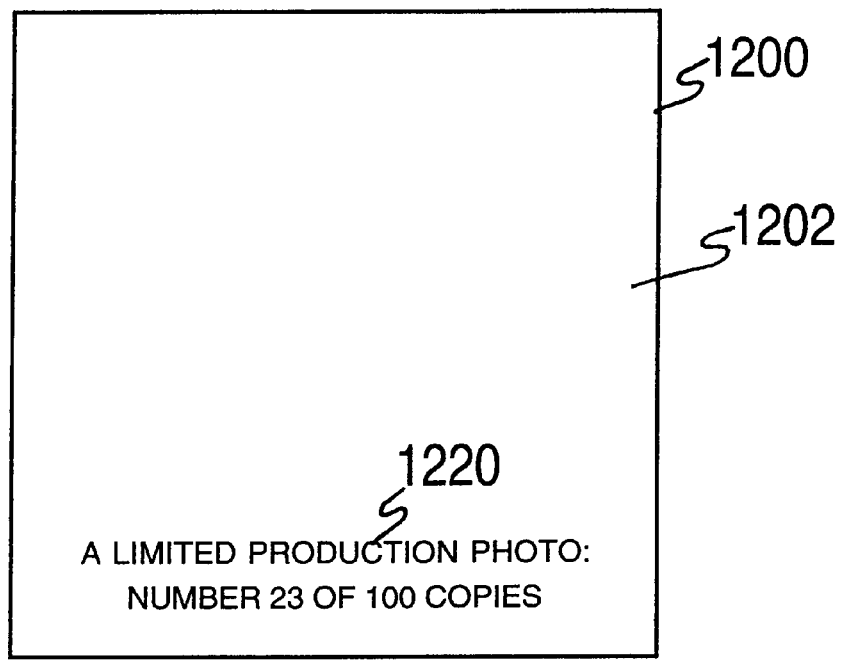
FIG. 12B is a view of the reverse side of the embodiment of the invention of FIG. 12A.

1200: a photograph comprising the base article of the embodiment of FIGS. 12A and 12B.

1201: obverse side of base article 1200.

1202: reverse side of base article 1200.

1210: a defined and prepared surface area created for affixing preferred-personality-created integral collectible attractiveness attributes and/or other integral collectible attractiveness attributes.

1220: limited edition markings.

1230: a genuine autograph of a preferred personality.

1240: a genuine fingerprint of the preferred personality who created genuine autograph 1230.

1293: a pictorial image of the preferred personality who created genuine autograph 1230 and genuine fingerprint 1240.

Figure 13A:
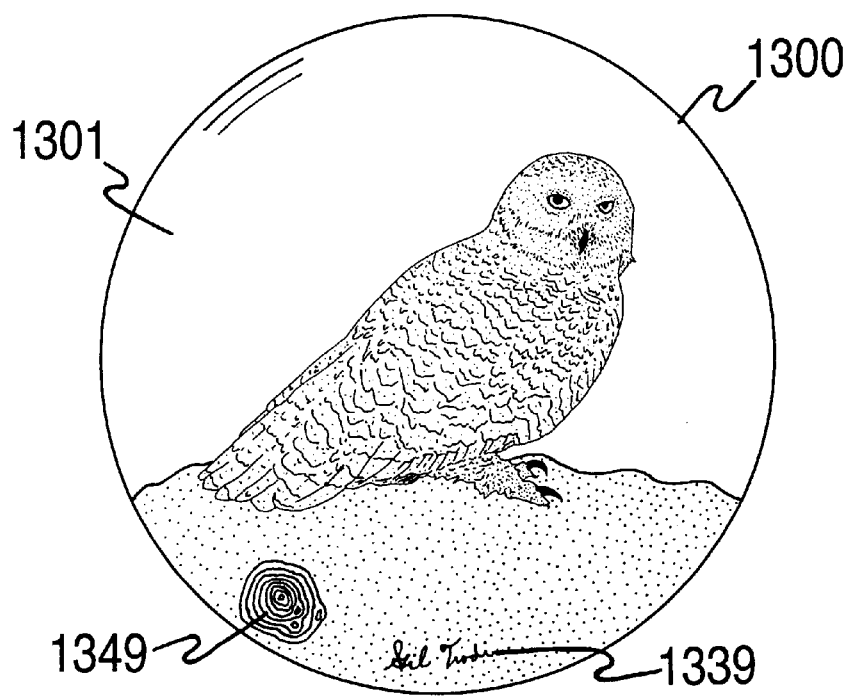
FIG. 13A is a view of the obverse side of an embodiment of the invention having affixed to the base article (a collector's plate) as integral collectible attractiveness attributes: limited edition markings, a genuine autograph and a genuine fingerprint of a preferred personality, a facsimile autograph and a facsimile fingerprint of the preferred personality, a witness-signed authentication statement, and notarial confirmation text.
Figure 13B:
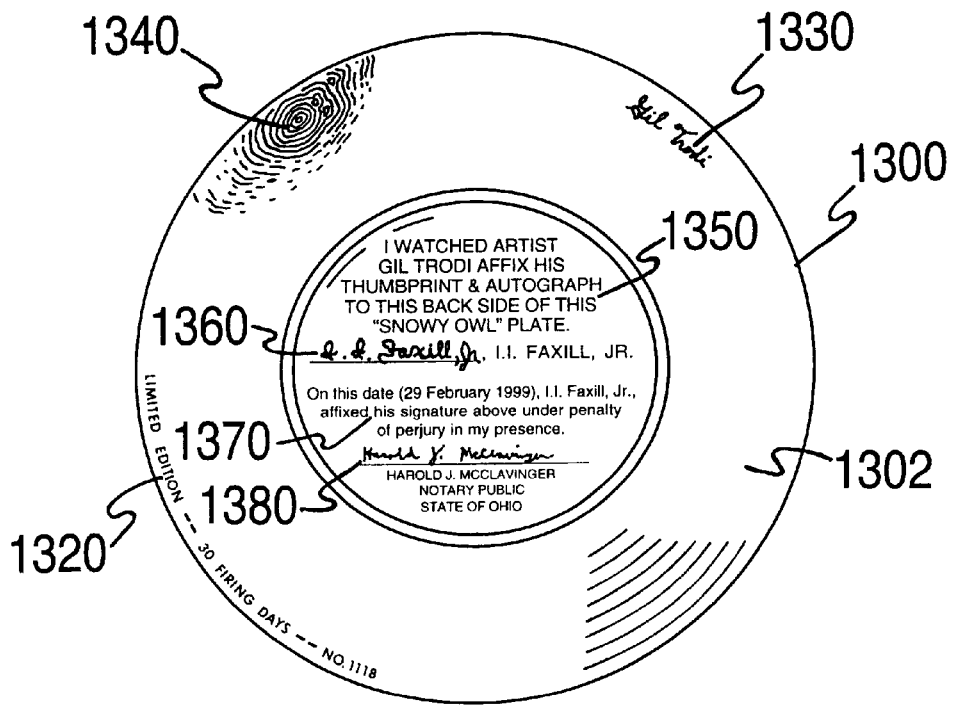
FIG. 13B is a view of the reverse side of the embodiment of the invention of FIG. 13A.

1300: a collector's plate comprising the base article of the embodiment of FIGS. 13A and 13B.

1301: obverse side of base article 1300.

1302: reverse side of base article 1300.

1320: limited edition markings.

1330: a genuine autograph of a preferred personality.

1339: a facsimile autograph of the preferred personality who created genuine autograph 1330.

1340: a genuine fingerprint of the preferred personality who created genuine autograph 1330.

1349: a facsimile fingerprint of the preferred personality who created genuine autograph 1349.

1350: a statement having authentication wording.

1360: a signature of a witness.

1370: notarial confirmation text.

1380: a signature of a notary public.

Figure 14A:
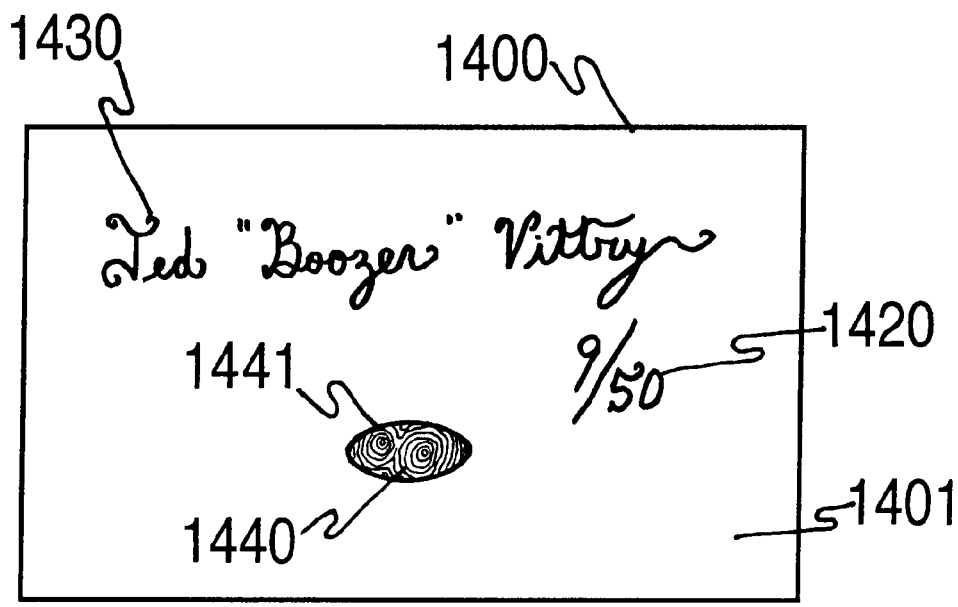
FIG. 14A is a view of the obverse side of an embodiment of the invention having affixed to the base article (a non-collector-targeted utilitarian item) as integral collectible attractiveness attributes: limited edition markings, a genuine autograph and a genuine fingerprint of a preferred personality, a borderline substantially delineating the perimeter of the genuine fingerprint, a witness-signed authentication statement, notarial confirmation text.
Figure 14B:
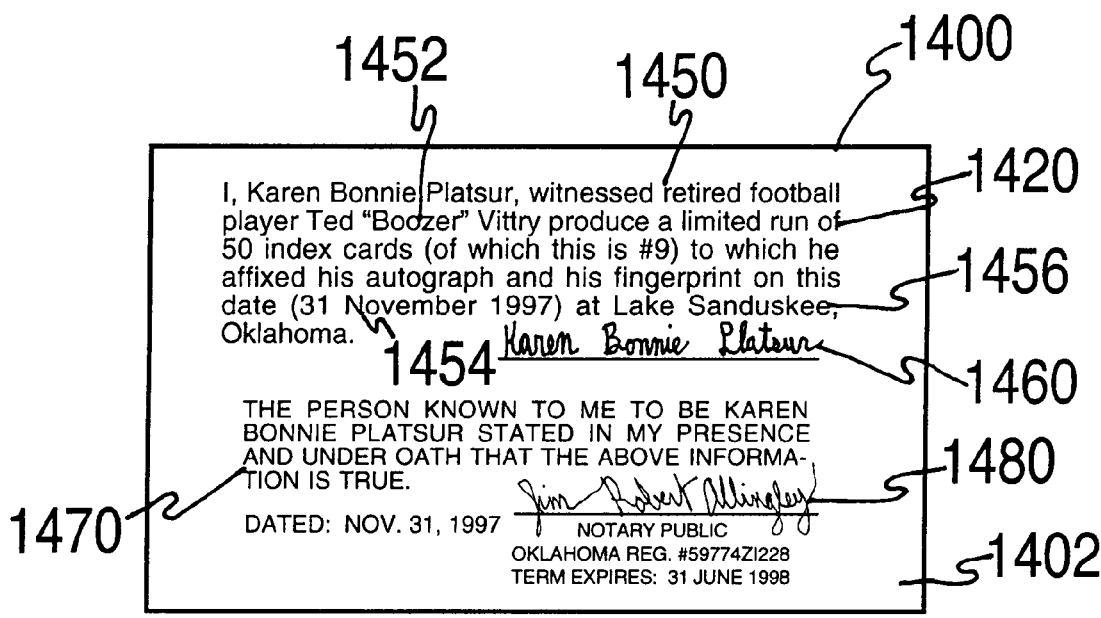
FIG. 14B is a view of the reverse side of the embodiment of the invention of FIG. 14A.

1400: a utilitarian item (index card) comprising the base article of the embodiment of FIGS. 14A and 14B.

1401: obverse side of base article 1400.

1402: reverse side of base article 1400.

1420: limited edition markings.

1430: a genuine autograph of a preferred personality.

1440: a genuine fingerprint of the preferred personality who created genuine autograph 1430.

1441: a borderline substantially delineating the perimeter of genuine fingerprint 1440.

1450: a statement having authentication wording.

1452: a name of the preferred personality who created genuine autograph 1430 and genuine fingerprint 1440.

1454: the date on which genuine autograph 1430 and genuine fingerprint 1440 were created.

1456: a name of the geographic location at which genuine autograph 1430 and genuine fingerprint 1440 were created.

1460: a signature of a witness.

1470: notarial confirmation text.

1480: a signature of a notary public.

Figure 15:
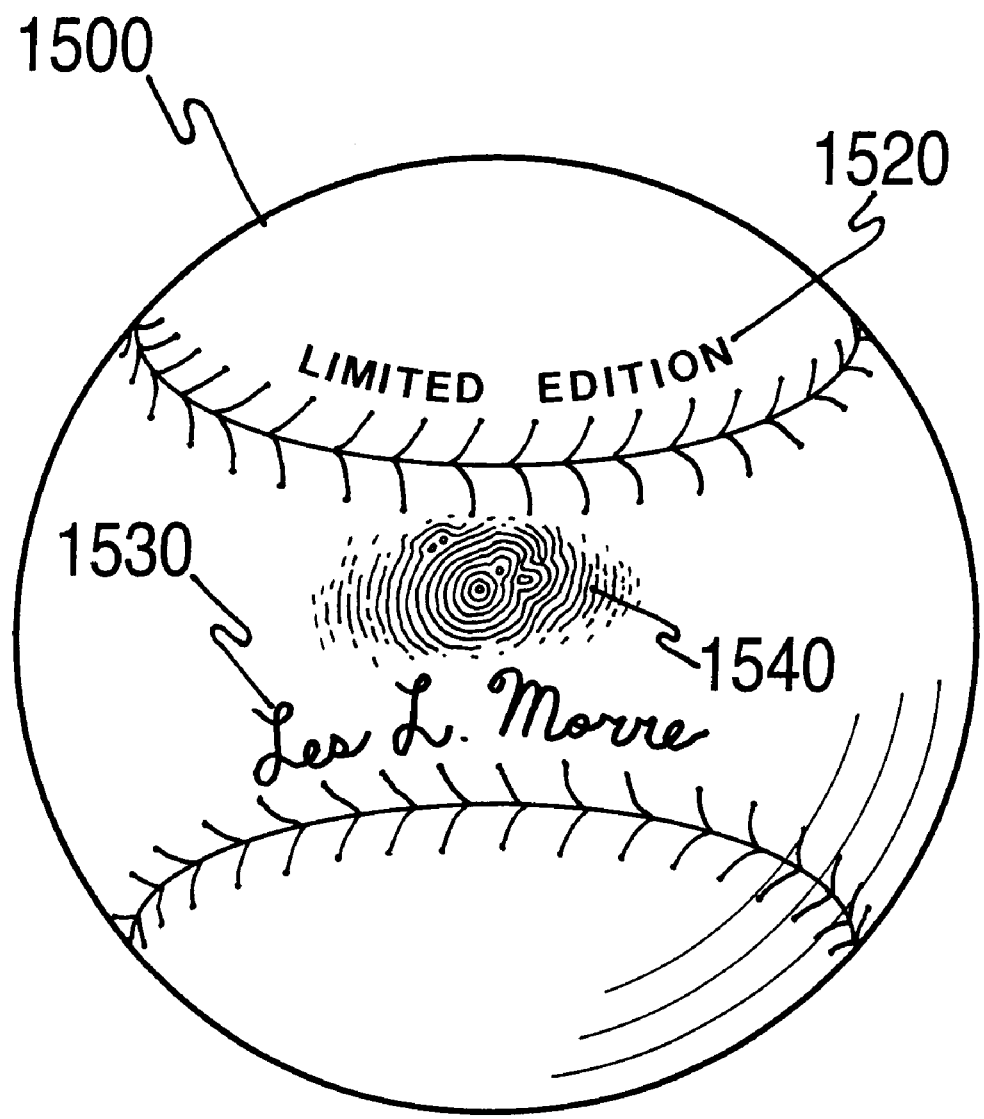
FIG. 15 is a view of an embodiment of the invention having affixed to the base article (an item of sporting equipment) as integral preferred-personality-created collectible attractiveness attributes: limited edition markings, and a genuine autograph and a genuine fingerprint of a preferred personality.

1500: an item of sporting equipment (baseball) comprising the base article of the embodiment of FIG. 15.

1520: limited edition markings.

1530: a genuine autograph of a preferred personality.

1540: a genuine fingerprint of the preferred personality who created genuine autograph 1530.

Figure 16:
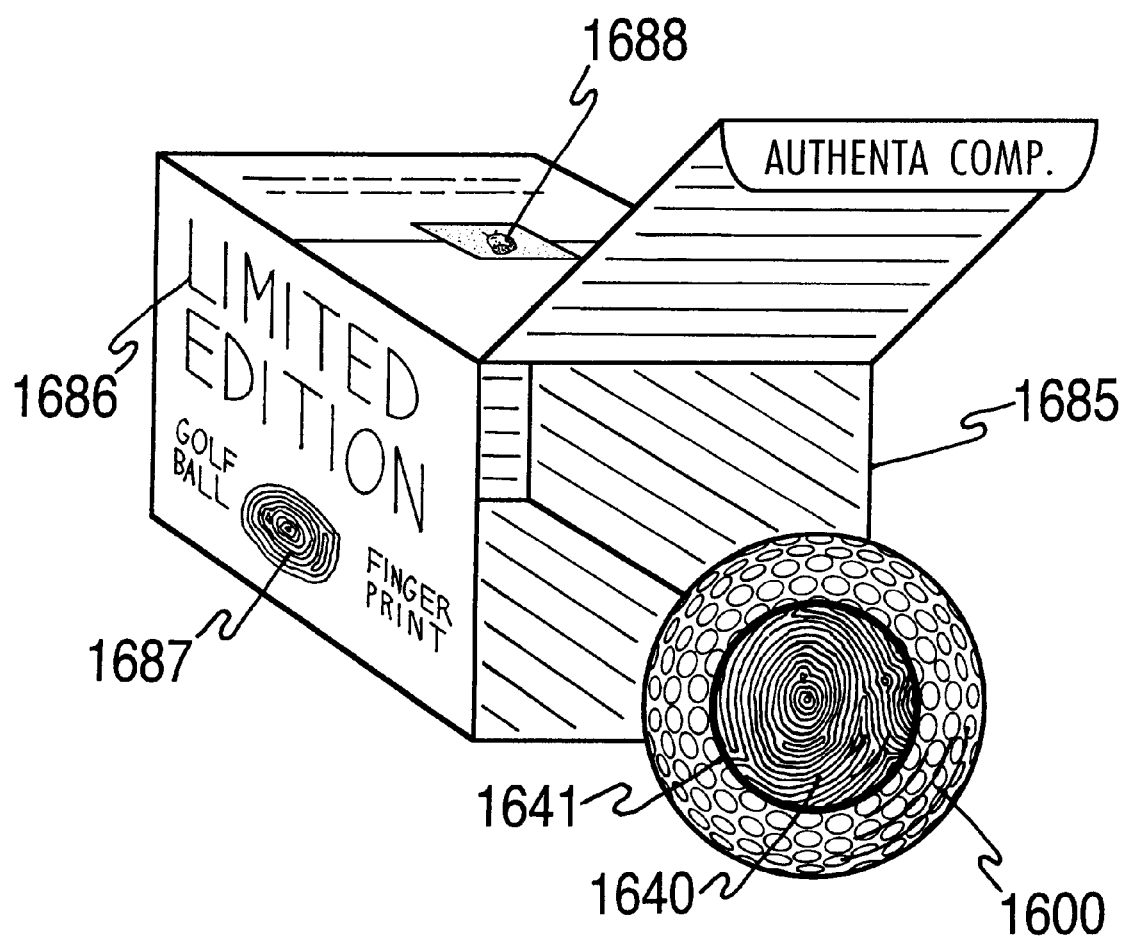
FIG. 16 is a view of an embodiment of the invention comprising a collector-targeted memorabilia article (a golf ball bearing a genuine fingerprint of a preferred personality) and related promotional matter (merchandise packaging).

1600: an item of sporting equipment (golf ball) comprising the base article of the embodiment of FIG. 16.

1640: a genuine fingerprint of a preferred personality.

1641: a borderline substantially following the perimeter of genuine fingerprint 1640.

1685: merchandise packaging.

1686: limited edition promotional indicia on packaging 1685.

1687: imitation fingerprint on packaging 1685.

1688: a pictorial representation of a preferred personality on packaging 1685.

1747: a substantially flat mask used in the creation of a genuine fingerprint as a preferred-personality-created integral collectible attractiveness attribute of a predetermined shape and predetermined size.

1748: an aperture of a predetermined shape (substantially circular) and predetermined size.

1847: a substantially flat mask used in the creation of a genuine fingerprint as a preferred-personality-created integral collectible attractiveness attribute of a predetermined shape and predetermined size.

1848: an aperture of a predetermined shape (substantially heart-shaped) and predetermined size.

1947: a substantially flat mask used in the creation of a genuine fingerprint as a preferred-personality-created integral collectible attractiveness attribute of a predetermined shape and predetermined size.

1948: an aperture of a predetermined shape (substantially football-shaped) and predetermined size.

2047: a substantially flat mask used in the creation of a genuine fingerprint as a preferred-personality-created integral collectible attractiveness attribute of a predetermined shape and predetermined size.

2048: an aperture of a predetermined shape (substantially baseball-bat-shaped) and predetermined size.

2147: a substantially flat mask used in the creation of a genuine fingerprint as a preferred-personality-created integral collectible attractiveness attribute of a predetermined shape and predetermined size.

2148: an aperture of a predetermined shape (substantially star-shaped) and predetermined size.

Figure 22:
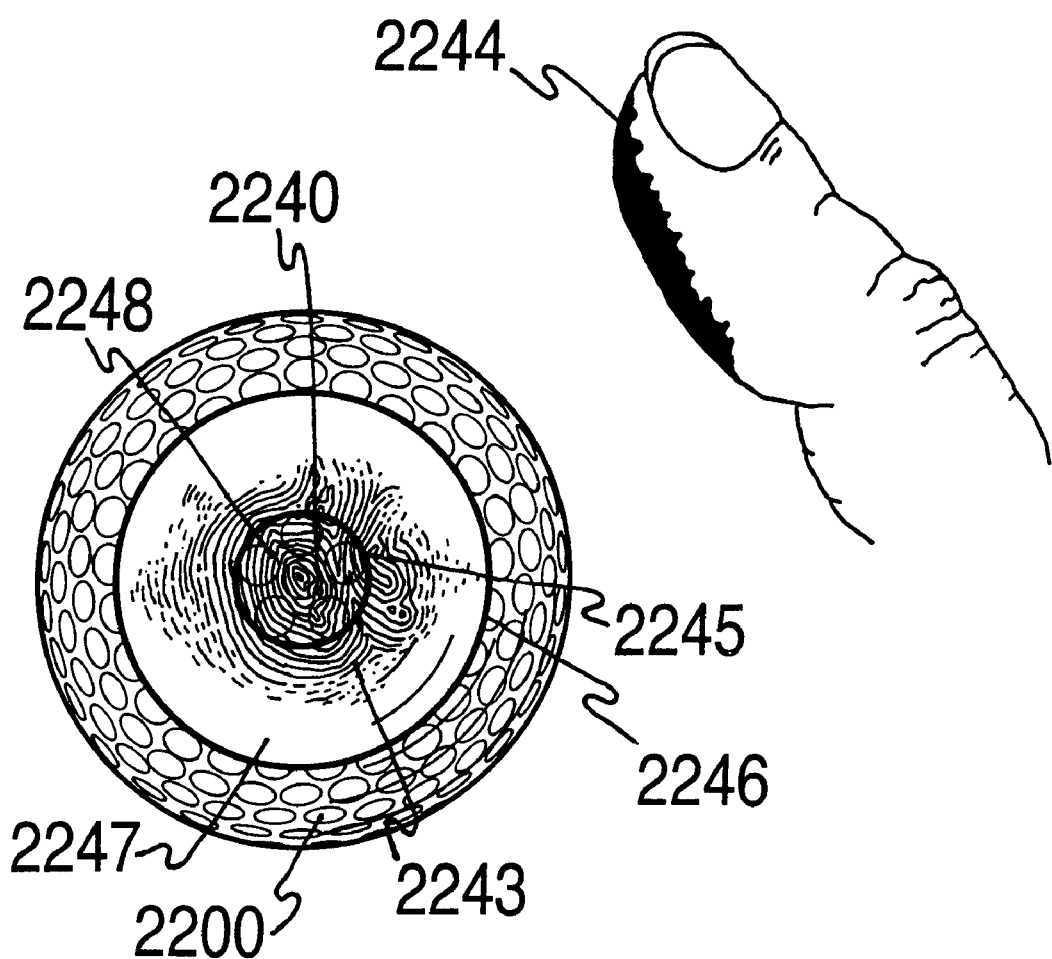
FIG. 22 is a view of a finger (coated with a fingerprint-forming-substance) of a preferred personality being withdrawn after touching a base article through the aperture of a mask so as to form a fingerprint of a predetermined shape and predetermined size as a preferred-personality-created integral collectible attribute.

2200: an item of sporting equipment (golf ball) comprising the base article of the embodiment of FIG. 22.

2240: a genuine fingerprint of a predetermined shape and size formed by a preferred personality touching a surface of base article 2200 with a finger, coated with a fingerprint-forming substance, pressed through aperture 2248 of mask 2247.

2243: excess fingerprint-forming substance deposited on mask 2247.

2244: fingerprint-forming substance (shown on a finger of the preferred personality who created genuine fingerprint 2240).

2245: inner (aperture-surrounding) edge of mask 2247.

2246: outer edge of mask 2247.

2247: a mask used in the creation of genuine fingerprint 2240 as a preferred-personality-created integral collectible attractiveness attribute of a predetermined shape and predetermined size.

2248: an aperture of a predetermined shape and predetermined size.

DETAILED DESCRIPTION OF THE INVENTION

Sixteen embodiments of the invention are shown in FIGS. 1A and 1B, FIGS. 2A and 2B, FIGS. 3A and 3B, FIGS. 4A and 4B, FIGS. 5A & 5B, FIG. 6, FIGS. 7A and 7B, FIG. 8, FIG. 9, FIGS. 10A and 10B, FIGS. 11A and 11B, FIGS. 12A and 12B, FIGS. 13A and 13B, FIGS. 14A and 14B, FIG. 15, and FIG. 16. Each of these sixteen embodiments comprises a selected base article and at least one attribute selected for affixing to the base article as: a preferred-personality-created integral collectible attractiveness attribute in the form of a genuine fingerprint; a preferred-personality-created integral collectible attractiveness attribute in the form of a genuine autograph; or an integral collectible attractiveness attribute in the form of a facsimile fingerprint of a preferred personality.

FIGS. 1A and 1B show an embodiment comprising base article 100, which is a trading card. Base article 100 has two sides, obverse side 101 and reverse side 102. Affixed to base article 100 as integral collectible attractiveness attributes are: genuine fingerprint 140, genuine autograph 130, name 152 of the preferred personality who created and affixed genuine fingerprint 140 and genuine autograph 130, pictorial image 193 of the preferred personality, and limited edition markings 120.

FIGS. 2A and 2B show an embodiment comprising base article 200, which is a trading card. Base article 200 has two sides, obverse side 201 and reverse side 202. Affixed to base article 200 as integral collectible attractiveness attributes are: genuine fingerprint 240, fingerprint borderline 241, authentication statement 250 bearing witness signature 260, preferred personality name 252, date 254, geographic location name 256, pictorial image 293 of the preferred personality who created genuine fingerprint 240, and limited edition markings 220.

FIGS. 3A and 3B show an embodiment comprising base article 300, which is a milkcap. Base article 300 has two sides, obverse side 301 and reverse side 302. Affixed to base article 300 as integral collectible attractiveness attributes are: genuine fingerprint 340, name 352 of the preferred personality who created genuine fingerprint 340, pictorial image 393 of the preferred personality, and limited edition markings 320.

FIGS. 4A and 4B show an embodiment comprising base article 400, which is a slammer. Base article 400 has two sides, obverse side 401 and reverse side 402. Affixed to base article 400 as integral collectible attractiveness attributes are: genuine fingerprint 440, genuine autograph 430, authentication statement 450 bearing witness signature 460, notarial confirmation text 470 bearing notary public signature 480, and pictorial image 493 of the preferred personality who created genuine fingerprint 440 and genuine autograph 430.

FIGS. 5A and 5B show an embodiment comprising base article 500, which is a philatelic item (a commemorative envelope). Base article 500 has two sides, obverse side 501 and reverse side 502. Incorporated in base article 500 is defined and prepared surface 510. Affixed to base article 500 as integral collectible attractiveness attributes are: genuine fingerprint 540, fingerprint borderline 541, genuine autograph 530, name 552 of the preferred personality who created genuine fingerprint 540 and genuine autograph 530, pictorial image 593 of the preferred personality, and limited edition markings 520.

FIG. 6 shows an embodiment comprising base article 600, which is a three-dimensional figurine. Affixed to base article 600 as integral collectible attractiveness attributes are: genuine fingerprint 640, fingerprint borderline 641, genuine autograph 630, name 652 of the preferred personality who created genuine fingerprint 640 and autograph 630, and limited edition markings 620.

FIGS. 7A and 7B show an embodiment comprising base article 700, which is a tangible work of fine art (a lithographic print). Base article 700 has two sides, obverse side 701 and reverse side 702. Affixed to base article 700 as integral collectible attractiveness attributes are: genuine fingerprint 740, genuine autograph 730, authentication statement 750 bearing witness signature 760, notarial confirmation text 770 bearing notary public signature 780, and limited edition markings 720.

FIG. 8 shows an embodiment comprising base article 800, which is a bound publication (a book). Affixed to base article 800 as integral collectible attractiveness attributes are: genuine fingerprint 840, fingerprint borderline 841, genuine autograph 830, authentication statement 850 bearing signature 860 of a witness who is a notary public, name 852 of the preferred personality who created genuine fingerprint 840 and genuine autograph 830, and limited edition markings 820.

FIG. 9 shows an embodiment comprising base article 900, which is a comicbook. Incorporated in base article 900 is defined and prepared surface 910. Affixed to base article 900 as integral collectible attractiveness attributes are: genuine fingerprint 940, fingerprint borderline 941, genuine autograph 930, and authentication statement 950 bearing witness signature 960.

FIGS. 10A and 10B show an embodiment comprising base article 1000, which is a tangible work of comicbook-related art. Base article 1000 has two sides, obverse side 1001 and reverse side 1002. Affixed to base article 1000 as integral collectible attractiveness attributes are: genuine fingerprint 1040, facsimile autograph 1039, authentication statement 1050 bearing certifying-person signature 1065, notarial confirmation text 1070 bearing notary public signature 1080, hologram 1099, and limited edition markings 1020.

FIGS. 11A and 11B show an embodiment comprising base article 1100, which is a photograph. Base article 1100 has two sides, obverse side 1101 and reverse side 1102. Affixed to base article 1100 as integral collectible attractiveness attributes are: genuine fingerprint 1140, genuine autograph 1130, authentication statement 1150 (including date 1154) bearing witness signature 1160, notarial confirmation text 1170 bearing notary public signature 1180, and pictorial image 1193 of the preferred personality who created genuine fingerprint 1140 and genuine autograph 1130.

FIGS. 12A and 12B show an embodiment comprising base article 1200, which is a photograph. Base article 1200 has two sides, obverse side 1201 and reverse side 1202. Incorporated in base article 1200 is defined and prepared surface 1210. Affixed to base article 1200 as integral collectible attractiveness attributes are: genuine fingerprint 1240, genuine autograph 1230, pictorial image 1293 of the preferred personality who created genuine fingerprint 1240 and genuine autograph 1230, and limited edition markings 1220.

FIGS. 13A and 13B show an embodiment comprising base article 1300, which is a collector's plate. Base article 1300 has two sides, obverse side 1301 and reverse side 1302. Affixed to base article 1300 as integral collectible attractiveness attributes are: genuine fingerprint 1340, facsimile fingerprint 1349, genuine autograph 1330, facsimile autograph 1339, authentication statement 1350 bearing witness signature 1360, notarial confirmation text 1370 bearing notary public signature 1380, and limited edition markings 1320.

FIGS. 14A and 14B show an embodiment comprising base article 1400, which is a non-collector-targeted utilitarian item (an index card). Base article 1400 has two sides, obverse side 1401 and reverse side 1402. Affixed to base article 1400 as integral collectible attractiveness attributes are: genuine fingerprint 1440, fingerprint borderline 1441, genuine autograph 1430, authentication statement 1450 (including preferred personality name 1452, date 1454, geographic location name 1456, and witness signature 1460), notarial confirmation text 1470 bearing notary public signature 1480, and limited edition markings 1420.

FIG. 15 shows an embodiment comprising base article 1500, which is an item of sporting equipment (a baseball). Affixed to base article 1500 as integral collectible attractiveness attributes are: genuine fingerprint 1540, genuine autograph 1530, and limited edition markings 1520.

FIG. 16 shows an embodiment comprising base article 1600, an item of sporting equipment (a golf ball). Affixed to base article 1600 are: genuine fingerprint 1640, and fingerprint borderline 1641. Also shown in FIG. 16 is related promotional matter in the form of merchandise packaging 1685, which bears: limited edition promotional indicia 1686, imitation fingerprint 1687, and preferred personality representation 1688.

The sixteen embodiments described above are intended as illustrative examples and not as exhaustive representations of the scope of the embodiments of the present invention.

An embodiment of this invention comprises a base article which is an item substantially qualifying as one or more of the following kinds of items: a pre-existing memorabilia item, a non-collector-targeted utilitarian item, a sporting equipment item, a sports-related item which is collectible, an item intentionally manufactured for use as a base article in an embodiment of this invention, a substantially three-dimensional item which is collectible, a substantially flat item which is collectible, a tangible work of art, a collector's plate, a lithographic print, an original work of art, an original painting, an original drawing, a limited edition work of art, a limited edition collectible ceramic item, a photograph, a black & white photograph, a color photograph, a limited edition photographic work, a promotional photograph, an item of entertainment memorabilia, a poster which is collectible, a motion picture lobby card, a motion picture cel, a trading card, a sheet of trading cards, a hall-of-fame memorabilia item, a milkcap, a slammer, a disc which is collectible, a philatelic item, a figurine, a bound publication, a first edition book, a comicbook, a comicbook-related work of art, a fanzine, an animation cel, a pennant, a 3-by-5-inch index card, and a collectible political item.

A trading card may serve as a base article. A "trading card" is a card of the type including sports and nonsports cards generally defined by the trading card industry as being a trading card. A trading card is defined as belonging to a card type substantially not including telecards, greeting cards, index cards, playing cards, postcards, and the like.

Two kinds of trading cards are used as the base articles for the embodiments of FIGS. 1A and 1B and FIGS. 2A and 2B. Base article 100 is a sports card. A "sports card" is: a kind of trading card encompassing subject matter substantially relating to a sport, and/or a trading card which is one card of a plurality of cards comprising a set of trading cards substantially relating to one or more sports.

More particularly, base article 100 is a baseball card. A "baseball card" is: a sports card encompassing subject matter substantially relating to the sport of baseball, and/or a trading card which is one card of a plurality of cards comprising a set of trading cards substantially relating to the sport of baseball. Other sports cards include basketball cards, football cards, hockey cards, autoracing-driver cards, and the like.

Base article 200 is a nonsports card. A "nonsports card" is: a kind of trading card encompassing subject matter substantially not sports-related, and/or a trading card which is one card of a plurality of cards comprising a set of trading cards including cards substantially relating to one or more topics which are primarily not sports-centered. Nonsports cards are also known as "topical cards."

The following are substantially flat items: base article 100 of FIGS. 1A and 1B, base article 200 of FIGS. 2A and 2B, base article 300 of FIGS. 3A and 3B, base article 500 of FIGS. 5A and 5B, base article 700 of FIGS. 7A and 7B, base article 1000 of FIGS. 10A and 10B, base article 1100 of FIGS. 11A and 11B, base article 1200 of FIGS. 12A and 12B, and base article 1400 of FIGS. 14A and 14B.

During the past several years there has been an exponential growth in the collecting of substantially disc-shaped items known as milkcaps and slammers. A trademarked kind of milkcap is a POG™. Slammers are generally larger, heavier and/or thicker than related milkcaps. In addition to the milkcap (exemplified as base article 300 of the embodiment of FIGS. 3A and 3B) and the slammer (exemplified as base article 400 of FIGS. 4A and 4B), the scope of this invention and its embodiments includes all other kinds of substantially disc-shaped items that are appropriate for use as base articles.

A "non-collector-targeted utilitarian item" is a body of tangible material substantially manufactured with little or no intentional collectible value and with intent to function in a non-collector-targeted utilitarian manner. Non-collector-targeted utilitarian items, including plain and ruled 3-by-5-inch index cards, have been used for decades by movie stars and other famous persons as vehicles on which their autographs may be formed and attached for distribution to fans and other autograph-seekers. A non-collector-targeted utilitarian item, such as an index card (exemplified as base article 1400 of FIGS. 14A and 14B), may serve as the base article of an embodiment of this invention.

A sporting equipment item can be used as the base article for an embodiment of this invention. A "sporting equipment item" is a body of tangible material substantially manufactured for use in the playing of a sport, and/or an item manufactured so as to substantially resemble an item for use in the playing of a sport.

Two kinds of sporting equipment items are used as the base articles in the embodiments of FIGS. 15 and 16. Base article 1500 is a baseball, a kind of sporting equipment item. Base article 1600 is another kind of sporting equipment item, a golf ball. A base article which is another kind of sporting equipment item can be, for example, a football, a basketball, a soccer ball, a hockey puck, a tennis ball, a baseball bat, a hockey stick, a tennis racket, a golf club, a baseball cap, a baseball batting helmet, a baseball batting glove, a baseball mitt, a baseball jersey, a baseball uniform, a football jersey, a football helmet, a basketball jersey, a basketball uniform, a soccer uniform, a hockey jersey, a hockey uniform, a hockey helmet, a tennis shirt, a golf shirt, a boxing glove, a pair of boxing trunks, a commemorative baseball, a commemorative football, a commemorative baseball bat, a commemorative item designed in the form of an item generally used in the playing of a sport, a white-panelled football, a white-panelled basketball, an item of facsimile sports clothing, an item designed for the playing of a sport by children, or a like item.

The term "preferred personality," as used in this application, comprises any person who creates at least one preferred-personality-created integral collectible attractiveness attribute on a base article in the form of a genuine fingerprint or genuine autograph, and/or who is represented on a base article by an integral collectible attractiveness attribute which is a facsimile reprint of the person. A preferred personality is an individual who is: an active professional athlete, a retired professional athlete, a sports hall-of-fame member, a notable amateur athlete, a notable sports-related personality, an entertainment personality, a mass-media personality, a notable academic personality, a notable author, a notable political personality, a heroic personality, a public figure, a famous personality, a comicbook-related personality, an artistic personality, and/or a like personality.

An "integral collectible attractiveness attribute" is an attribute affixed to a base article so as to enhance the attractiveness of the article to memorabilia collectors and the like. The one or more integral collectible attractiveness attributes affixed to a respective base article constitute the "integral collectible attractiveness attribute set" of the respective memorabilia article.

A "non-collector-targeted utilitarian marking" is a marking affixed to an item for a substantially utilitarian purpose not encompassing any substantial intent to make the item attractive to memorabilia collectors. Non-collector-targeted utilitarian markings include, for example: a signature affixed to a credit agreement for the utilitarian purpose of obtaining credit; a fingerprint placed on a registration card used by a law enforcement agency for the utilitarian purpose of functioning as part of a criminal record data bank system; and a notarized body of text included in a deed or like instrument for the utilitarian purpose of facilitating transfer of a real property title. The fingerprints, signatures and other markings of Parliman (U.S. Pat. No. 1,206,362), Effrig (U.S. Pat. No. 1,322,293), Jones (U.S. Pat. No. 1,374,208), Voght (U.S. Pat. No. 1,380,506), Chadwick et al. (U.S. Pat. No. 1,483,926), Stoddard (U.S. Pat. No. 1,499,955), and Edwards (U.S. Pat. No. 1,560,047), are examples of non-collector-targeted utilitarian markings.

An integral collectible attractiveness attribute and a non-collector-targeted utilitarian marking are two clearly different kinds of features, with each kind having a distinct function or purpose.

The method of the present invention comprises affixing at least one requisite attribute of a preferred personality to a base article so as to incorporate this at least one attribute as at least one substantially affixed feature and thereby as at least one part of the unified body of tangible material comprising a collector-targeted memorabilia article. This at least one attribute is intentionally and integrally affixed as an integral collectible attractiveness attribute means for enhancing and/or creating attractiveness of the article to memorabilia collectors.

The at least one requisite integral collectible attractiveness attribute may be a genuine fingerprint of the preferred personality. A genuine fingerprint may be created by the preferred personality touching one of his or her fingers to a surface of the base article and by having ink, dye, pigmented materials, fingerprint-development chemicals and/or other fingerprint-forming substances interact with both the finger and the surface during the touching so as to create and affix the genuine fingerprint.

Or the at least one requisite attribute may be a genuine autograph of the preferred personality created by the preferred personality using a writing device to transfer ink or a like substance so as to form and affix the genuine autograph as a part of the unified body of tangible material comprising the collector-targeted memorablia article. The writing device used to create a genuine autograph may be a ballpoint pen, a fountain pen, an indelible marker, or any other writing device that a preferred personality can personally use to create a genuine autograph. Or the preferred personality may create and affix a genuine autograph by any other means appropriate for the creating and affixing of a genuine autograph.

A genuine fingerprint may be formed with or without use of a removable mask. A mask having an aperture of a predetermined shape and predetermined size may be temporarily placed on the base article so as to restrict the formation of the genuine fingerprint to a predetermined surface area of the article substantially equivalent in shape and size to the aperture. Excess fingerprint-forming substance(s) will be kept off adjacent surface areas of the base article by the presence of mask material surrounding the predetermined surface area, preventing the genuine fingerprint from having unwanted coverage of parts of the base article where no fingerprinting is desired.

The predetermined shape of the aperture of the mask may be substantially symmetrical or nonsymmetrical. The predetermined shape of the aperture may symbolize the profession or another life aspect of the preferred personality (for example, an entertainment personality who is a movie star may wish to use a star-shaped aperture to form his or her genuine fingerprint) or unrelated to any such aspect.

FIGS. 17, 18, 19, 20 and 21, illustrate examples of removable masks that may be used to create genuine fingerprints of predetermined shapes and sizes with intent to increase the attractiveness of the respective articles to memorabilia collectors. Aperture 1748 of the mask shown in FIG. 17 is designed to form a substantially circular-shaped genuine fingerprint. Aperture 1848 of the mask shown in FIG. 18 is designed to form a substantially heart-shaped genuine fingerprint. Aperture 1948 of the mask shown in FIG. 19 is designed to form a substantially football-shaped genuine fingerprint. Aperture 2048 of the mask shown in FIG. 20 is designed to form a substantially baseball-bat-shaped genuine fingerprint. Aperture 2148 of the mask shown in FIG. 20 is designed to form a substantially star-shaped genuine fingerprint.

FIG. 22 shows removable mask 2247 temporarily in place on base article 2200 (a golf ball) just after a preferred personality pressed a finger bearing fingerprint-forming substance 2244 through circular-shaped aperture 2248 so as to form circular-shaped genuine fingerprint 2240. The mask material between mask edges 2245 and 2246 prevents excess fingerprinting substance 2243 from affixing to surface areas of base article 2200 where no fingerprinting is desired.

Examples of mask-formed substantially circular-shaped fingerprints include genuine fingerprint 340 of FIG. 3B, genuine fingerprint 540 of FIG. 5A, genuine fingerprint 1040 of FIG. 10A, genuine fingerprint 1140 of FIG. 11A, and genuine fingerprint 1600 of FIG. 16. An example of a mask-formed substantially star-shaped genuine fingerprint is shown as genuine fingerprint 240 of FIG. 2A. An example of a mask-formed substantially rocket-shaped genuine fingerprint is shown as genuine fingerprint 940 of FIG. 9. And an example of a mask-formed substantially football-shaped genuine fingerprint is shown as genuine fingerprint 1440 of FIG. 14A.

Regardless of the shape and size of the genuine fingerprint, a borderline substantially delineating the perimeter of the genuine fingerprint may be created on the base article to more clearly define the bounds of the fingerprint and to give the fingerprint specifically and the article generally a neater appearance. Examples of fingerprint borderlines include: borderline 241 of FIG. 2A, borderline 541 of FIG. 5A, borderline 641 of FIG. 6, borderline 841 of FIG. 8, borderline 941 of FIG. 9, borderline 1441 of FIG. 14A, and borderline 1641 of FIG. 16.

If the preferred personality is handicapped by a writing disability preventing ready creating and affixing of a consistent and legible genuine autograph, the genuine fingerprint serves as a means for the handwriting-disabled preferred personality to affix conveniently and legibly a major kind of preferred-personality-created integral collectible attractiveness attribute to the base article.

A simple embodiment within the scope of the method of the present invention is formed by a preferred personality creating a genuine fingerprint as the only integral collectible attractiveness attribute affixed to the base article. Each of the simplest embodiments having a genuine autograph and coming within the scope of this invention includes at least one additional integral collectible attractiveness attribute affixed to the base article within its integral collectible attractiveness set.

The method of the present invention encompasses affixing a statement having authentication wording to a base article to authenticate a preferred-personality-created integral collectible attractiveness attribute as a genuine creation of the preferred personality. An authentication attribute is integrally affixed as a part of the article to increase collector confidence in the genuineness of at least one preferred-personality-created integral collectible attractiveness attribute. Increase in collector confidence is expected to increase attractiveness of the article to collectors. Thus, an authentication attribute of the present invention is also an integral collectible attractiveness attribute. The affixing of an authentication attribute to the base article is not merely intended to authenticate: the affixing is intended to increase attractiveness of the article to memorabilia collectors.

Examples of authentication statements are: authentication statement 250 of FIG. 2B, authentication statement 450 of FIG. 4B, authentication statement 750 of FIG. 7B, authentication statement 850 of FIG. 8, authentication statement 950 of FIG. 9, authentication statement 1050 of FIG. 10A, authentication statement 1150 of FIG. 11B, authentication statement 1350 of FIG. 13B, and authentication statement 1450 of FIG. 14B.

To further substantiate the credibility of the wording in an authentication statement to memorabilia collectors, another kind of textual authentication attribute may be affixed to the base article: notarial confirmation text.

An authentication statement or notarial confirmation text may be directly affixed to a base article by: imprinting, silkscreen printing, rubber-stamping, photo-offset printing, branding, embossing, handwriting, heat-stamping, embroidering, and/or other affixing procedures. Or an authentication statement or notarial confirmation text may first be created on another body of tangible material (such as a piece of paper or cloth) which is later affixed to the base article.

Either separately or as parts of a larger authentication attribute (an authentication statement or notarial confirmation text), a witness signature, a certifying nonwitness signature and/or a notary public signature may be affixed to a base article.

Other integral collectible attractiveness attributes of this invention that may be affixed to a base article, either individually or as part of another attribute, include: a name of the preferred personality; the date of the creating and affixing of a preferred-personality-created integral collectible attractiveness attribute; a name of a geographic location in which the creating and affixing of a preferred-personality-created integral collectible attractiveness attribute occurred; an anti-counterfeiting marking; a hologram; and a facsimile autograph of the preferred personality.

Another integral collectible attractiveness attribute is an attribute comprising organic matter containing genetic information from the biotic body of a preferred personality (hair, other body tissue, etc.). An organic matter attribute functions as an attribute means for enhancing attractiveness of an article to collectors desiring a memorabilia article bearing such organic matter. An organic matter attribute may be affixed to a base article as an individual attribute or as a part of another integral collectible attractiveness attribute.

A pictorial image of the preferred personality is another integral attribute that may be affixed to a base article to increase attractiveness of the article to memorabilia collectors.

A base article may have a defined and prepared surface area created for affixing at least one preferred-personality-created integral collectible attractiveness attribute and/or other specific integral collectible attractiveness attributes. The defined and prepared surface area may be constructed to more readily allow clearer and more permanent affixing of one or more attributes to the base article with intent to make the article more attractive to memorabilia collectors.

In accordance with yet further aspects of this invention, the memorabilia article may be one of a limited production of substantially similar or related memorabilia articles. With intent to increase intrinsic attractiveness to collectors, this restricted production may be indicated by affixing limited edition markings to the base article. Limited edition markings may consist of numbers, letters, words, symbols and/or indicia conveying an indication or impression that the involved memorabilia article is a unit of a limited edition production.

The memorabilia article of this invention may be associated with promotional matter (including printed merchandise packaging in which the article is enclosed). The printed information may include pictorial representations of the preferred personality, facsimile autographs, facsimile fingerprints, limited edition promotional indicia, and the like.

FIG. 16 shows memorabilia article 1600 (a golf ball bearing genuine fingerprint 1640 and fingerprint borderline 1641) and related promotional matter (merchandise packaging 1685 bearing limited edition indicia 1686, imitation fingerprint 1687, and preferred personality representation 1688). The scope of the present invention includes such promotional matter in which a memorabilia article is packaged or with which a memorabilia article is otherwise associated.

CONCLUSION, RAMIFICATIONS, AND SCOPE OF THE INVENTION

The method of the present invention encompasses creation of a diversity of collector-targeted memorabilia articles, utilizing different quantitative and qualitative combinations of integral collectible attractiveness attributes. A wide diversity of items may be used as base articles. The method of the present invention allows creation of collector-targeted memorabilia articles of superior quality. Among these are memorabilia articles bearing combinations of preferred-personality-created integral attributes and comprehensively self-authenticating features not available to collectors under the prior art. The present invention makes available collector-targeted memorabilia articles having intrinsic trustworthiness and collectible attractiveness unknown to collectors under the prior art.

The present invention includes all products of the method of the invention. These products encompass all collectible articles produced by the method of the invention.

While the above description of the present invention contains many specificities, these should not be considered as limitations on the scope of the invention but rather as exemplifications of some of the embodiments thereof. Many other modifications and variations can be made without departing from the scope of the present invention, and all such modifications and variations are intended to be covered by the appended claims.

I claim:

1. A method of producing a collector-targeted memorabilia article, said method comprising:

supplying an item for use as a base article;

causing a finger of a preferred personality to interact with a fingerprint-forming substance and said base article so as to create and to affix integrally a genuine fingerprint on a predetermined surface area of said base article;

using masking material to prevent any substantial amount of said fingerprint-forming substance from affixing integrally to a surface portion of said base article outside of and adjacent to said predetermined surface area;

creating and affixing said genuine fingerprint as a preferred-personality-created integral collectible attractiveness attribute; and combining said genuine fingerprint and said base article so as to produce an integrally unified body of tangible material in the form of a product which is a collector-targeted memorabilia article.

2. The method as claimed in claim 1, wherein said finger is coated with said fingerprint-forming substance, wherein said masking material comprises a mask having an aperture with perimeter edging and a shape which are substantially dimensionally equal to the perimeter edging and the shape of said predetermined surface area, wherein said mask is removably placed on said base article so as to approximately align the perimeter edging of said predetermined surface area, and wherein said finger is moved to touch said predetermined surface area through said aperture so as to deposit said fingerprint-forming substance on said predetermined surface area and so as to create and affix said genuine fingerprint.

3. The method as claimed in claim 2, wherein the shape of said aperture substantially symbolizes something associated with a professional life aspect or another life aspect of said preferred personality.

4. The method as claimed in claim 1, said method further comprising:

affixing limited edition markings integrally to said base article.

5. The method as claimed in claim 1, said method further comprising:

affixing an authentication statement integrally to said base article, said authentication statement including: wording to certify the genuineness of said genuine fingerprint, and a signature of a person who certifies to the truth of the contents of said authentication statement; and affixing notarial confirmation text integrally to said base article, said notarial confirmation text including: wording which substantiates that said person who certifies to the truth of the contents of said authentication statement did so certify in the presence of a notary public.

6. The method as claimed in claim 1, said method further comprising:

creating an additional integral collectible attractiveness attribute which is a genuine autograph of said preferred personality, a facsimile fingerprint of said preferred personality, or a facsimile autograph of said preferred personality, and affixing said additional integral collectible attractiveness attribute to said base article.

7. The method as claimed in claim 6, wherein said preferred personality is a professional athlete, wherein said base article is a photograph depicting said preferred personality wearing sports clothing, wherein said photograph includes a defined and prepared surface area for receiving a preferred-personality-created integral collectible attractiveness attribute, wherein said additional integral collectible attractiveness attribute is a genuine autograph of said preferred personality, and wherein the affixing of said additional integral collectible attractiveness attribute is executed on said defined and prepared surface area.

8. A product of the method as claimed in claim 1, said product comprising: said integally unified body of tangible material in the form of a product which is a collector-targeted memorabilia article.

9. A method of producing a memorabilia article, said method comprising:

selecting a base article;

affixing a plurality of integral collectible attractiveness attributes to said base article, said plurality of integral collectible attractiveness attributes including a fingerprint of a preferred personality, said plurality of integral collectible attractiveness attributes further including an autograph of said preferred personality, said plurality of integral collectible attractiveness attributes further including a name of said preferred personality, said plurality of integral collectible attractiveness attributes further including a pictorial image of said preferred personality, and said plurality of integral collectible attractiveness attributes further including limited edition markings;

thereby unifying integrally said plurality of integral collectible attractiveness attributes and said base article together as a unified body of tangible material, and producing said unified body of tangible material as a product which is a memorabilia article.

10. The method as claimed in claim 9, wherein the fingerprint of said preferred personality is a genuine fingerprint, and wherein the autograph of said preferred personality is a genuine autograph.

11. The method as claimed in claim 9, wherein said preferred personality is a professional athlete, and wherein said unified body of tangible material comprises a memorabilia article which is a sports-related card.

12. The method as claimed in claim 9, wherein the fingerprint of said preferred personality is a facsimile fingerprint, and wherein the autograph of said preferred personality is a facsimile autograph.

13. The method as claimed in claim 9, wherein said preferred personality is an active professional athlete, wherein said limited edition markings comprise the term LIMITED EDITION, and wherein said limited edition markings comprise numerical indicia identifying said unified body of tangible material as being a specific number in a series of memorabilia articles.

14. A product of the method as claimed in claim 9, said product comprising: a memorabilia article in the form of said unified body of tangible material.

15. A memorabilia article including at least one integral collectible attractiveness attribute, said memorabilia article comprising:

an integrally unified body of tangible material which comprises an item, said item being a sport-related card, a nonsports card, a milkcap, a slammer, or a sports-related ball; and an integral collectible attractiveness attribute set which is comprised by said integrally unified body of tangible material, said integral collectible attractiveness attribute set including at least one integral collectible attractiveness attribute, said at least one integral collectible attractiveness attribute being a fingerprint of a preferred personality, and/or said at least one integral collectible attractiveness attribute being an autograph of a preferred personality and notarial confirmation text.

16. The memorabilia article including at least one integral collectible attractiveness attribute as claimed in claim 15, wherein said item is a sports-related ball, and wherein said integral collectible attractiveness attribute set comprises a fingerprint of a preferred personality, an autograph of the preferred personality, limited edition markings, and a hologram.

17. The memorabilia article including at least one integral collectible attractiveness attribute as claimed in claim 15, wherein said item is a sports-related card, and wherein said integral collectible attractiveness attribute set comprises a facsimile fingerprint of a preferred personality, a facsimile autograph of the preferred personality, a pictorial image of the preferred personality, a print-lettered name of the preferred personality, and limited edition markings.

18. The memorabilia article including at least one integral collectible attractiveness attribute as claimed in claim 15, wherein said item is a sports-related card; and wherein said integral collectible attractiveness attribute set comprises a fingerprint of a preferred personality, a pictorial image of the preferred personality, limited edition markings, and organic matter containing genetic information from and about the biotic body of the preferred personality.

19. The memorabilia article including at least one integral collectible attractiveness attribute as claimed in claim 15, wherein said item is a sports-related card, and wherein said integral collectible attractiveness attribute set comprises a genuine autograph of a preferred personality, limited edition markings, and notarial confirmation text.

20. The memorabilia article including at least one integral collectible attractiveness attribute as claimed in claim 15, wherein said item is a sports-related card, a nonsports card, a milkcap, or a slammer; and wherein said integral collectible attractiveness attribute set comprises a fingerprint of a preferred personality and limited edition markings.

21. The memorabilia article including at least one integral collectible attractiveness attribute as claimed in claim 15, wherein said item is a sports-related card, a nonsports card, a milkcap, or a slammer; and wherein said integral collectible attractiveness attribute set comprises a facsimile autograph of a preferred personality and a facsimile fingerprint of the preferred personality.

22. The memorabilia article including at least one integral collectible attractiveness attribute as claimed in claim 15, wherein said item is a sports-related card or a nonsports card, and wherein said integral collectible attractiveness attribute set comprises a facsimile fingerprint of a preferred personality and a pictorial image of the preferred personality.

23. The memorabilia article including at least one integral collectible attractiveness attribute as claimed in claim 15, wherein said item is a sports-related card or a nonsports card, and wherein said integral collectible attractiveness attribute set comprises a genuine autograph of a preferred personality and notarial confirmation text which certifies the authenticity of said genuine autograph.

24. The memorabilia article including at least one integral collectible attractiveness attribute as claimed in claim 15, wherein said item is a milkcap, and wherein said integral collectible attractiveness attribute set comprises a fingerprint of a preferred personality, a print-lettered name of the preferred personality, and a pictorial image of the preferred personality.

25. The memorabilia article including at least one integral collectible attractiveness attribute as claimed in claim 15, wherein said item is a sports-related ball, and wherein said integral collectible attractiveness attribute set comprises a genuine fingerprint of a preferred personality.

26. The memorabilia article including at least one integral collectible attractiveness attribute as claimed in claim 15, wherein said item is a sports-related ball, and wherein said integral collectible attractiveness attribute set comprises a facsimile fingerprint of a preferred personality.

27. The memorabilia article including at least one integral collectible attractiveness attribute as claimed in claim 15, wherein said item is a sports-related ball, and wherein said integral collectible attractiveness attribute set consists of a fingerprint of a preferred personality.

28. The memorabilia article including at least one integral collectible attractiveness attribute as claimed in claim 15, wherein said item is a sports-related ball, and wherein said integral collectible attractiveness attribute set consists of a fingerprint of a preferred personality and a print-lettered name of the preferred personality.

29. The memorabilia article including at least one integral collectible attractiveness attribute as claimed in claim 15, wherein said item is a sports-related ball, and wherein said integral collectible attractiveness attribute set comprises a fingerprint of a preferred personality and a print-lettered name of the preferred personality.

30. The memorabilia article including at least one integral collectible attractiveness attribute as claimed in claim 15, wherein said item is a sports-related ball, and wherein said integral collectible attractiveness attribute set comprises a genuine fingerprint of a preferred personality and a genuine autograph of the preferred personality.

31. The memorabilia article including at least one integral collectible attractiveness attribute as claimed in claim 15, wherein said item is a sports-related ball, and wherein said integral collectible attractiveness attribute set comprises a facsimile fingerprint of a preferred personality and a print-lettered name of the preferred personality.

32. The memorabilia article including at least one integral collectible attractiveness attribute as claimed in claim 15, wherein said item is a sports-related ball, and wherein said integral collectible attractiveness attribute set comprises a facsimile fingerprint of a preferred personality and a facsimile autograph of the preferred personality.

33. The memorabilia article including at least one integral collectible attractiveness attribute as claimed in claim 15, wherein said item is a sports-related ball, and wherein said integral collectible attractiveness attribute set comprises a genuine fingerprint and notarial confirmation text.

34. The memorabilia article including at least one integral collectible attractiveness attribute as claimed in claim 15, wherein said item is a sports-related ball, and wherein said integral collectible attractiveness attribute set comprises a genuine autograph and notarial confirmation text.

35. The memorabilia article including at least one integral collectible attractiveness attribute as claimed in claim 15, wherein said item is a sports-related ball, and wherein said integral collectible attractiveness attribute set comprises a genuine autograph, limited edition markings, and notarial confirmation text.

36. The memorabilia article including at least one integral collectible attractiveness attribute as claimed in claim 15, wherein said integral collectible attractiveness attribute set comprises a genuine fingerprint of a preferred personality.

37. The memorabilia article including at least one integral collectible attractiveness attribute as claimed in claim 15, wherein said integral collectible attractiveness attribute set comprises a facsimile fingerprint of a preferred personality.

38. The memorabilia article including at least one integral collectible attractiveness attribute as claimed in claim 15, wherein said integral collectible attractiveness attribute set comprises a fingerprint and a borderline substantially delineating the fingerprint.

39. The memorabilia article including at least one integral collectible attractiveness attribute as claimed in claim 15, wherein said integral collectible attractiveness attribute set comprises a genuine fingerprint and notarial confirmation text.

40. The memorabilia article including at least one integral collectible attractiveness attribute as claimed in claim 15, wherein said integral collectible attractiveness attribute set comprises a defined and prepared surface area for affixing at least one preferred-personality-created integral collectible attractiveness attribute, and a genuine fingerprint of a preferred personality; said genuine fingerprint being affixed within said defined and prepared surface area.

41. The memorabilia article including at least one integral collectible attractiveness attribute as claimed in claim 15, wherein said integral collectible attractiveness attribute set comprises a genuine fingerprint and an authentication statement; said authentication statement including wording that authenticates said genuine fingerprint as an attribute personally created by a preferred personality.

42. The memorabilia article including at least one integral collectible attractiveness attribute as claimed in claim 15, wherein said integral collectible attractiveness attribute set includes a fingerprint having a substantially predetermined shape; said fingerprint being a genuine fingerprint of a preferred personality, and said substantially predetermined shape symbolizing something associated with a professional life aspect or another life aspect of the preferred personality.

43. The memorabilia article including at least one integral collectible attractiveness attribute as claimed in claim 15, wherein said integral collectible attractiveness attribute set includes a fingerprint of a preferred personality, and wherein said item is enclosed within packaging which bears limited edition indicia and an imitation fingerprint.

44. A memorabilia article comprising:
an item, and
at least two integral collectible attractiveness attributes;
said item being a milkcap, a slammer, a trading card, a sports-related philatelic item, a sports-related ball, a sports-related clothing item, a sports-related figurine, a sports-related limited edition collectible ceramic item, a color photograph having a pictorial image of a preferred personality wearing a sports-related uniform, a memorabilia article enclosed within mechandise packaging which bears limited edition indicia, a comicbook, a comicbook-related figurine, a comicbook-related limited edition collectible ceramic item, or a comicbook-related philatelic item;
said at least two integral collectible attractiveness attributes including a fingerprint and an autograph,
said fingerprint being a fingerprint of a preferred personality, and
said autograph being an autograph of a preferred personality;
wherein said at least two integral collectible attractiveness attributes and said item are comprised by a unified body of tangible material which is a collector-targeted memorabilia article.

45. The memorabilia article as claimed in claim 44, wherein said fingerprint is substantially of a predetermined symmetrical shape.

46. The memorabilia article as claimed in claim 44, wherein said fingerprint is substantially circle-shaped, substantially football-shaped, substantially star-shaped, substantially heart-shaped, or substantially baseball-bat-shaped.

47. The memorabilia article as claimed in claim 44, wherein the perimeter of said fingerprint is substantially delineated by a borderline.

48. The memorabilia article as claimed in claim 44, wherein said fingerprint is a facsimile fingerprint and wherein said autograph is a facsimile autograph.

49. The memorabilia article as claimed in claim 44, wherein said item is a color photograph having a pictorial image of a preferred personality wearing a sports-related uniform.

50. The memorabilia article as claimed in claim 44, wherein said item is a trading card, a slammer, or a sports-related ball.

51. The memorabilia article as claimed in claim 44, wherein said item is a memorabilia article enclosed within merchandise packaging which bears limited edition indicia.

52. The memorabilia article as claimed in claim 44, wherein said at least two integral collectible attractiveness attributes include organic matter having genetic information from and about the biotic body of a preferred personality.

53. The memorabilia article as claimed in claim 44, wherein said item is a trading card, a milkcap, or a sports-related ball; and wherein said at least two integral collectible attractiveness attributes additionally include a hologram.

54. A limited edition memorabilia article comprising:
a base article,
an integral collectible attractiveness attribute which is a fingerprint of a preferred personality, and
limited edition markings;
said base article being from the group consisting of:
sporting equipment items, trading cards, milkcaps, slammers, comicbooks, comicbook-related works of art, and photographs depicting said preferred personality;
wherein the fingerprint of said preferred personality and said limited edition markings are integrally affixed to said base article, and wherein said base article, the fingerprint of said preferred personality, and said limited edition markings are comprised by an integrally unified body of tangible material.

55. The limited edition memorabilia article as claimed in claim 54, wherein the perimeter of the fingerprint of said preferred personality is substantially delineated by a borderline, wherein the shape of the fingerprint of said preferred personality is substantially symmetrical, and wherein the shape of the fingerprint of said preferred personality substantially symbolizes a kind of implement generally used in a professional life aspect of said preferred personality.

56. The limited edition memorabilia article as claimed in claim 54, wherein notarial confirmation text is additionally comprised by said integrally unified body of tangible material.

57. The limited edition memorabilia article as claimed in claim 54, wherein said base article is a sporting equipment item.

58. The limited edition memorabilia article as claimed in claim 54, wherein said base article is a photograph depicting said preferred personality, and wherein said photograph depicting said preferred personality includes a color pictorial image of said preferred personality wearing a sports-related uniform.

59. The limited edition memorabilia article as claimed in claim 54, wherein said base article is a substantially flat photograph depicting said preferred personality, wherein a pictorial image covers more than 80 percent of the surface area of one side of said base article, wherein an autograph of said preferred personality is additionally comprised by said integrally unified body of tangible material, and wherein notarial confirmation text is additionally comprised by said integrally unified body of tangible material.

60. A memorabilia article comprising:
a substantially flat photograph, and a plurality of integral collectible attractiveness attributes;
said substantially flat photograph being a substantially two-sided base article,
said substantially flat photograph bearing a pictorial image,
said pictorial image covering more than 80 percent of the surface area of one side of said substantially flat photograph, and
said pictorial image including a depiction of a preferred personality;
said plurality of integral collectible attractiveness attributes including: an autograph, and notarial confirmation text;
said autograph being a genuine autograph created by said preferred personality, and
said notarial confirmation text having wording which authenticates said autograph;
said plurality of integral collectible attractiveness attributes being integrally affixed to said substantially flat photograph,
and said plurality of integral collectible attractiveness attributes and said photograph being an integrally unified body of tangible material which is a collector-targeted memorabilia article.

61. The memorabilia article as claimed in claim 60, wherein said plurality of integral collectible attractiveness attributes additionally includes a fingerprint and a borderline, said borderline substantially delineating said fingerprint.

62. The memorabilia article as claimed in claim 60, wherein said plurality of integral collectible attractiveness attributes additionally includes a fingerprint having a shape substantially resembling the shape of an object related to a professional life aspect of said preferred personality.

63. The memorabilia article as claimed in claim 60, wherein said pictorial image includes a depiction of said preferred personality wearing a sports-related uniform; and wherein said notarial confirmation statement includes a name of said preferred personality, the date on which said autograph was created, a name of the geographic location at which said autograph was created, limited edition markings, and at least two signatures; said at least two signatures including a signature of a person who witnessed the creation of said autograph, and said at least two signatures including a signature of a person who is a notary public.

64. The memorabilia article as claimed in claim 60, wherein said plurality of integral collectible attractiveness attributes additionally includes limited edition markings and a hologram.

65. The memorabilia article as claimed in claim 60, wherein said notarial confirmation text is affixed to the reverse side of said substantially flat photograph, said reverse side of said substantially flat photograph being the side of said substantially flat photograph not bearing said pictorial image.

66. The memorabilia article as claimed in claim 60, wherein said pictorial image covers substantially 100 percent of the surface area of a side of said substantially flat photograph.

67. The memorabilia article as claimed in claim 60, wherein said pictorial image depicts said preferred personality wearing a professional athletic uniform.

68. The memorabilia article as claimed in claim 60, wherein said plurality of integral collectible attractiveness attributes additionally comprises a genuine fingerprint of said preferred personality.

69. The memorabilia article as claimed in claim 60, wherein said autograph is affixed to said pictorial image.

70. The memorabilia article as claimed in claim 60, wherein said plurality of integral collectible attractiveness attributes includes organic matter, said organic matter containing genetic information from and about the biotic body of said preferred personality; and wherein said notarial confirmation text comprises wording that authenticates said organic matter.

71. A memorabilia article comprising:
a sports-related base article, and
an integral collectible attractiveness attribute,
said integral collectible attractiveness attribute being a fingerprint of a preferred personality;
said integral collectible attractiveness attribute being integrally affixed to said sports-related base article;
said sports-related base article and said integral collectible attractiveness attribute being integrally comprised by a unified body of tangible material,
said unified body of tangible material being a collector-targeted memorabilia article.

72. The memorabilia article as claimed in claim 71, wherein the shape of said fingerprint of a preferred personality is substantially symmetrical and substantially resembles a ball designed for use in the playing of a sport.

73. The memorabilia article as claimed in claim 71, wherein said unified body of tangible material additionally comprises a borderline substantially delineating the perimeter of said fingerprint of a preferred personality.

74. The memorabilia article as claimed in claim 71, wherein said unified body of tangible material additionally comprises limited edition markings.

75. The memorabilia article as claimed in claim 71, wherein said unified body of tangible material is enclosed within merchandise packaging, said merchandise packaging bearing limited edition indicia.

76. The memorabilia article as claimed in claim 71, wherein said fingerprint of a preferred personality is a facsimile.

77. The memorabilia article as claimed in claim 71, wherein said unified body of tangible material additionally comprises a statement, said statement including wording that authenticates said fingerprint of a preferred personality.

78. The memorabilia article as claimed in claim 77, wherein said statement includes a signature of a witness who observed the creation of said fingerprint of a preferred personality.

79. The memorabilia article as claimed in claim 71, wherein said unified body of tangible material additionally comprises an autograph of the preferred personality who created said fingerprint of a preferred personality.

80. A memorabilia article, said memorabilia article comprising:
   an integrally unified body of tangible material including a base article and a plurality of integral collectible attractiveness attributes,
   said integrally unified body of tangible material being a collector-targeted memorabilia article;
   said plurality of integral collectible attractiveness attributes being integrally affixed to said base article;
   said plurality of integral collectible attractiveness attributes including a fingerprint,
   said fingerprint being a fingerprint of a preferred personality;
   said plurality of integral collectible attractiveness attributes additionally including an autograph,
   said autograph being an autograph of said preferred personality;
   said plurality of integral collectible attractiveness attributes additionally including notarial confirmation text,
   said notarial confirmation text including wording which authenticates said fingerprint and/or which authenticates said autograph.

81. The memorabilia article as claimed in claim 80, wherein both said fingerprint and said autograph are genuine; and wherein the shape of said fingerprint substantially resembles a circle, a football, a baseball bat, or a star.

82. The memorabilia article as claimed in claim 80, wherein both said fingerprint and said autograph are genuine, wherein said fingerprint has a substantially predetermined size and a substantially predetermined shape, wherein a borderline substantially delineates the perimeter of said fingerprint, wherein said fingerprint is located within a defined and prepared surface area for affixing at least one integral collectible attractiveness attribute, wherein said notarial confirmation text authenticates both said fingerprint and said autograph, wherein limited edition markings are included within said notarial confirmation text, wherein said plurality of integral collectible attractiveness attributes additionally includes a pictorial image of said preferred personality, and wherein said plurality of integral collectible attractiveness attributes additionally includes a hologram.

83. The memorabilia article as claimed in claim 80, wherein said plurality of integral collectible attractiveness attributes additionally includes limited edition markings and/or a hologram.

84. The memorabilia article as claimed in claim 80, wherein said base article is a sports-related ball.

85. The memorabilia article as claimed in claim 80, wherein said base article is a sports card, a nonsports card, a slammer, a comicbook, a photograph depicting said preferred personality and bearing a hologram, a figurine, or a collector's plate.

86. A memorabilia article comprising:
   a substantially three-dimensional base article, and
   a plurality of integral collectible attractiveness attributes;
   said plurality of integral collectible attractiveness attributes including: a genuine autograph of a preferred personality, and notarial confirmation text authenticating the genuine autograph of said preferred personality;
   wherein an integrally unified body of tangible material comprises said plurality of integral collectible attractiveness attributes, and wherein said integrally unified body of tangible material is a collector-targeted memorabilia article.

87. The memorabilia article as claimed in claim 86, said memorabilia article additionally comprising: a genuine fingerprint of said preferred personality, said plurality of integral collectible attractiveness attributes additionally including the genuine fingerprint of said preferred personality.

88. The memorabilia article as claimed in claim 87, wherein the genuine fingerprint of said preferred personality is of a substantially predetermined shape symbolizing a ball used in the playing of a sport.

89. The memorabilia article as claimed in claim 86, wherein said substantially three-dimensional base article is sports-related.

90. The memorabilia article as claimed in claim 86, wherein said substantially three-dimensional base article is a sports-related ball.

91. The memorabilia article as claimed in claim 86, wherein said memorabilia article comprises an integral collectible attractiveness attribute including organic matter having genetic information from and about the biotic body of said preferred personality.

92. The memorabilia article as claimed in claim 86, said memorabilia article additionally comprising: a hologram, said hologram being integrally affixed to said base article.

93. The memorabilia article as claimed in claim 92, wherein said substantially three-dimensional base article substantially consists of ceramic material.

94. The memorabilia article as claimed in claim 86, wherein said plurality of integral collectible attractiveness attributes additionally includes a fingerprint having a substantially symmetrical shape, said substantially symmetrical shape symbolizing something generally associated with a professional life aspect of said preferred personality.

95. The memorabilia article as claimed in claim 86, wherein limited edition markings are affixed to said substantially three-dimensional base article; said limited edition markings including a number assigned to said integrally unified body of tangible material, and said limited edition markings further including substantially the total number of items produced in a limited edition production substantially consisting of substantially identical and/or similar integrally unified bodies of tangible material.

96. A memorabilia article comprising:
   a sports-related ball,
   an integral collectible attractiveness attribute which is an autograph of a preferred personality, and an integral collectible attractiveness attribute which is notarial confirmation text;

said autograph of a preferred personality being integrally affixed to said sports-related ball, and said notarial confirmation statement being integrally affixed to said sports-related ball.

97. The memorabilia article as claimed in claim 96, said memorabilia article additionally comprising: an integral collectible attractiveness attribute which is a hologram, said hologram being integrally affixed to said sports-related ball.

98. The memorabilia article as claimed in claim 96, wherein organic matter containing genetic information from and about the biotic body of said preferred personality comprises at least part of an integral collectible attractiveness attribute affixed to said sports-related ball; and wherein limited edition markings are affixed to said sports-related ball.

99. The memorabilia article as claimed in claim 96, said memorabilia article additionally comprising: an integral collectible attractiveness attribute which is a fingerprint of a preferred personality, said fingerprint of a preferred personality being integrally affixed to said sports-related ball.

100. The memorabilia article as claimed in claim 99, wherein said fingerprint of a preferred personality is of a substantially predetermined shape substantially resembling the shape of a sporting equipment item.

101. The memorabilia article as claimed in claim 96, said memorabilia article additionally comprising: limited edition markings, said limited edition markings being integrally affixed to said sports-related ball.

102. A memorabilia article, said memorabilia article comprising:

a trading card, and at least two integral collectible attractiveness attributes;

said at least two integral collectible attractiveness attributes including: an autograph of a preferred personality, and notarial confirmation text;

wherein said at least two integral collectible attractiveness attributes are integral parts of said trading card.

103. The memorabilia article as claimed in claim 102, wherein said at least two integral collectible attractiveness attributes further include a fingerprint.

104. The memorabilia article as claimed in claim 102, wherein said trading card comprises a pictorial image of a sports-related personality.

105. A memorabilia article, which has a plurality of integral collectible attractiveness attributes, comprising:

an item, said item comprising a sports card, a nonsports card, a milkcap, a slammer, a figurine, a comicbook, a sporting equipment item which is substantially comprised of cloth and/or plastic, or a limited edition collectible ceramic item; and a plurality of integral collectible attractiveness attributes, said plurality of integral collectible attractiveness attributes including: an autograph of a preferred personality, and notarial confirmation text;

said item and said plurality of integral collectible attractiveness attributes being comprised by an integrally unified body of tangible material.

106. The memorabilia article as claimed in claim 105, wherein said item is a sports card.

107. The memorabilia article as claimed in claim 105, wherein said plurality of integral collectible attractiveness attributes additionally includes a fingerprint of a preferred personality.

108. The memorabilia article as claimed in claim 107, wherein said item is a sports card, and wherein said plurality of integral collectible attractiveness attributes additionally includes limited edition markings.

109. The memorabilia article as claimed in claim 105, wherein said item bears a pictorial image of said preferred personality.

110. A packaged memorabilia article, said packaged memorabilia article comprising:

an item, and at least one integral collectible attractiveness attribute;

said at least one integral collectible attractiveness attribute including: an integral collectible attractiveness attribute which is a fingerprint, and/or two integral collectible attractiveness attributes which are an autograph and notarial confirmation text authenticating said autograph;

said item and said at least one integral collectible attractiveness attribute being integral parts of a unified body of tangible material;

said unified body of tangible material being enclosed within packaging bearing limited edition indicia.

111. The packaged memorabilia article as claimed in claim 110, wherein said unified body of tangible material comprises limited edition markings which include a substantially unique number assigned to said unified body of tangible material and which include an indicium substantially indicating a total number of items produced in a limited edition production substantially consisting of substantially identical and/or similar unified bodies of tangible material; and wherein said packaging bears limited edition indicia which include an indicium substantially indicating said substantially unique number assigned to said unified body of tangible material and which include an indicium substantially indicating a total number of items produced in a limited edition production substantially consisting of substantially identical and/or similar unified bodies of tangible material.

112. The packaged memorabilia article as claimed in claim 110, wherein said unified body of tangible material comprises a sporting equipment item.

113. The packaged memorabilia article as claimed in claim 110, wherein said item comprises a trading card.

114. The packaged memorabilia article as claimed in claim 110, wherein said unified body of tangible material comprises: both a fingerprint and an autograph, a pictorial image of a preferred personality, limited edition markings, and a hologram.

115. A memorabilia article comprising:

an item which is an integrally unified body of tangible material bearing at least three integral collectible attractiveness attributes;

said at least three integral collectible attractiveness attributes including: an integral collectible attractiveness attribute which is a fingerprint of a preferred personality, and/or two integral collectible attractiveness attributes which are an autograph of a preferred personality and notarial confirmation text, and said at least three integral collectible attractiveness attributes additionally including limited edition markings and a holographic device;

wherein said at least three integral collectible attractiveness attributes are integrally affixed as parts of said integrally unified body of tangible material, wherein said limited edition markings include numerical indicia, and wherein said integrally unified body of tangible material is a collector-targeted memorabilia article.

116. The memorabilia article as claimed in claim 115, wherein said at least three integral collectible attractiveness attributes include a fingerprint of a preferred personality; wherein the perimeter of said fingerprint of a preferred personality is substantially delineated by a borderline; and wherein said fingerprint of a preferred personality is substantially circle-shaped, substantially football-shaped, substantially baseball-bat-shaped, substantially heart-shaped, or substantially star-shaped.

117. The memorabilia article as claimed in claim 115, wherein said at least three integral collectible attractiveness attributes additionally include a pictorial image of said preferred personality, and wherein said limited edition markings identify said item as a uniquely numbered item of a limited edition production and indicate the total number of items produced in a limited edition production.

118. The memorabilia article as claimed in claim 115, wherein said item is a sports card.

119. A memorabilia article comprising:
an item,
said item being a trading card, a milkcap, a figurine of a professional athlete, a sporting equipment item substantially comprised of cloth and/or wood, a sporting equipment item substantially comprised of plastic and/or metal, and/or a sports-related ball;
a fingerprint of a preferred personality, said fingerprint of a preferred personality being an integral collectible attractiveness attribute; and
a name of said preferred personality;
wherein said item, said fingerprint of a preferred personality, and said name, comprise integral parts of a unified body of tangible material,
said unified body of tangible material being a collector-targeted memorabilia article.

120. The memorabilia article as claimed in claim 119, wherein said unified body of tangible material comprises an integral collectible attractiveness attribute including organic matter that contains genetic information from and about the biotic body of said preferred personality.

121. The memorabilia article as claimed in claim 119, wherein said unified body of tangible material additionally comprises an autograph of said preferred personality.

122. The memorabilia article as claimed in claim 119, wherein said fingerprint of a preferred personality is a genuine fingerprint.

123. The memorabilia article as claimed in claim 119, wherein said fingerprint of a preferred personality is a facsimile fingerprint.

124. The memorabilia article as claimed in claim 119, wherein said fingerprint of a preferred personality is a facsimile fingerprint, and wherein said unified body of tangible material additionally comprises a facsimile autograph of said preferred personality.

125. The memorabilia article as claimed in claim 119, wherein said unified body of tangible material additionally comprises limited edition markings and/or a hologram.

126. A memorabilia article, said memorabilia article comprising:
an item which is a card, and
an integral collectible attractiveness attribute set;
said integral collectible attractiveness attribute set comprising integral parts of said item;
said integral collectible attractiveness attribute set including a plurality of integral collectible attractiveness attributes,
said plurality of integral collectible attractiveness attributes comprising: a fingerprint, an autograph, and limited edition markings;
said limited edition markings including indicia which substantially indicate that said item is a uniquely numbered item of a limited edition production and which substantially indicate the total number of items produced in said limited edition production.

127. The memorabilia article as claimed in claim 126, wherein said card is sports-related, and wherein said fingerprint is a fingerprint of a professional athlete.

128. The memorabilia article as claimed in claim 126, wherein said card bears a pictorial image of a professional athlete, wherein said card bears a print-lettered name of said professional athlete, wherein said fingerprint is a fingerprint of said professional athlete and is a facsimile fingerprint, and wherein said autograph is an autograph of said professional athlete and is a facsimile autograph.

129. The memorabilia article as claimed in claim 126, wherein said card is a trading card.

130. A memorabilia article comprising:
a base article which is a sporting equipment item, and
an integral collectible attractiveness attribute which is a facsimile fingerprint of a preferred personality;
wherein said facsimile fingerprint of a preferred personality is integrally affixed to said sporting equipment item, and
wherein said facsimile fingerprint of a preferred personality and said sporting equipment item are comprised by an integrally unified body of tangible material which is a collector-targeted memorabilia article.

131. The memorabilia article as claimed in claim 132, wherein a facsimile autograph of said preferred personality is integrally affixed to said sporting equipment item.

132. A memorabilia article comprising:
a base article,
a defined and prepared surface area for affixing at least one integral collectible attractiveness attribute therewithin, and
a fingerprint within said defined and prepared surface area for affixing at least one integral collectible attractiveness attribute therewithin;
wherein said base article, said defined and prepared surface area for affixing at least one integral collectible attractiveness attribute therewithin, and said fingerprint, are comprised by an integrally unified body of tangible material.

133. The memorabilia article as claimed in claim 132, wherein said integrally unified body of tangible material additionally comprises a pictorial image of a preferred personality, wherein said fingerprint is a fingerprint of said preferred personality, and wherein said integrally unified body of tangible material additionally comprises a hologram and/or limited edition markings.

134. The memorabilia article as claimed in claim 132, wherein the shape of said fingerprint substantially symbolizes a life aspect of said preferred personality.

135. A memorabilia article, said memorabilia article comprising:
a base article,
an integral collectible attractiveness attribute of a preferred personality, said integral collectible attractiveness attribute of a preferred personality being a fingerprint which has a substantially predetermined shape and which has a substantially predetermined size, and limited edition markings;

wherein said base article, said integral collectible attractiveness attribute of a preferred personality, and said limited edition markings, are unified as integral parts of an integrally unified body of tangible material which is a collector-targeted memorabilia article.

136. A memorabilia article, said memorabilia article comprising:

an integrally unified body of tangible material which includes a base article and at least three integral collectible attractiveness attributes;

said base article being sports-related, and said at least three integral collectible attractiveness attributes comprising a fingerprint of a preferred personality, a photographic image of said preferred personality, and limited edition markings.

137. A memorabilia article comprising:

a base article, said base article being substantially three-dimensional and being sports-related; and at least one integral collectible attractiveness attribute, said at least one integral collectible attractiveness attribute being a fingerprint of a preferred personality, and/or said at least one integral collectible attractiveness attribute being an autograph of a preferred personality and notarial confirmation text.

138. The memorabilia article as claimed in claim 137, wherein said at least one integral collectible attractiveness attribute includes a genuine fingerprint.

139. A memorabilia article, said memorabilia article comprising:

a base article, said base article comprising an item of sports-related clothing; and an integral collectible attractiveness attribute set, said integral collectible attractiveness attribute set including at least one integral collectible attractiveness attribute, said at least one integral collectible attractiveness attribute being a fingerprint of a preferred personality, and/or said at least one integral collectible attractiveness attribute being an autograph of a preferred personality and notarial confirmation text;

said base article and said integral collectible attractiveness attribute set being comprised by an integrally unified body of tangible material.

140. A memorabilia article comprising:

a base article, and a fingerprint;

said fingerprint having a shape substantially symbolizing something associated with a professional life aspect of a preferred personality, and said fingerprint being an integral collectible attractiveness attribute.

141. The memorabilia article as claimed in claim 140, wherein said base article is a card.

142. A method of producing a memorabilia article, said method comprising:

selecting an item for use as a base article from the group of items consisting of: comicbooks, sports cards, non-sports cards, sports-related clothing items, and sports-related balls;

creating an integral collectible attractiveness attribute of a preferred personality;

affixing said integral collectible attractiveness attribute of a preferred personality to said base article; and affixing notarial confirmation text to said base article;

thereby forming and producing a product which is an integrally unified body of tangible material.

143. The method of producing a memorabilia article as claimed in claim 142, said method further comprising:

creating and affixing said integral collectible attractiveness attribute of a preferred personality in the form of an autograph and in the presence of a person who is a witness; and including, in said notarial confirmation text, wording identifying said person who is a witness.

144. A product of the method of producing a memorabilia article as claimed in claim 142, said product comprising: said integrally unified body of tangible material.

145. A memorabilia article, said memorabilia article comprising:

an integrally unified body of tangible material, said integrally unified body of tangible material including a base article and at least two integral collectible attractiveness attributes affixed to said base article, wherein the at least two integral collectible attractiveness attributes include a fingerprint and a borderline, said borderline substantially delineating the perimeter of said fingerprint.

146. The memorabilia article as claimed in claim 145, wherein said integrally unified body of tangible material comprises a trading card, a color photograph, or a sporting equipment item; wherein the shape of said fingerprint is a substantially predetermined shape; wherein said substantially predetermined shape is substantially symmetrical; and wherein said substantially predetermined shape symbolizes something associated with a professional life aspect or another life aspect of a preferred personality.

147. The method as claimed in claim 9, said method further comprising:

affixing an authentication statement to said base article, including in said authentication statement wording which certifies that said fingerprint is a genuine fingerprint personally created by said preferred personality, and including in said authentication statement a signature.

* * * * *